United States Patent
Zwirn et al.

(10) Patent No.: US 7,676,091 B2
(45) Date of Patent: Mar. 9, 2010

(54) METHOD AND APPARATUS FOR ANALYSING ULTRASOUND IMAGES

(75) Inventors: Gil Zwirn, Petach-Tikva (IL); Solange Akselrod, Givat Shmuel (IL)

(73) Assignee: Ramot At Tel Aviv University Ltd., Tel-Aviv (IL)

( * ) Notice: Subject to any disclaimer, the term of this patent is extended or adjusted under 35 U.S.C. 154(b) by 0 days.

(21) Appl. No.: 10/585,376

(22) PCT Filed: Jan. 4, 2005

(86) PCT No.: PCT/IL2005/000012
§ 371 (c)(1),
(2), (4) Date: Jan. 31, 2008

(87) PCT Pub. No.: WO2005/065028
PCT Pub. Date: Jul. 21, 2005

(65) Prior Publication Data
US 2008/0130964 A1    Jun. 5, 2008

Related U.S. Application Data

(60) Provisional application No. 60/534,390, filed on Jan. 7, 2004.

(51) Int. Cl.
*G06K 9/18*    (2006.01)
(52) U.S. Cl. .................................................. 382/182
(58) Field of Classification Search ................ 382/162, 382/168–172, 254, 270–275; 348/672; 358/445, 358/447, 520
See application file for complete search history.

(56) References Cited

U.S. PATENT DOCUMENTS

| | | | |
|---|---|---|---|
| 3,983,320 A * | 9/1976 | Ketcham et al. ............ 348/672 |
| 5,457,754 A | 10/1995 | Han et al. | |
| 5,581,370 A * | 12/1996 | Fuss et al. .................... 358/447 |
| 6,059,729 A | 5/2000 | Stonger | |
| 6,108,439 A | 8/2000 | Ishiguro | |
| 6,346,124 B1 | 2/2002 | Geiser et al. | |
| 6,463,173 B1 * | 10/2002 | Tretter ........................ 382/168 |
| 6,468,218 B1 | 10/2002 | Chen et al. | |
| 6,650,774 B1 * | 11/2003 | Szeliski ...................... 382/169 |
| 6,798,918 B2 | 9/2004 | Chu et al. | |
| 6,835,177 B2 | 12/2004 | Fritz et al. | |
| 2004/0081340 A1 | 4/2004 | Hashimoto | |

(Continued)

OTHER PUBLICATIONS

Bjærum et al. "Clutter Filters Adapted to Tissue Motion in Ultrasound Color Flow Imaging", IEEE Transactions on Ultrasonics, Ferroelectrics, and Frequency Control, 49(6): 693-704, 2002.

(Continued)

*Primary Examiner*—Jose L Couso

(57) ABSTRACT

A method of improving an image or a set of images, by transforming an intensity histogram thereof is disclosed. The method comprises: (a) fitting the intensity histogram to a sum of a plurality of localized functions; (b) using the plurality of localized functions to define a plurality of localized intensity histograms; (c) for each localized intensity histogram, performing at least one image enhancement procedure, thereby providing a plurality of improved localized intensity histograms; and (d) combining the plurality of improved localized intensity histograms, thereby transforming the intensity histogram of the image. In various exemplary embodiments, the method further comprises detecting clutter and/or an outline of at least one region in the image or set of images.

41 Claims, 28 Drawing Sheets

U.S. PATENT DOCUMENTS

2004/0120559 A1    6/2004    Hall
2006/0045318 A1    3/2006    Schoisswohl et al.
2006/0078182 A1    4/2006    Zwirn et al.

OTHER PUBLICATIONS

Desco et al. "Myocardial Perfusion Assessment With Contrast Echocardiography",Medical Imaging: Ultrasonic Imaging and signal Processing, Proceedings of SPIE, 4325: 514-522, 2001.

Krishna et al. "Subharmonic Generation From Ultrasonic Contrast Agents", Physics in Medicine and Biology, 44(3): 681-694, 1999.

Lafitte et al. "Contrast Echocardiography Can Assess Risk Area and Infarct Size During Coronary Occlusion and Reperfusion: Experimental Validation", Journal of the American College of Cardiology, 39: 1546-1554, 2002.

Mor-Avi et al. "Digital Path-Dependent Recompensation of Contrast-Enhanced Echocardiographic Images", Ultrasound in Medicine & Biology, 18(10): 831-842, 1992. Abstract.

Mor-Avi et al. "Myocardial Regional Blood Flow: Quanitative Measurement by Computer Analysis of Contrast Enhanced Echocardiographic Images", Ultrasound in Medicine & Biology, 19(8): 619-633, 1993. Abstract.

Mor-Avi et al. "Myocardial Transit Time of the Echocardiographic Contrast Media", Ultrasound in Medicine & Biology, 19(8): 635-648, 1993. Abstract.

Moseley "Evaluation of Abnormal Liver Function Tests", Medical Clinics of North American, 80(5): 887-906, 1996.

Oh et al. "Correlation of Regional Wall Motion Abnormalities Detected by Two-Dimensional Echocardiography With Perfusion Defect Determined by Technetium 99m Sestamibi Imaging in Patients Treated With Reperfusion Therapy During Acute Myocardial Infarction", American Heart Journal, 131: 32-37, 1996.

Sheehan et al. "Advantages and Applications of the Centerline Method for Characterizing Regional Ventricular Function", Circulation, 74: 293-305, 1986.

Yoo et al. "Adaptive Clutter Filtering for Ultrasound Color Flow Imaging", Ultrasound in Medicine & Biology, 29(9): 1311-1320, 2003.

Yuda et al. "Use of Cyclic Variation of Integrated Backscatter to Assess Contractile Reserve and Myocardial Viability in Chronic Ischemic Left Ventricular Dysfunction", Echocardiology, 19(4): 279-287, 2002.

Herment et al. "Improved Estimation of Low Velocities in Color Doppler Imaging by Adapting the Mean Frequency Estimator to the Clutter Rejection Filter", IEEE Transactions on Biomedical Engineering, 43(9): 919-927, 1996.

Jacob et al. "Evaluating A Robust Contour Tracker on Echocardiographic Sequences", Medical Image Analysis, 3(1): 63-75, 1999.

Ohyama et al. "Automatic Left Ventricular Endocardium Detection in Echocardiograms Based on Ternary Thresholding Method", IEEE Proceedings of the 15th International Conference on Pattern Recognition, 4: 320-323, 2000.

Spencer et al. "Use of Harmonic Imaging Without Echocardiographic Contrast to Improve Two-Dimensional Image Quality", American Journal of Cardiology, 82: 794-799, 1998.

International Preliminary Report on Patentability Dated Nov. 16, 2006 From the International Bureau of WIPO Re. Application No. PCT/IL2005/000012.

\* cited by examiner

M(m,n)

METHOD AND APPARATUS FOR ANALYSING ULTRASOUND IMAGES

RELATED APPLICATIONS

This application is a National Phase Application of PCT Patent Application No. PCT/IL2005/000012 having International Filing Date of Jan. 4, 2005, which claims the benefit of U.S. Provisional Patent Application No. 60/534,390 filed on Jan. 7, 2004. The contents of the above Applications are all incorporated herein by reference.

FIELD AND BACKGROUND OF THE INVENTION

The present invention relates to image analysis and, more particularly, to methods and apparatus for analyzing and improving the quality of images obtained, e.g., during echocardiography.

Imaging is recognized as the most commonly used tool in medical diagnostics. Due to its non-invasive nature, imaging is the preferred procedure prior to any invasive treatment or analysis. Medical imaging techniques include Magnetic Resonance Imaging, X-ray imaging, gamma imaging, ultrasound imaging and the like. In Magnetic Resonance Imaging, magnetic fields interact with the spins of the atoms in a tissue and the interaction results are monitored and analyzed to provide an image of the tissue. In X-ray imaging, X-ray radiation is applied to the body and different absorption and transmission characteristic of different tissues generate an image thereof. In gamma imaging, a radioactive isotope is injected to, inhaled by or ingested by a patient. The isotope is chosen based on bio-kinetic properties that cause preferential uptake by different tissues. Radiation emitted by the radioactive isotope is detected by radiation detectors outside the body, giving its spatial uptake distribution within the body. In ultrasound imaging, high frequency pulsed and continuous sound waves are applied to the body and the reflected sound waves are used to develop images of internal organs and the vascular system. The sound waves are generated and recorded by transducers or probes that are either passed over or inserted into the body. The resulting images can be viewed immediately on a video display or can be recorded for later evaluation in a single image or a cine-loop format.

Diagnostic ultrasound imaging is presently a preferred imaging modality in many medical fields, such as radiology, cardiology and gynecology. Cardiologists and other medical practitioners use cardiac ultrasound imaging, also termed echocardiography, to evaluate the condition of the heart. Echocardiography has the advantage of being a non-invasive, quick, inexpensive, convenient and safe diagnostic procedure, and is therefore practiced in many hospitals as well as private clinics.

The primary drawback of echocardiography is the difficulty of acquiring good quality images in patients with poor acoustic windows. Moreover, clutter and poor resolution can compromise the clinical utility of images of any patient produced by even the most sophisticated ultrasound scanners. With echocardiography, the difficulty of acquiring acceptable images is further compounded by the fact that the region of interest, the heart, has complex motion patterns. The advantages of echocardiography procedure on the one hand, and the unsatisfactory image quality on the other hand, have led researches to apply image processing techniques so as to at least partially improve the echocardiograph image.

One image processing technique is "thresholding," in which one or more parameters (typically intensity thresholds), are used to generate an output image. For example, in one implementation of the thresholding procedure, the intensity of each to pixel in the original image is compared with a single intensity threshold. The original image is mapped onto a binary image in which each pixel has one of two polarities (say "0" and "1") depending whether the intensity of the corresponding pixel in the original image is higher or lower than the intensity threshold.

Image processing oftentimes involves mathematical operations performed on histograms characterizing the images. In image processing context, a histogram typically refers to a graph showing the number of pixels in an image at each different intensity value found in that image. For example, for an 8-bit grey-scale image, there are $2^8 = 256$ different possible intensity values, and the histogram graphically displays 256 numbers showing the distribution of pixels amongst those intensity values.

A well-known mathematical operation is "histogram equalization" (see, e.g., Eltoft et al. "Real-Time Image Enhancement in Two-Dimensional Echocardiography", Computers in Cardiology 1984:481). This technique is based on the assumption that images embodying the maximal possible intensity range display optimal contrasts. In conventional histogram equalization, an intensity transformation, also known as a Brightness Transfer Function (BTF), is used to increase the spread of the intensity histogram characterizing the image. Histogram equalization can also be combined with thresholding and/or intensity transformation [Gonzalez R. C. and Woods R. W., "Digital Image Processing" Addison-Wesley, pp. 166-171, 1992]. However, the results obtained using the above techniques are far from being satisfactory. In particular, echocardiograph images processed using prior art techniques suffer from poor resolution and a substantial amount of noise.

The major artifact in ultrasound images is clutter, which includes irrelevant information that appears in the imaging plane, obstructing the data of interest. There are several causes for the appearance of clutter in an ultrasonic image. A first cause is effective imaging of off-axis objects, primarily due to highly reflective objects in the transducer's sidelobes (e.g., the ribcage and the lungs). A second cause is known as multi-path or reverberations. Due to the geometry of the scanned tissue with respect to the transducer, and the local reflective characteristics of the tissue, a substantial amount of the transmitted energy is bounced back and forth in the tissue before reaching the transducer. As a result, the signal measured at a specific range-gate includes contributions from incorrect ranges, in addition to the relevant range swath.

A known method for handling clutter, in particular in ultrasound images of patients with low echogenicity is "contrast echocardiography" [Krishna et al., "Subharmonic Generation from Ultrasonic Contrast Agents," Physics in Medicine and Biology, 44:681, 1999]. In contrast echocardiography the backscatter from blood is enhanced to improve its delineation from the surrounding tissue. Another imaging method known to reduce clutter is harmonic imaging [Spencer et al., "Use of Harmonic Imaging without Echocardiographic Contrast to Improve Two-Dimensional Image Quality," American Journal of Cardiology, 82:794, 1998]. In harmonic imaging, the ultrasound waves are transmitted at one frequency and receiving at twice the transmitted frequency. These techniques however provide less than optimal results. Additionally, being based on adapting the data acquisition process, these techniques cannot be applied to all types of echocardiograph images.

Several clutter rejection algorithms have been specifically developed for color-Doppler flow images in which effects of slow-moving objects are suppressed assuming that the blood flow velocity is much higher than the motion velocity of the surrounding tissue (to this end see, e.g., Herment et al., "Improved Estimation of Low Velocities in Color Doppler Imaging by Adapting the Mean Frequency Estimator to the Clutter Rejection Filter," IEEE Transactions on Biomedical Engineering, 43:919, 1996; Bjaerum et al., "Clutter filters adapted to tissue motion in ultrasound color flow imaging," IEEE Transactions on Ultrasonics Ferroelectrics & Frequency Control, 49, 6:693, 2002; Cloutier et al., "A new clutter rejection algorithm for Doppler ultrasound," IEEE Transactions on Medical Imaging, 22, 4:530, 2003; and Yoo et al., "Adaptive Clutter Filtering for Ultrasound Color Flow Imaging," Ultrasound in Medicine and Biology, 29, 9:1311, 2003).

It is recognized that the effectiveness in diagnostic imaging depends on the ability to accurately recognize the imaged organs. For example, in echocardiography, the determination of the location of the cardiac muscle within the scanned plane, and specifically of the Left Ventricle (LV), is of great importance. Information about the LV outlines as a function of time enables automatic extraction of rich local quantitative functional information.

However, with the present signal-to-noise ratio and substantial amount of clutter in echocardiograph images, visual as well as automatic determination of the LV outlines is rather difficult. An inherent problem with automatic determination of the LV outlines is the complex motion of the Mitral Valve and the Papillary Muscles, which further increase the computational load. An additional problem is the significant variations between different patients and different measurements of the same patient. Several attempts have been made to develop algorithms for automatic detection of the LV outlines [U.S. Pat. Nos. 5,457,754 and 6,346,124; and Jacobs et al., "Evaluating a Robust Contour Tracker on Echocardiographic Sequences," Medical Image Analysis, 3:63, 1999]. These attempts, however, had only limited success in border detection. For example, prior art fail to accurately detected contours outlining the outer boundaries of the LV.

Other prior art of interest include, Ohyama et at., "Automatic Left Ventricular Endocardium Detection in Echocardiograms Based on Ternary Thresholding Method", IEEE Proceedings of 15th International Conference on Pattern Recognition 4:320-323, 2000; and Abiko Y and Ito T, Nakajima M., "Improvement on Quality of Echocardiograms", Acoustical Imaging 23:169-176, 1997.

It will be appreciated that there is a widely recognized need for, and it would be highly advantageous to have methods and apparatus for analyzing and improving the quality of images, devoid of the above limitations.

SUMMARY OF THE INVENTION

According to one aspect of the present invention there is provided a method of improving an image by transforming an intensity histogram thereof, the method comprising: (a) fitting the intensity histogram to a sum of a plurality of localized functions; (b) using the plurality of localized functions to define a plurality of localized intensity histograms; (c) for each localized intensity histogram, performing at least one image enhancement procedure, thereby providing a plurality of improved localized intensity histograms; and (d) combining the plurality of improved localized intensity histograms, thereby transforming the intensity histogram of the image.

According to further features in preferred embodiments of the invention described below, the method further comprises removing clutter from the image.

According to still further features in the described preferred embodiments the plurality of localized functions comprises a first localized function, a second localized function and a third localized function, and further wherein the plurality of localized histograms comprises a first localized histogram, a second localized histogram and a third localized histogram.

According to still further features in the described preferred embodiments the method further comprises reducing a range of the first localized histogram.

According to still further features in the described preferred embodiments the method further comprises expanding a range of the second localized histogram.

According to still further features in the described preferred embodiments the method further comprises linearly spreading intensity values over respective intensity ranges of the first and the second localized histogram.

According to still further features in the described preferred embodiments the method further comprises quadratically spreading intensity values over an intensity range of the third localized histogram.

According to still further features in the described preferred embodiments the method further comprises applying a low-pass filter on at least a portion of the intensity histogram, subsequently to the step of combining the plurality of improved localized intensity histograms.

According to still further features in the described preferred embodiments the removing the clutter from the image comprises: calculating a statistical deviation for each picture-element over the set of still-images, thereby providing a statistical deviation matrix having a plurality of matrix-elements; and determining, for each picture element, whether a respective matrix-element of the average intensity matrix is above a first intensity threshold and whether a respective matrix-element of the statistical deviation matrix is below an additional intensity threshold, and if so then marking the picture-element as a clutter picture-element in the image.

According to still further features in the described preferred embodiments the method further comprises calculating the first intensity threshold, wherein the first intensity threshold is defined as an intersection point between two localized functions of the plurality of localized functions.

According to still further features in the described preferred embodiments the method further comprises: using the statistical deviation matrix to construct a second intensity histogram; fitting the second intensity histogram to a second sum of a plurality of localized functions; and calculating the additional intensity threshold, wherein the additional intensity threshold is defined as an intersection point between two localized functions of the plurality of localized functions of the second sum.

According to still further features in the described preferred embodiments the method further comprises outlining at least one region in the image, and assigning to each clutter picture-element an intensity value corresponding to a location of the clutter picture-element relative to the at least one region.

According to still further features in the described preferred embodiments the outlining at least one region comprises: applying a thresholding procedure to the set of still-images in a Boolean manner, so as to construct at least one binary matrix having a plurality of binary-valued matrix-elements; and for each binary matrix of the at least one binary matrix, clustering the binary matrix, so as to obtain at least one cluster of matrix-elements having a predetermined polarity, and marking picture-elements corresponding to at least a portion of matrix-elements enveloping the at least one cluster as outlining picture-elements; thereby outlining the at least one region.

According to another aspect of the present invention there is provided a method of detecting clutter in a set of images arranged grid-wise in a plurality of picture-elements, each image being represented by a plurality of intensity values over the grid, the method comprising: (a) calculating a set-averaged intensity value for each picture-element, thereby providing an average intensity matrix having a plurality of matrix-elements; (b) calculating a statistical deviation for each picture-element over the set of images, thereby providing a statistical deviation matrix having a plurality of matrix-elements; (c) determining, for each picture element, whether a respective matrix-element of the average intensity matrix is above a first intensity threshold and whether a respective matrix-element of the statistical deviation matrix is below an additional intensity threshold, and if so then marking that the picture-element as a clutter picture-element in the set of images.

According to further features in preferred embodiments of the invention described below, the method further comprises, prior to step (c): constructing a first intensity histogram characterizing the average intensity matrix, and constructing a second intensity histogram characterizing the statistical deviation matrix.

According to still further features in the described preferred embodiments the method further comprises, prior to step (c): fitting the first intensity histogram to a first sum of a plurality of localized functions and using the plurality of localized functions to of the first sum for calculating the first intensity threshold; and fitting the second intensity histogram to a second sum of a plurality of localized functions and using the plurality of localized functions of the second sum for calculating the second intensity threshold.

According to still further features in the described preferred embodiments the plurality of localized functions of the first sum comprises a first localized function, a second localized function and a third localized function.

According to still further features in the described preferred embodiments the first intensity threshold equals an intersection point between the second and the third localized functions of the first sum.

According to still further features in the described preferred embodiments the plurality of localized functions of the second sum comprises a first localized function, a second localized function and a third localized function.

According to still further features in the described preferred embodiments the additional intensity threshold equals an intersection point between the first and the second localized functions of the second sum.

According to yet another aspect of the present invention there is provided a method of outlining at least one region in a set of images arranged grid-wise in a plurality of picture-elements, each image being represented by a plurality of intensity values over the grid and characterized by an intensity histogram, the method comprising: (a) calculating a set-averaged intensity value for each picture-element, thereby providing an average intensity matrix having a plurality of matrix-elements, and constructing a first intensity histogram characterizing the average intensity matrix; (b) fitting the first intensity histogram to a sum of a plurality of localized functions, so as to provide at least one intensity threshold, each intensity threshold of the at least one intensity threshold being defined as an intersection point between two localized functions of the plurality of localized functions; (c) for each intensity threshold of the at least one intensity threshold, applying a thresholding procedure to the set of images in a Boolean manner, so as to construct at least one binary matrix having a plurality of binary-valued matrix-elements; and (d) for each binary matrix of the at least one binary matrix, clustering the binary matrix, so as to obtain at least one cluster of matrix-elements having a predetermined polarity, and marking picture-elements corresponding to at least a portion of matrix-elements enveloping the at least one cluster as outlining picture-elements; thereby outlining the at least one region.

According to further features in preferred embodiments of the invention described below, the method further comprises removing clutter from at least one image of the set of images.

According to still further features in the described preferred embodiments the removing the clutter from the image comprises: calculating a statistical deviation for each picture-element over the set of still-images, thereby providing a statistical deviation matrix having a plurality of matrix-elements and constructing a second intensity histogram characterizing the statistical deviation matrix; fitting the second intensity histogram to a second sum of a plurality of localized functions, so as to provide at least one additional intensity threshold, the at least one additional intensity threshold being defined as an intersection point between two localized functions of the second sum; and determining, for each picture element, whether a respective matrix-element of the average intensity matrix is above the second intensity threshold and whether a respective matrix-element of the statistical deviation matrix is below one of the at least one additional intensity threshold, and if so then marking the picture-element as a clutter picture-element in the image.

According to still further features in the described preferred embodiments the calculating the statistical deviation for each picture-element over the set of images, comprises calculating a mean-square-error of a respective matrix element of the average intensity matrix.

According to still further features in the described preferred embodiments the method further comprises performing at least one morphological operation on the at least one binary matrix.

According to still further features in the described preferred embodiments the method further comprises, for each region of the at least one region, defining an origin of the grid, the origin being defined as a central picture-element of the region.

According to still further features in the described preferred embodiments the method further comprises transforming the grid into a polar representation, using the origin of the grid, the polar representation being represented by a radial matrix and a angular matrix.

According to still further features in the described preferred embodiments the method further comprises digitizing the radial matrix and the angular matrix using a predetermined resolution.

According to still further features in the described preferred embodiments the at least one intensity threshold comprises a first intensity threshold and a second intensity threshold, hence the at least one binary matrix comprises a first binary matrix and a second binary matrix.

According to still further features in the described preferred embodiments enveloping matrix elements of the first binary matrix corresponds to an inner boundary of the left ventricle, and enveloping matrix elements of the second binary matrix corresponds to an outer boundary of the left ventricle.

According to still further features in the described preferred embodiments the method further comprises, for each binary matrix of the at least one binary matrix: identifying matrix-elements representing the papillary muscles and removing the identified matrix-elements from the binary matrix.

According to still further features in the described preferred embodiments the identification of matrix-elements representing the papillary muscles is effected by a region-growing procedure.

According to still further features in the described preferred embodiments the method further comprises for each binary matrix of the at least one binary matrix: identifying matrix-elements representing cusps of the mitral valve, and removing the identified matrix-elements from the binary matrix.

According to still further features in the described preferred embodiments the identification of the matrix-elements representing the cusps of the mitral valve comprises: calculating, for each picture-element of the plurality of picture-elements of the grid, a deviation of an intensity value of the picture-element; and identifying matrix-elements corresponding to picture-elements having a high deviation of intensity value as matrix-elements representing the cusps of the mitral valve.

According to still further features in the described preferred embodiments the method further comprises: applying a set of temporal and spatial filters, so as to reject at least a few matrix-elements enveloping the at least one cluster of matrix-elements; and assigning to picture-elements corresponding to the rejected matrix-elements interpolated intensity values.

According to still another aspect of the present invention there is provided an apparatus for improving an image by transforming an intensity histogram thereof, the apparatus comprising: a fitter, for fitting the intensity histogram to a sum of a plurality of localized functions; a histogram definer, for defining a plurality of localized intensity histograms using the plurality of localized functions; and a histogram transformer, supplemented by an algorithm for performing at least one image enhancement procedure, for enhancing each localized intensity histogram, thereby to provide a plurality of improved localized intensity histograms, and combining the plurality of improved localized intensity histograms.

According to further features in preferred embodiments of the invention described below, each localized intensity histogram of the plurality of localized intensity histograms is characterized by an intensity range having a minimal intensity value and a maximal intensity value, such that at least one of the minimal and maximal intensity values coincides with an intersection point between two localized function of the plurality of localized functions.

According to still further features in the described preferred embodiments the at least one image enhancement procedure is selected so as to enlarge a relative portion of a high-intensity region of the intensity histogram.

According to still further features in the described preferred embodiments each image enhancement procedure of the at least one image enhancement procedure is independently selected from the group consisting of histogram equalization and histogram specification.

According to still further features in the described preferred embodiments the plurality of localized functions comprises a first localized function, a second localized function and a third localized function, and further wherein the plurality of localized histograms comprises a first localized histogram, a second localized histogram and a third localized histogram.

According to still further features in the described preferred embodiments the histogram equalization is performed on the first localized histogram and the second localized histogram, and the histogram specification is performed on the third localized histogram.

According to still further features in the described preferred embodiments the transformer is operable to reduce a range of the first localized histogram. According to still further features in the described preferred embodiments the transformer is operable to expand a range of the second localized histogram. According to still further features in the described preferred embodiments the transformer is operable to linearly spread intensity values over respective intensity ranges of the first and the second localized histogram. According to still further features in the described preferred embodiments the transformer is operable to quadratically spread intensity values over an intensity range of the third localized histogram. According to still further features in the described preferred embodiments the transformer is operable to apply a low-pass filter on at least a portion of the intensity histogram. According to still further features in the described preferred embodiments the low-pass filter is selected from the group consisting of a binomial filter and a Gaussian filter.

According to still further features in the described preferred embodiments the image is a moving image characterized by a plurality of picture-elements, the moving image being formed of a set of still-images.

According to still further features in the described preferred embodiments the apparatus further comprises a histogram constructor for constructing the intensity histogram of the image.

According to still further features in the described preferred embodiments the histogram constructor comprises an average calculator, for calculating, for each picture-element of the plurality of picture-elements, a set-averaged intensity value, thereby to provide an average intensity matrix representing the moving image; and to construct the intensity histogram using the average intensity matrix.

According to still further features in the described preferred embodiments the apparatus further comprises a preprocessing unit, for performing at least one preprocessing operation on the set of images.

According to still further features in the described preferred embodiments the preprocessing unit is operable to remove clutter from the image.

According to still further features in the described preferred embodiments the preprocessing unit comprises: a statistical deviation calculator, for each picture-element over the set of still-images, thereby to provide a statistical deviation matrix having a plurality of matrix-elements; and electronic-calculation functionality for determining, for each picture element, whether a respective matrix-element of the average intensity matrix is above a first intensity threshold and whether a respective matrix-element of the statistical deviation matrix is below an additional intensity threshold, and if so then marking the picture-element as a clutter picture-element in the image.

According to still further features in the described preferred embodiments the preprocessing unit further comprises an intensity threshold calculator, for calculating the first intensity threshold, wherein the first intensity threshold is defined as an intersection point between two localized functions of the plurality of localized functions.

According to still further features in the described preferred embodiments the histogram constructor is operable to construct a second intensity histogram using the statistical deviation matrix.

According to still further features in the described preferred embodiments the fitter is operable to fit the second intensity histogram to a second sum of a plurality of localized functions.

According to still further features in the described preferred embodiments the intensity threshold calculator is operable to calculate the additional intensity threshold, wherein the additional intensity threshold is defined as an intersection point between two localized functions of the plurality of localized functions of the second sum.

According to still further features in the described preferred embodiments the preprocessing unit further comprises: an outliner, for outlining at least one region in the image; and intensity value assigner, for assigning to each clutter picture-element an intensity value corresponding to a location of the clutter picture-element relative to the at least one region.

According to still further features in the described preferred embodiments the outliner comprises: a thresholding unit, for applying a thresholding procedure to the set of still-images in a Boolean manner, such that at least one binary matrix having a plurality of binary-valued matrix-elements is constructed; and a clustering unit, for clustering each binary matrix of the at least one binary matrix, so as to obtain at least one cluster of matrix-elements having a predetermined polarity, the clustering unit being operable to mark picture-elements corresponding to at least a portion of matrix-elements enveloping the at least one cluster as outlining picture-elements.

According to an additional aspect of the present invention there is provided an apparatus for detecting clutter in a set of images arranged grid-wise in a plurality of picture-elements, each image being represented by a plurality of intensity values over the grid, the apparatus comprising: (a) an average calculator, for calculating a set-averaged intensity value for each picture-element, thereby providing an average intensity matrix having a plurality of matrix-elements; (b) a statistical deviation calculator, for calculating a statistical deviation for each picture-element over the set of images, thereby providing a statistical deviation matrix having a plurality of matrix-elements; (c) clutter identification unit, operable to determine, for each picture element, whether a respective matrix-element of the average intensity matrix is above a first intensity threshold and whether a respective matrix-element of the statistical deviation matrix is below an additional intensity threshold, and if so then to mark that the picture-element as a clutter picture-element in the set of images.

According to further features in preferred embodiments of the invention described below, the statistical deviation calculator is operable to calculate a mean-square-error of a respective matrix element of the average intensity matrix.

According to still further features in the described preferred embodiments the first and the additional intensity thresholds are predetermined.

According to still further features in the described preferred embodiments the apparatus further comprises a histogram constructor, for constructing a first intensity histogram from the average intensity matrix and a second intensity histogram from the statistical deviation matrix.

According to still further features in the described preferred embodiments the apparatus further comprises, a fitter, for independently fitting each of the first and second intensity histograms to a sum of a plurality of localized functions; and an intensity threshold calculator for calculating the first and the additional intensity thresholds, using the plurality of localized functions, wherein the first intensity threshold is defined as an intersection point between two localized functions of the first intensity histogram, and the additional intensity threshold is defined as an intersection point between two localized functions of the second intensity histogram.

According to still further features in the described preferred embodiments the plurality of localized functions of the first intensity histogram comprises a first localized function, a second localized function and a third localized function, whereas the first intensity threshold equals an intersection point between the second localized function and the third localized function.

According to still further features in the described preferred embodiments the plurality of localized functions of the second intensity histogram comprises a first localized function, a second localized function and a third localized function, whereas the additional intensity threshold equals an intersection point between the first localized function and the second localized function.

According to yet an additional aspect of the present invention there is provided an apparatus for outlining at least one region in a set of images arranged grid-wise in a plurality of picture-elements, each image being represented by a plurality of intensity values over the grid and characterized by an intensity histogram, the apparatus comprising: a histogram constructor, for constructing a first intensity histogram characterizing the set of images; a fitter, for fitting the first intensity histogram to a sum of a plurality of localized functions; an intensity threshold calculator, for calculating at least one intensity threshold, each intensity threshold of the at least one intensity threshold being defined as an intersection point between two localized functions of the plurality of localized functions; a thresholding unit, for applying a thresholding procedure to the set of images in a Boolean manner using each intensity threshold of the at least one intensity threshold, such that at least one binary matrix having a plurality of binary-valued matrix-elements is constructed; and a clustering unit, for clustering each binary matrix of the at least one binary matrix, so as to obtain at least one cluster of matrix-elements having a predetermined polarity, the clustering unit being operable to mark picture-elements corresponding to at least a portion of matrix-elements enveloping the at least one cluster as outlining picture-elements.

According to still further features in the described preferred embodiments the apparatus further comprises an average calculator, for calculating a set-averaged intensity value for each picture-element, thereby to provide an average intensity matrix having a plurality of matrix-elements, wherein the histogram constructor is designed to construct the first intensity histogram using the average intensity matrix.

According to still further features in the described preferred embodiments the set of images forms a moving image. According to still further features in the described preferred embodiments the moving image comprises a cine image. According to still further features in the described preferred embodiments the cine image comprises an ultrasound cine-loop image. According to still further features in the described preferred embodiments the ultrasound cine-loop image comprises an echocardiograph cine-loop image.

According to still further features in the described preferred embodiments each localized function of the plurality of localized functions is independently selected from the group consisting of a Gaussian function, a Lorentzian function, a hyperbolic secant function, a logistic distribution, a Fourier transform and a wavelet transform.

According to still further features in the described preferred embodiments the plurality of localized functions comprises a first localized function, a second localized function and a third localized function.

According to still further features in the described preferred embodiments the apparatus further comprises electronic-calculation functionality for performing at least one morphological operation on the at least one binary matrix.

According to still further features in the described preferred embodiments the preprocessing unit is operable to remove clutter from at least one image of the set of images.

According to still further features in the described preferred embodiments the clustering unit comprises an origin definer for defining, for each region of the at least one region, an origin of the grid, the origin being defined as a central picture-element of the region.

According to still further features in the described preferred embodiments the clustering unit comprises a coordinate transformation unit for transforming the grid into a polar representation using the origin of the grid, the polar representation being represented by a radial matrix and a angular matrix.

According to still further features in the described preferred embodiments the clustering unit comprises a digitizer for digitizing the radial matrix and the angular matrix using a predetermined resolution.

According to still further features in the described preferred embodiments the set of images forms a cine-loop image of at least the left ventricle. According to still further features in the described preferred embodiments the at least one region comprises the left ventricle.

According to still further features in the described preferred embodiments the apparatus further comprises a preprocessing unit for performing at least one preprocessing operation on the set of images.

According to still further features in the described preferred embodiments the preprocessing unit is operable to remove, from each binary matrix of the at least one binary matrix, matrix-elements representing the papillary muscles. According to still further features in the described preferred embodiments the preprocessing unit is supplemented by an algorithm for performing a region-growing procedure.

According to still further features in the described preferred embodiments the preprocessing unit is operable to remove, from each binary matrix of the at least one binary matrix, matrix-elements representing cusps of the mitral valve.

According to still further features in the described preferred embodiments the apparatus further comprises an interpolation unit for assigning interpolated intensity values to non-valid or removed matrix-elements, the interpolation unit being operable to apply a set of temporal and spatial filters prior to the assignment so as to identify the non-valid picture-elements.

According to still further features in the described preferred embodiments the preprocessing unit comprises: an intensity value deviation calculator, for calculating, for each picture-element of the plurality of picture-elements of the grid, a deviation of an intensity value of the picture-element, and further wherein the matrix-elements representing the cusps of the mitral valve are correspond to picture-elements having a high deviation of intensity.

The present invention successfully addresses the shortcomings of the presently known configurations by providing methods and apparatus for processing and analyzing images having performances far exceeding the prior art.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 10a and 10d show the original end-diastolic (ED) and end-systolic (ES) frames, respectively, FIGS. 10b and 10e show, respectively, the ED and ES frames after applying conventional histogram equalization and rejection at threshold 38; and FIGS. 10c and 10f show, respectively, the ED and ES frames after applying the method according to a preferred embodiment of the present invention;

FIGS. 13a and 13d show the original ED and ES frames, respectively; FIGS. 13b and 13e show, respectively, the ED and ES frames after applying conventional histogram equalization and rejection at threshold 36; and FIGS. 13c and 13f show, respectively, the ED and ES frames after applying the method according to a preferred embodiment of the present invention;

FIGS. 16a and 16d show the original ED and ES frames, respectively; FIGS. 16b and 16e show, respectively, the ED and ES frames after applying conventional histogram equalization and rejection at threshold 36; and FIGS. 16c and 16f show, respectively, the ED and ES frames after applying the method according to a preferred embodiment of the present invention;

DESCRIPTION OF THE PREFERRED EMBODIMENTS

Figure 1:
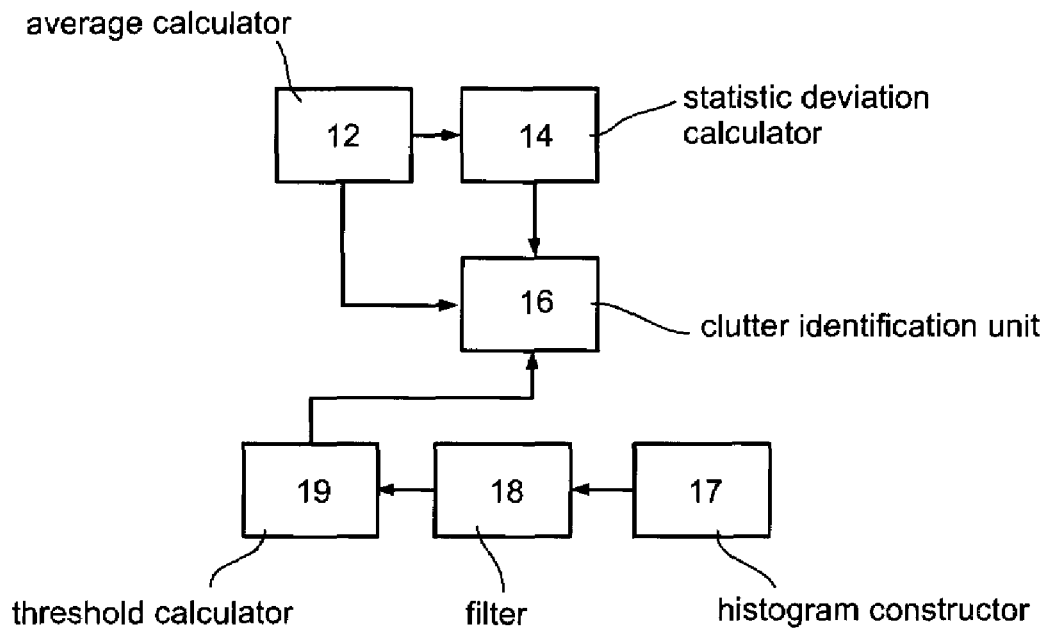
FIG. 1 is a schematic illustration of an apparatus for detecting clutter in a set of images, according to a preferred embodiment of the present invention.

The present invention is of methods and apparatus which can be used for analyzing and processing images. Specifically, the present invention can be used to analyze and improve the quality of still as well as moving images, including, without limitation, single-frame or cine-loop ultrasound images, obtained, e.g., during echocardiography.

The principles and operation of methods and apparatus according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided an apparatus 10 for detecting clutter in a set of images. The set of images can be, for example, an ordered set (a series) of images, in which case the set forms a moving image, such as, but not limited to, a cine image. More preferably the set of images forms an ultrasound cine-loop image, e.g., an echocardiograph cine-loop image. The set is preferably arranged grid-wise in a plurality of picture-elements, e.g., pixels, arrangements of pixels, and the like.

The term "pixel" is sometimes abbreviated herein to indicate a picture element. However, this is not intended to limit the meaning of the term "picture element" which refers to a unit of the composition of an image.

According to a preferred embodiment of the present invention the grid is a rectangular (e.g., Cartesian) grid, but this need not necessarily be the case, as other grids (triangular, polar, etc.) can be defined. The set of images is preferably represented by a plurality of intensity values (e.g., grey-levels) over the grid.

Referring now to the drawings, FIG. 1 is a schematic illustration of apparatus 10, which, according to various exemplary embodiments of the present invention, comprises an average calculator 12, a statistical deviation calculator 14 and a clutter identification unit 16, which is preferably in communication with calculators 12 and 14. Average calculator 12 calculates a set-averaged intensity value for each picture-element of the grid. The set-averaged intensity values are preferably represented as an intensity matrix, M, preferably defined as:

$$M(m, n) = \frac{1}{P} \sum_{p=1}^{P} F_p(m, n) \qquad \text{(EQ. 1)}$$

where, P denotes the size of the set, $F_p$ denotes the pth image of the set, and the pair (m,n) identifies the picture-element over the grid. Preferably (m,n) denotes the address of the picture-element (for a Cartesian grid, for example, (m,n) can represent the x-y location of the picture-element).

Statistical deviation calculator 14 calculates a statistical deviation for each picture-element over the set. According to a preferred embodiment of the present invention calculator 14 communicates with calculator 12. Similarly to the set-average above, the statistical deviations are preferably represented as an intensity matrix, O.

According to a preferred embodiment of the present invention the statistical deviations of the picture elements are proportional to their mean-square-errors with respect to the matrix-elements of M. Specifically, denoting the coefficient of proportionality by $\alpha$:

$$O(m, n) = \alpha \sqrt{\frac{1}{P} \sum_{p=1}^{P} [F_p(m, n) - M(m, n)]^2} \, . \qquad \text{(EQ. 2)}$$

Preferably, the value of $\alpha$ is selected such that each matrix-element of O is below the maximal allowed intensity value. For example, for an 8-bit grey-scale image, $\alpha$ can be selected such that $O(m,n) \leq 255$ for all matrix-elements of O.

Clutter identification unit 16 preferably determines, for each picture element, hence also for each matrix-element of the matrices M and O, whether M(m,n) is above a first intensity threshold, $T_M$, and whether O(m,n) is below an additional intensity threshold, $T_O$. According to a preferred embodiment of the present invention, (m,n) is marked as clutter picture-element if both conditions are fulfilled, i.e., $M(m,n) > T_M$ and $O(m,n) < T_O$.

The intensity thresholds $T_M$ and $T_O$ can be either predetermined (e.g., supplied by the user) or, more preferably, can be automatically determined by apparatus 10. Hence, while conceiving the present invention it has been hypothesized and while reducing the present invention to practice it has been realized that $T_M$ and $T_O$ can be found using the intensity histogram of the image. Specifically, the values of $T_M$ and $T_O$ can be found by determining the functional dependence of the intensity histogram, and extracting the values of $T_M$ and $T_O$ therefrom.

Thus, according to a preferred embodiment of the present invention apparatus 10 comprises a histogram constructor 17, for constructing a first intensity histogram, $H_M$, from the average intensity matrix, M, and a second intensity histogram, $H_O$, from the statistical deviation matrix, O. The intensity histograms can be in any form known in the art such as a graph showing the number of matrix-elements of the respective matrix at each different intensity value found in therein. Alternatively, the histograms may be in a numeric form, e.g., two-dimensional arrays in which pairs of numbers represent intensity values and their corresponding occupation numbers in the matrices.

In any event, once the intensity histograms are constructed, a mathematical procedure of fitting can be employed so as to determine their functional dependence from which $T_M$ and $T_O$, can be extracted. According to various exemplary embodiments of the present invention, apparatus 10 comprises a fitter 18 and an intensity threshold calculator 19, being in communication thereamongst. Fitter 18 preferably fits each intensity histogram to a sum (e.g., a weighted sum) of a plurality of localized functions, e.g., three localized functions.

As used herein "localized function" refers to any function having a local support and which is significantly suppressed far (say, at a distance of about 10 widths of the local support) from the local support. Representative examples of localized functions include, without limitation, a Gaussian function, a Lorentzian function, a hyperbolic secant function (also known as sech), a logistic distribution and the like. Additionally, the localized function can be represented as a series or an integral of other functions. For example, in this embodiment, the localized function can be a Fourier transform, a wavelet transform and the like.

Intensity threshold calculator 19 preferably uses the localized functions to calculate $T_M$ and $T_O$, and provides their value to unit 16. According to a preferred embodiment of the present invention $T_M$ and $T_O$ are defined as intersection points between two localized functions. For example, when $H_M$ is fitted to three localized functions, say, $G_1$, $G_2$ and $G_3$, $T_M$ can correspond to an intersection point between $G_2$ and $G_3$. Similarly, when $H_O$ is fitted to three localized functions, say, $g_1$, $g_2$ and $g_3$ (which are not necessarily different from $G_1$, $G_2$ and $G_3$), $T_O$ can correspond to an intersection point between $g_1$ and $g_2$.

Once the clutter picture-elements are identified, they can be removed from the image or, more preferably, be assigned with interpolated intensity values. A representative example of clutter removal procedure is provided hereinunder in the Examples section.

According to another aspect of the present invention there is provided an apparatus 20 for outlining at least one region in a set of images. The set of images can be of any of the aforementioned forms. Apparatus 20 is particularly useful for echocardiograph cine-loop image, in which case apparatus 20 can be used for outlining the left ventricle.

Outlining of the left ventricle has many advantages and potential uses. For example, the outline of the inner boundary of the left ventricle (the endocardial wall) can be used for evaluating the imaged plane area of the left ventricular cavity during the cardiac cycle. Such evaluation allows quantitative assessment of the left ventricle's volume as a function of time, hence also automatic calculation of basic parameters, such as ejection fraction and cardiac output [Lima et al., "Diagnostic Imaging in Clinical Cardiology," London: Martin Dunitz, pp. 2-6, 1998]. Furthermore, tracking the outline of the endocardial wall enables the estimation of local wall-motion velocity as a function of time, which is an indicator for muscle viability.

The outline of the outer boundary (epicardial wall) can be used for estimating the cardiac mass and for calculating local muscle-width per timeframe, which in turn can be used for detecting pathologic states such as Hypertrophy.

Figure 2:
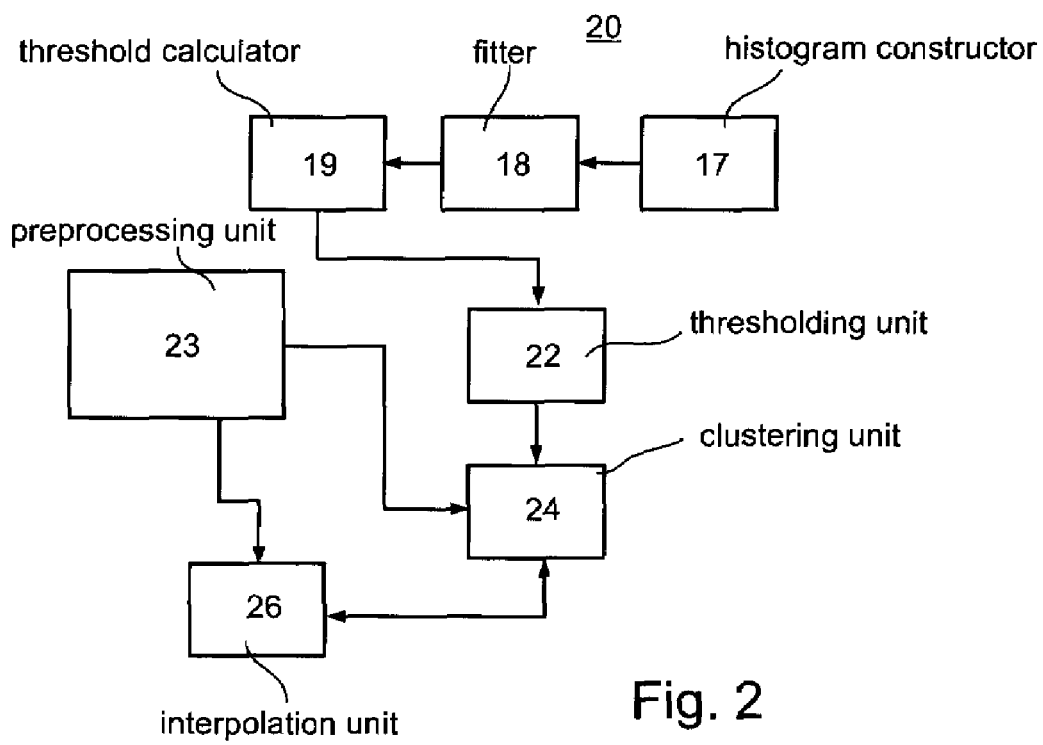
FIG. 2 is a schematic illustration of an apparatus for outlining at least one region in a set of images, according to a preferred embodiment of the present invention.

Reference is now made to FIG. 2, which is a schematic illustration of apparatus 20. Apparatus 20 preferably comprises a histogram constructor which may be for example, histogram constructor 17. The histogram constructor serves for constructing a first intensity histogram which characterizes the set of images. According to a preferred embodiment of the present invention the histogram constructor calculates $H_M$. Apparatus 20 preferably comprises a fitter, e.g., fitter 18, for fitting the first intensity histogram to a sum of a plurality of localized functions, and an intensity threshold calculator, e.g., threshold calculator 19, for calculating at least one intensity threshold using the localized functions. The intensity threshold(s) are preferably defined as intersection points between localized functions, as further detailed hereinabove. Each intensity threshold is preferably used for outlining a different region of the set or a different portion of the same region. For example, when the left ventricle is outlined, three localized functions, $G_1$, $G_2$ and $G_3$, and two thresholds, $T_1$ and $T_2$, are preferably used, whereby $T_1$ is used for outlining the endocardial wall and $T_2$ is used for outlining the epicardial wall. In this embodiment, $T_1$ preferably corresponds to the intersection point between $G_1$ and $G_2$, and $T_2$ preferably corresponds to the intersection point between $G_2$ and $G_3$.

According to a preferred embodiment of the present invention apparatus 20 further comprises a thresholding unit 22, for applying a thresholding procedure to the set of images. The thresholding is preferably applied for each intensity threshold of at least one intensity threshold. Additionally, the thresholding is preferably applied in a Boolean manner, such that one or more binary matrices having a plurality of binary-valued are constructed. For example, when two thresholds, $T_1$ and $T_2$ are used, two binary matrices, $B^p_1$ and $B^p_2$ can be constructed for each image, p, as follows:

$$B_1^p(m,n)=[F_p(m,n)>T_1]$$

$$B_2^p(m,n)=[F_p(m,n)>T_2]. \quad \text{(EQ. 3)}$$

Once constructed, the binary matrices are preferably smoothed, for example, by applying one or more morphological operations, such as opening and closing [to this effect see R. C. Gonzalez and R. W. Woods, "Digital Image Processing", pp. 518-548, Addison-Wesley Publishing Company, 1992]. Broadly speaking, morphological operation involved the passing of a convolution kernel, also known as the structuring element, over the binary matrices, and, based upon the convolution between the structuring element and the binary matrix, determining whether or not to change the polarity of a particular matrix-element. The morphological opening operation generally eliminates thin protrusions, smoothes outward bumps and breaks narrow sections of the matrix. The morphological closing operation generally eliminates small holes and removes inward bumps.

In various exemplary embodiments of the present invention apparatus 20 further comprises a clustering unit 24. Clustering unit 24 clusters each binary matrix to obtain at least one cluster of matrix-elements of a predetermined polarity. For example, if the binary-valued matrix-elements of the binary matrices can assume 0's and 1's clustering unit 24 can obtain a cluster of, say, 1's. According to a preferred embodiment of the present invention picture-elements of the set which correspond to matrix-elements enveloping the cluster(s) are marked as outlining picture-elements. The outlining picture-elements can thereafter be emphasized on each image of the set, e.g., using a different color or grey-level so as to distinguish them from other picture-elements.

Figure 3:
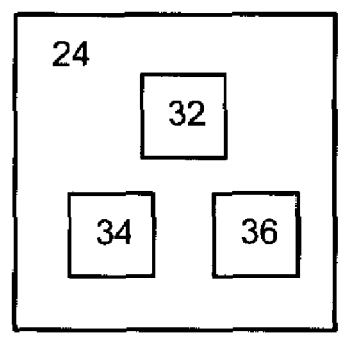
FIG. 3 is a schematic illustration of a clustering unit, according to a preferred embodiment of the present invention.

Reference is now made to FIG. 3, which is a schematic illustration of clustering unit 24, according to a preferred embodiment of the present invention. Hence, clustering unit 24 preferably comprises an origin definer 32 for defining a central picture-element of a region, interchangeably referred to hereinafter as origin. The definition of the origin can also be automatic or can be inputted from an external source, e.g., supplied by the user. Additionally, the definition of the origin can be a combination of inputting and automatic definition, whereby the input is treated as a preliminary origin which is used for calculating the central picture-element. According to a preferred embodiment of the present invention, the definition of the origin is performed once on the average intensity matrix, M, and subsequently used for all the images in the set.

Clustering unit 24 preferably comprises a coordinate transformation unit 34 for transforming the grid of the images into a polar representation using the origin. As will be appreciated by one ordinarily skilled in the art, the polar representation of each image, intensity matrix or binary matrix can comprise a radial matrix, R, storing the distance of a respective picture- or matrix-element from the origin, and an angular matrix, θ, storing the angle of a respective picture- or matrix-element relative to the one of the axes of the original coordinate system. According to a preferred embodiment of the present invention clustering unit 24 further comprises a digitizer 36 which digitizes the matrices R and θ, in accordance with the to the required axial and lateral resolution.

The use of polar representation facilitates the clustering of the images. Specifically, the clustering can be done by traversing the matrices on a radial direction, e.g., from the origin outwards, and determining, for each angle stored in θ, when the polarity of the matrix element is inverted. For example, supposing that the matrix-elements corresponding to the background of the image are assigned with zeroes, while non-background matrix-elements are assigned with non-zeroes. Then, for a given angle, clustering unit 24 traverses the radial direction, locates the first non-zero matrix element and marks the corresponding picture-element as an outlining picture-element of the inner boundary of the region. Continuing the traverse along the radial direction, clustering unit 24 preferably locate the next zero element and marks the corresponding picture-element as an outlining picture-element. This procedure can be repeated for all angles stored in θ, such that the inner and/or outer boundary of the region is outlined.

The outlining of the region can be preceded by one or more preprocessing operations, for improving the efficiency of the clustering procedure, minimizing misclassifications and/or improving the quality of the images. Thus, according to a preferred embodiment of the present invention, apparatus 20 comprises a preprocessing unit 23, for performing at least one preprocessing operation. Many preprocessing operations and combination thereof are contemplated, representative examples include, without limitation, removal, replacement and interpolation of picture-elements, either temporarily, e.g., for improving the efficiency of the clustering process, or permanently, e.g., for improving the quality of the resulting image.

Typically, the preprocessing is directed at handling picture-elements identified as storing no or irrelevant information. Such picture-elements can include, without limitation, clutter picture-elements and picture-element identified as not belonging to the outlined region. For example, when apparatus 20 is used for outlining the left ventricle in an ultrasound image, picture-elements corresponding to the papillary muscles can obstruct the processing procedure, because the papillary muscles oftentimes appear on the ultrasound image as high-intensity regions within the left ventricular cavity, hence may lead to misclassification of the corresponding picture-elements. Additionally, picture-elements corresponding to the base of the mitral valve can contribute to discontinuity in the appearance of the boundary.

Hence, one operation which can be performed by preprocessing unit 23 is clutter removal. Specifically, preprocessing unit preferably identifies and removes clutter picture-elements from all or a few images of the set. This operation can be achieved by associating preprocessing unit 23 with apparatus 10.

Another operation which can be performed by preprocessing unit 23 is the removal of matrix-elements representing the papillary muscles. According to a preferred embodiment of the present invention the identification of papillary muscles is done by applying the thresholds $T_1$ and $T_2$ on the average intensity matrix, M, in a Boolean manner to construct two (average) binary matrices, $B_1$ and $B_2$, and performing a region-growing procedure on $B_1$ and $B_2$. Region-growing techniques are known in the art and are found, e.g., in an article by S. W. Zucker, entitled "Region Growing: Childhood and Adolescence," published in Computer Graphics and Image Processing, vol. 5, pp. 382-399, 1976. A detailed example for the identification and removal of matrix-elements corresponding to papillary muscles is provided in the Examples section that follows.

An additional operation which can be performed by preprocessing unit 23 is the removal of matrix-elements representing cusps of the mitral valve. The identification of these matrix-elements is preferably based on the intensity value deviation, D, of the corresponding picture-elements. Specifically, matrix-elements representing cusps of the mitral valve preferably correspond to picture-elements having a high deviation of intensity. The deviation of intensity for the pth image is preferably calculated using the average intensity matrix, M, as follows:

$$D(m, n) = \frac{|F_p(m, n) - M(m, n)|}{M(m, n)}.$$ (EQ. 4)

The present embodiments thus successfully handle the appearance of picture-elements corresponding to no or irrelevant information by removing them from the image, and, optionally and preferably, assigning them with, e.g., interpolated intensity values, prior to the clustering procedure.

Optionally and preferably, apparatus 20 further comprises an interpolation unit 26 for assigning interpolated intensity values to non-valid matrix-elements. Such non-valid matrix-elements can correspond, e.g., to clutter, papillary muscles, cusps of the mitral valve or any other type of information, for which interpolation is needed. For example, a set of temporal and spatial filters can be used to identify non-valid matrix-elements. As further demonstrated in the Examples section that follows, the interpolation is particularly useful for improving the calculated outlines of the region. For example, the interpolation can be used for handling non-valid or incorrect estimates of the outline location in different regions of different frames.

According to an additional aspect of the present invention there is provided an apparatus 40, for improving an image or a set of images. Apparatus 40 can be used for improving one image, a set of images or a plurality of sets of images. For example, apparatus 40 can be used in analysis of echocardiograph procedure of different patients or different echocardiograph procedures of the same patient, whereby for each cine-loop, the analysis is independent of the other cine-loops. The advantage of this embodiment is that apparatus 40 automatically tailors a histogram transformation to each specific cine-loop, of each patient.

Figure 4:
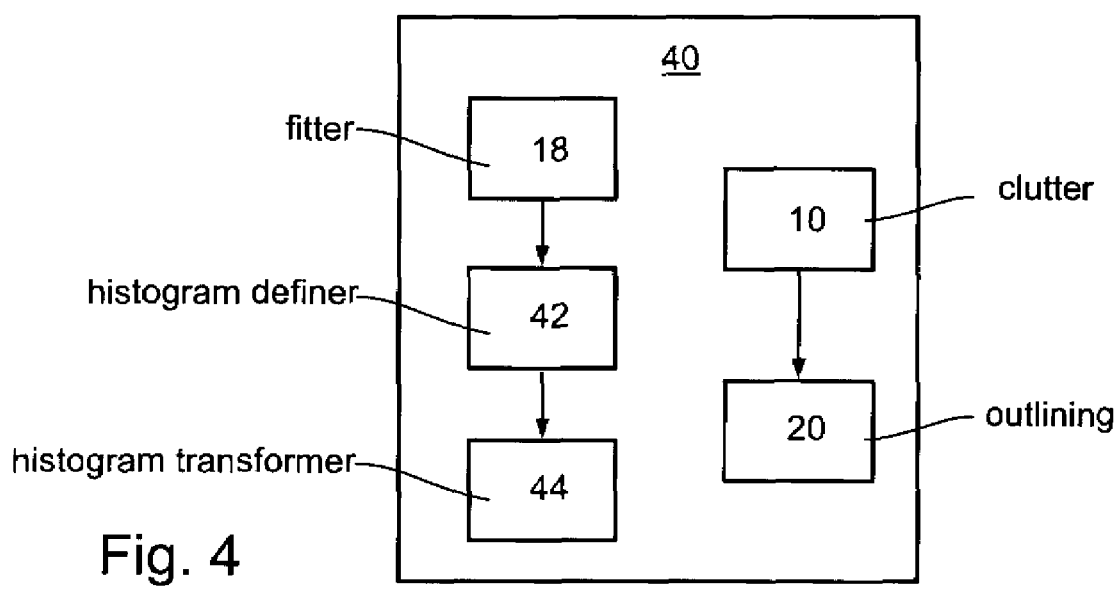
FIG. 4 is a schematic illustration of an apparatus for improving an image or a set of images, according to a preferred embodiment of the present invention.

Reference is now made to FIG. 4 which is a schematic illustration of apparatus 40. Apparatus 40 preferably comprises a fitter, e.g., fitter 18, for fitting an intensity histogram, H, to a sum of a plurality of localized functions, as further detailed herein above. H can be either the intensity histogram of the image or an intensity histogram representing the set of images, e.g., $H_M$, the intensity histogram of the average intensity matrix, M. Apparatus 40 further comprises a histogram definer 42, which uses the localized functions for defining a plurality of localized intensity histograms, denoted $H_i$, where i is an integer running from 1 to the number of localized intensity histograms. Typically, but not obligatory, three localized intensity histograms are defined.

According to a preferred embodiment of the present invention each localized intensity histogram is characterized by an intensity range defined using intersection points between two localized functions. For example, suppose that H(u) is fitted to the sum of three localized functions, $G_1$, $G_2$ and $G_3$, whereby $G_1$ intersects with $G_2$ at $u=T_1$ and $G_2$ intersects with $G_3$ at $u=T_2$, where $T_2>T_1$. Suppose further than the intensity range of H(u) is from $u=u_{min}$ to $u=u_{max}$ (for 8-bit image $u_{min}$ can be 0 and $u_{max}$ can be 255). Then, according to a preferred embodiment of the present invention histogram definer 42 defines three localized intensity histograms, $H_1$, $H_2$ and $H_3$, such that $H_1$ spans from a minimal intensity value of $u_{min}$ to a maximal intensity value of $T_1$; $H_2$ spans from a minimal intensity value of $T_1+1$ to a maximal intensity value of $T_2$; and $H_3$ spans from a minimal intensity value of $T_2+1$ to a maximal intensity value of $u_{max}$. Each localized intensity histogram can be padded by zeroes if desired.

Apparatus 40 further comprises a histogram transformer 44 which enhances to each localized intensity histogram, $H_i$, and combines the resultant, improved, localized intensity histogram into a single histogram. The enhancement of the $H_i$ is preferably selected so as to enlarge a relative portion of a high-intensity region of the original intensity histogram, H. This can be done by any technique known in the art, such as, but not limited to, histogram equalization, histogram specification and the like. When is three localized intensity histogram are defined, $H_1$ and $H_2$ are preferably subjected to histogram equalization and $H_3$ is preferably subjected to histogram specification.

Prior to the combining of the $H_i$'s they can be subjected to further operations such as reduction or expansion. More specifically, the range of $H_1$ is preferably reduced by a predetermined reduction factor, $\alpha_1$, while the range of $H_2$ is preferably expanded by a predetermined expansion factor $\alpha_2$. As will be appreciated by one of ordinary skill in the art, once the reduction or expansion are performed, the intensity ranges of the $H_i$'s no longer coincide with the intersection points between the localized functions.

Optionally and preferably, one or more of the $H_i$'s can be spread over its respective range, whether or not this range was subjected to reduction or expansion. Preferably, for three $H_i$'s, a linear spreading is employed on the intensity ranges of $H_1$ and $H_2$ while a non-linear spreading, e.g., (quadratic) spread is employed on the intensity ranges of $H_3$.

According to a preferred embodiment of the present invention, once the $H_i$'s are combined, transformer 44 applies a low-pass filter (e.g., a binomial filter or a Gaussian filter) on at least a portion of the resulting intensity histogram. The low-past filter is preferably employed near the intersecting points between the localized functions so as to minimize information loss.

When used for improving a set of images or a plurality of sets of images, apparatus 40 can include or be associated with apparatus 10 and/or apparatus 20, so as to remove clutter and/or outline a particular region in the set(s). For example, when it is desired to perform analysis of one or more ultrasound cine-loops of the left ventricle, apparatus 40 can comprise apparatus 10 and apparatus 20. In this embodiment, apparatus 40, preferably eliminates clutter, outlines the endocardial and/or epicardial walls, and transforms the histograms of each image so as to provide the physician with an improved, substantially clutter-free cine-loop, vividly designating the left ventricle.

It is expected that during the life of this patent many relevant imaging techniques will be developed and the scope of the term set of images is intended to include all such new technologies a priori.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Adaptive Transformation of Intensity Histogram

The teachings of the present embodiments were employed for performing adaptive transformation of intensity histograms. As further demonstrated below, the application of the teachings of the present embodiments significantly improves the quality of the Echocardiograph images.

Materials and Methods

Theoretical Background

The processing of the images was based on the fitting of the gray-level histogram curve to a sum of three Gaussians, $G_1$, $G_2$ and $G_3$, representing different regions in the image. $G_1$ represented the left ventricular cavity (low intensity Gaussian), $G_2$ represented low-intensity pixels within the cardiac muscle (medium intensity Gaussian), and $G_3$ represented high-intensity pixels within the cardiac muscle (high intensity Gaussian).

Figure 5:
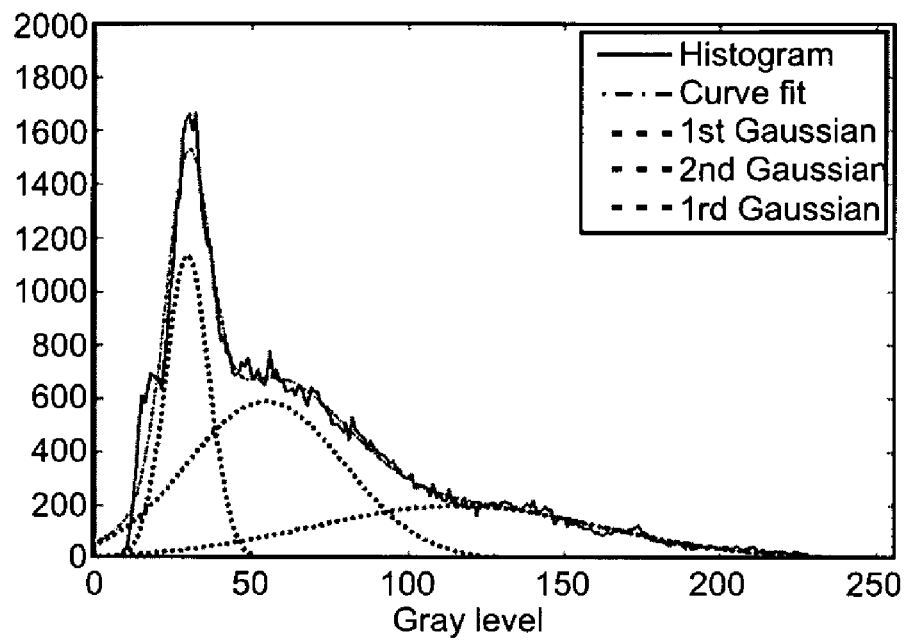
FIG. 5 shows a three Gaussians fit, performed according to a preferred embodiment of the present invention to a cine-loop containing a single cardiac cycle at a heart rate of 65 beats/min, referred to herein after as case 1.1.

FIG. 5 shows a gray-level histogram of a cine-loop, referred to hereinafter as case 1.1, which is fitted to three Gaussians. In FIG. 5, the solid line correspond to the original histogram, the dash-dotted line correspond to the sum of the three Gaussian, and the dotted lines correspond to the individual Gaussian $G_1$, $G_2$ and $G_3$.

The histogram was then divided into three localized histograms, each dominated by a different Gaussian. In order to achieve maximal separation, the division points, $T_1$ and $T_2$, were set at the intersection points between adjacent Gaussian functions. In the case 1.1, the division points were 38 and 92, on a scale between 1 and 256.

Figure 6:
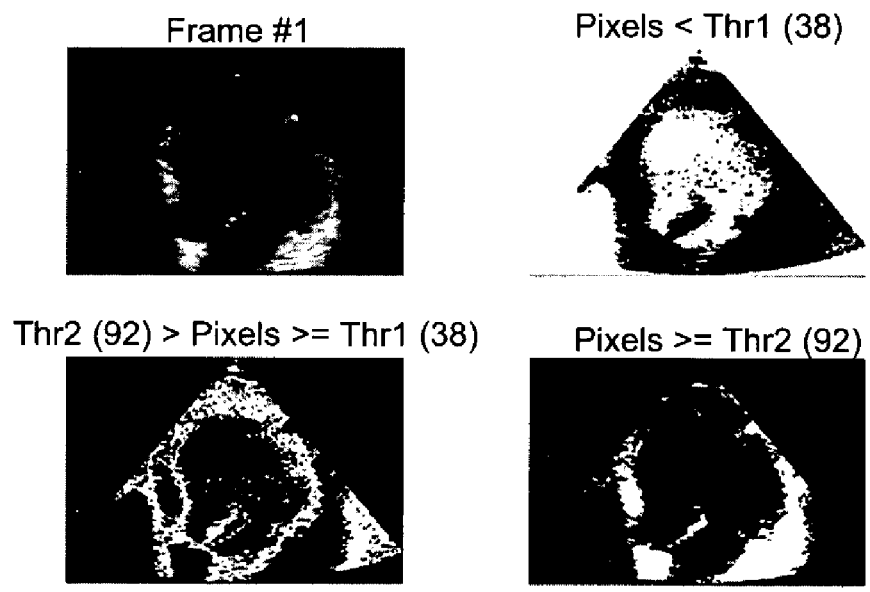
FIG. 6 shows a division of the histogram of the first frame of case 1.1, according to a preferred embodiment of the present invention.

FIG. 6 shows the division of the histogram of the first frame of case 1.1. The original image appears on the top left. Pixels whose gray level is lower than $T_1$ (38 in this case) appear in white on the top right. Pixels whose gray level is between $T_1$ and $T_2$ (92) appear in white on the bottom left. Pixels whose gray level exceeds $T_2$ are shown on the bottom right.

For the purpose of measuring the separation, the following parameters have been defined:

$$P_{fa}^1 = \frac{\int_{T_1}^{\infty} G_1(u)\,du}{\int_{-\infty}^{\infty} G_1(u)\,du} \quad \text{(EQ. 5)}$$

$$P_{d}^1 = \frac{\int_{T_1}^{\infty} [G_2(u) + G_3(u)]\,du}{\int_{-\infty}^{\infty} [G_2(u) + G_3(u)]\,du} \quad \text{(EQ. 6)}$$

$$P_{fa}^2 = \frac{\int_{T_2}^{\infty} [G_1(u) + G_2(u)]\,du}{\int_{-\infty}^{\infty} [G_1(u) + G_2(u)]\,du} \quad \text{(EQ. 7)}$$

-continued $$P_d^2 = \frac{\int_{T_2}^{\infty} G_3(u)\,du}{\int_{-\infty}^{\infty} G_3(u)\,du} \quad \text{(EQ. 8)}$$

$P_d^i$ (i=1, 2) are detection probabilities which measure the probability for a pixel whose intensity exceeds $T_i$ to belong to the expected Gaussian function ($G_2$ or $G_3$ for i=1, $G_3$ for i=2). $P_{fa}^i$ (i=1, 2) are false-alarm probabilities which measure the probability for a pixel whose intensity exceeds $T_i$ to belong to the incorrect Gaussian function ($G_1$ for i=1, $G_1$ or $G_2$ for i=2). Ideal separation is achieved when $P_d^1 = P_d^2 = 1.0$ and $P_{fa}^1 = P_{fa}^2 = 0.0$.

In most cases, the information in the left ventricular cavity (the first histogram region) has little diagnostic use, while the majority of the relevant data resides within the cardiac muscle (including the second and third regions). The second region encloses many or most of the pixels (in the example shown in FIG. 6, 33.7% of the pixels belong to the first section, 42.3% belong to the second section and 24.0% belong to the third section), but tends to utilize only a small portion of the gray-level scale. Therefore, a compression was employed to the first localized histogram, while a stretching was employed to the second localized histogram. In addition, histogram specification [Jain A K, "Fundamentals of Digital Image Processing", New Jersey: Prentice Hall, pp. 241-244, 1989] was applied to each localized histogram separately, so as to improve image quality.

Image Processing

While examining the raw data, it was observed that the calculated division points change only slightly between adjacent frames of the cine-loop. Therefore, to this end the calculation was performed on a single histogram for the entire cine-loop. This calculation has the advantage of decreasing the probability for receiving singular gray-level distributions.

Figure 7:
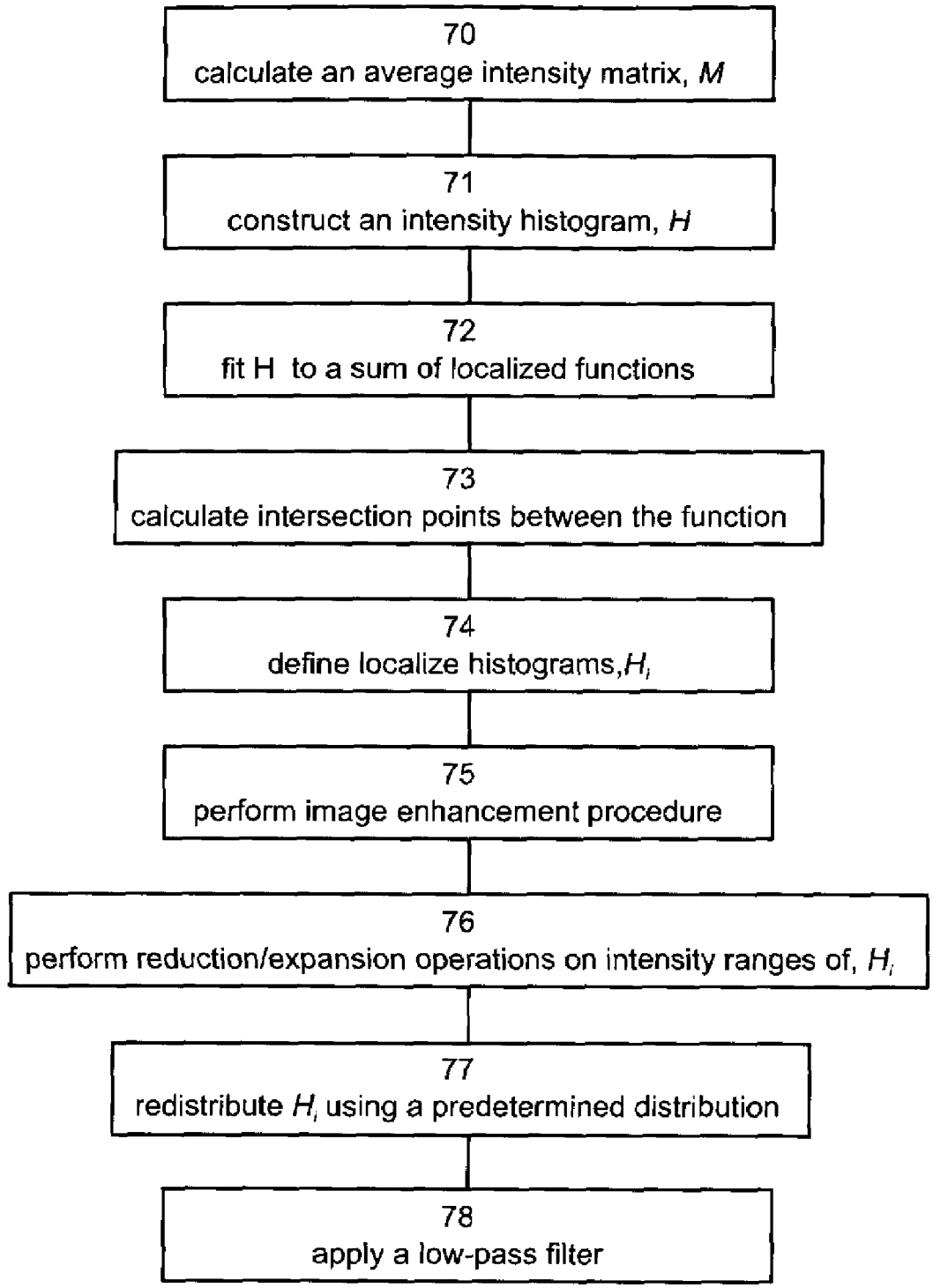
FIG. 7 is a flowchart diagram of a method of improving an image, according to a preferred embodiment of the present invention.

Reference is now made to FIG. 7, which is a flowchart diagram of a method of improving an image, according to a preferred embodiment of the present invention. A description of the specific steps employed in the present examples accompanies the general description of the method.

It is to be understood that, unless otherwise defined, the method steps described hereinbelow can be executed either contemporaneously or sequentially in many combinations or orders of execution. Specifically, the ordering of the flowchart of FIG. 7 is not to be considered as limiting. For example, two or more method steps, appearing in the following description or in the flowchart of FIG. 7 in a particular order, can be executed in a different order (e.g., a reverse order) or substantially contemporaneously.

Referring now to FIG. 7, the method preferably begins at Step 70 in which a set-average intensity value is calculated for each picture-element (a pixel in the present example) to provide the average intensity matrix, M (see Equation 1). According to a preferred embodiment of the present invention the averaging is performed to at least a single cardiac cycle. In Step 71, H(u), the intensity histogram of M, is preferably constructed. In Step 72, H is preferably fitted to a sum of localized function. In the present example, the following localized functions were used:

$$G_1(x) = \beta_1 \exp\left(-\frac{(x-\beta_2)^2}{\beta_3}\right) \quad \text{(EQ. 9)}$$

-continued $$G_2(x) = \beta_4 \exp\left(-\frac{(x-\beta_5)^2}{\beta_6}\right)$$

$$G_3(x) = \beta_7 \exp\left(-\frac{(x-\beta_8)^2}{\beta_9}\right)$$

$$y = G_1(x) + G_2(x) + G_3(x)$$

In Step 73 the intersection points, $T_1$ and $T_2$ between the localized functions are preferably calculated, and in Step 74 localized histograms are defined. In the present example, the following localized histograms were defined:

$$H_1(u) = \begin{cases} H(u) & u < T_1 \\ 0 & \text{else} \end{cases} \quad \text{(EQ. 10)}$$

$$H_2(u) = \begin{cases} H(u) & T_2 > u \geq T_1 \\ 0 & \text{else} \end{cases}$$

$$H_3(u) = \begin{cases} H(u) & u \geq T_2 \\ 0 & \text{else} \end{cases}$$

Once the localized histograms are defined, the method proceeds to Step 75 in which the localized histograms are subjected to an image enhancement procedure. In the present example, $H_1(u)$ and $H_2(u)$ underwent histogram equalization, in a manner such that each localized histogram uniformly utilized the entire gray-level range. The histogram equalization of $H_1(u)$ and $H_2(u)$ was represented as look-up tables (LUTs), respectively denoted by $L_1(u)$ and $L_2(u)$. Further in the present example, $H_3(u)$ underwent histogram specification, described as a LUT denoted by $L_3(u)$.

The histogram specification was designed to produce a histogram which substantially matches the following function:

$$f(x) = \begin{cases} \beta_1 & x < \beta_2 \\ \beta_1 \exp\left(-\frac{(x-\beta_2)^2}{\beta_3}\right) & x \geq \beta_2, \end{cases} \quad \text{(EQ. 11)}$$

where $\beta_1$, $\beta_2$ and $\beta_3$ are constants, and f(x) was normalized to a unit area. As can be understood from Equation 11, f(x) is a constant up-to $\beta_2$ and matches a right half of a Gaussian thereafter. The reason of using this process on $H_3(u)$ (rather that histogram equalization), was to reduce the weight of high-intensity pixels, whose presence may cause the image to seem saturated.

In Step 76, one or more of the localized histograms is preferably subjected to a range reduction or expansion. In the present example, the range of $H_1$ was reduced by a factor $\alpha_1$ and $H_2$ was expanded by a factor $\alpha_2$. It was found that the selection $\alpha_1 = 2.0$ and $\alpha_2 = 1.75$ was sufficient to provide satisfactory results. Once reduction/expansion operations were performed, the divisional points between $H_1$, $H_2$ and $H_3$ were:

$$C_1 = \left\lfloor \frac{T_1}{\alpha_1} \right\rfloor \quad \text{(EQ. 12)}$$

$$C_2 = C_1 + \lfloor \alpha_2(T_2 - T_1) \rfloor,$$

where $C_1$ denotes the divisional point between $H_1$ and $H_2$, and $C_2$ denotes the divisional point between $H_2$ and $H_3$. In Equation 12, the symbol $\lfloor \ldots \rfloor$ denotes the integer function "floor".

In Step 77, the localized histograms are redistributed using a predetermined distribution procedure. In the present example, the redistribution is done using a set of LUTs as follows: a first LUT, $Lc_1(u)$, linearly spreads the gray-levels between a minimal value (1) and $C_1$, a second LUT, $Lc_2(u)$, linearly spreads the gray-levels between ($C_1$+1) and $C_2$, and a third LUT, $Lc_3(u)$, quadratically spreads the gray-levels between ($C_2$+1) and the maximal value (256). The quadratic distribution was characterized by a decreasing derivative with respect to the intensity. The composite LUT for each localized histogram was then calculated as follows:

$$L_{1c1}(u) = L_{c1}(L_1(u))$$

$$L_{2c2}(u) = L_{c2}(L_2(u))$$

$$L_{3c3}(u) = L_{c3}(L_3(u)) \quad \text{(EQ. 13)}$$

In Step 78 the localized histograms are combined to a single, improved, histogram. Specifically to the present example, an improved LUT, denoted L(u), was obtained by stitching the three composite LUTs together:

$$L(u) = \begin{cases} L_{1c1}(u) & u < T_1 \\ L_{2c2}(u) & T_2 > u \geq T_1 \\ L_{3c3}(u) & u \geq T_2 \end{cases} \quad \text{(EQ. 14)}$$

In Step 79, a low-pass filter is applied for at least a portion of the intensity range so as to produce a continuous transformation to the histogram. In the present example, a binomial low-pass filter was used in intensity intervals which are close to intersecting points $T_1$ and $T_2$:

$$L(u \in [T_1 - \gamma, T_1 + \gamma]) = L_s(u \in [T_1 - \gamma, T_1 + \gamma]) \quad \text{(EQ. 15)}$$
$$L(u \in [T_2 - \gamma, T_2 + \gamma]) = L_s(u \in [T_2 - \gamma, T_2 + \gamma]),$$

where $$L_s(u) = L(u) * \frac{1}{64}[1 \; 6 \; 15 \; 20 \; 15 \; 6 \; 1], \quad \text{(EQ. 16)}$$

and $\gamma$ is a constant, selected to be 4.

Figure 8:
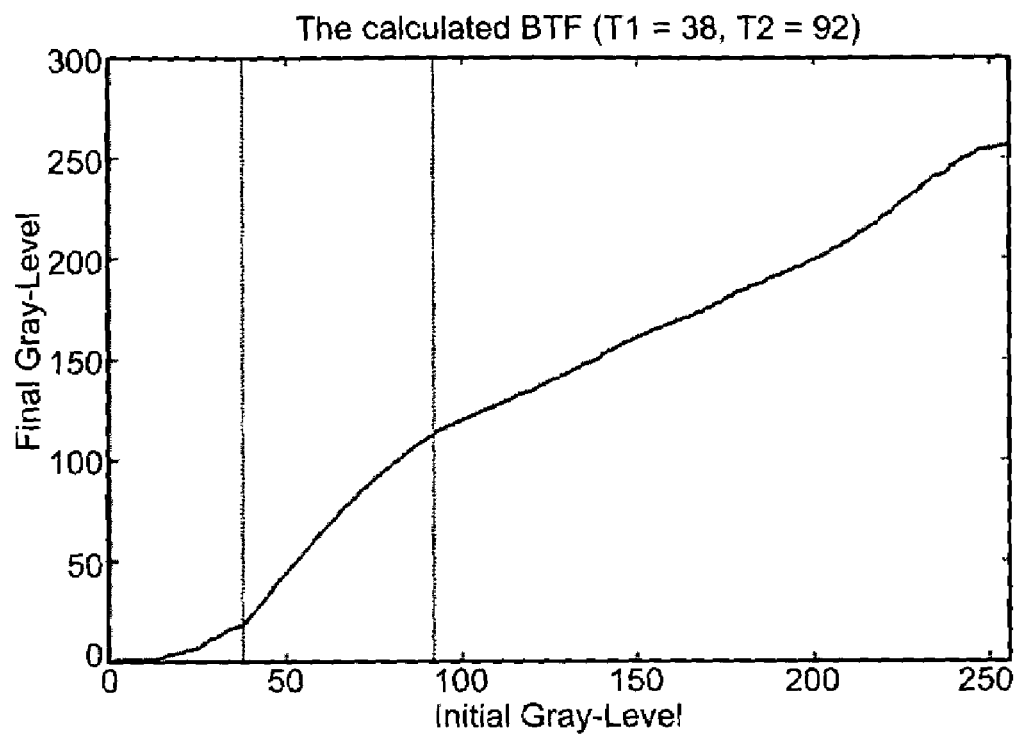
FIG. 8 shows a look up table calculated for case 1.1, according to a preferred embodiment of the present invention.

FIG. 8 shows L(u), calculated for Case 1.1. The values of $T_1$ and $T_2$ are marked by dotted lines.

Figure 9:
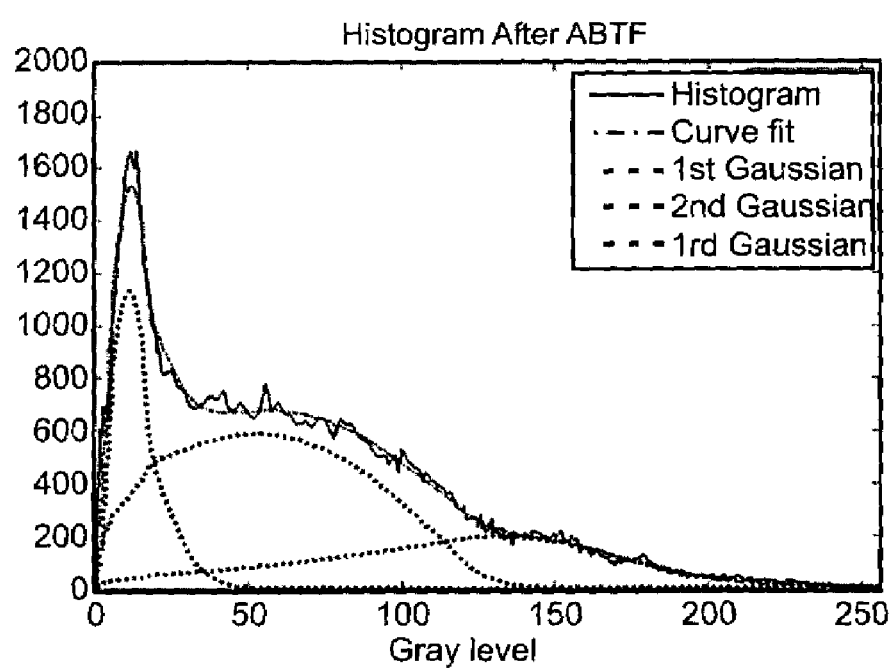
FIG. 9 shows the result of applying the look up table of FIG. 8 to the gray-level histogram and to each of its three Gaussian components, according to a preferred embodiment of the present invention.

FIG. 9 shows the result of applying L(u) to the gray-level histogram and to each of its Gaussian components, $G_1$, $G_2$ and $G_3$. Comparison between FIG. 5 (the original gray-level histogram of case 1.1) and FIG. 9 visually demonstrates the processing required for the algorithm. The first section has been compressed, while the second section has been stretched. Additionally, as a result of applying histogram equalization/specification to each section, the three components of the new gray-level histogram are asymmetric functions, as opposed to the Gaussian functions in the original case. Since the compression and stretching are applied to sections of the histogram rather than to the Gaussian functions themselves, these functions also change their form at $C_1$ and $C_2$.

Note that the abovementioned similarity in the gray-level histograms of different frames within the cine-loop can be used to deal with long cine-loops: the method of the present embodiments can be calculated for the first cardiac cycle, and subsequently applied on-line to other cardiac cycles.

Data Acquisition 23 randomly selected cine-loops of echocardiograph images of 10 different patients were used. All cine-loops were in apical four-chamber and apical two-chamber views. The data has been collected using a Vivid™ 3 imaging platform, by GE Medical Systems Ultrasound.

For each loop, both the teachings of the present embodiments and conventional histogram equalization combined with rejection were employed. Final parameter optimization was based on expert opinion of renowned cardiologists and echocardiography specialists.

Results

Table 1 below presents the values of the detection probabilities ($P_d^1$, $P_d^2$) and the false-alarm probabilities ($P_{fa}^1$, $P_{fa}^2$, $P_{fa}^1$ and $P_{fa}^2$), for the 23 cine-loops, referred to as cases 1.1-1.23.

TABLE 1

| Case No. | $P_d^1$ | $P_{fa}^1$ | $P_d^2$ | $P_{fa}^2$ |
| --- | --- | --- | --- | --- |
| 1.1 | 0.823 | 0.076 | 0.689 | 0.039 |
| 1.2 | 0.891 | 0.054 | 0.734 | 0.033 |
| 1.3 | 0.894 | 0.055 | 0.733 | 0.032 |
| 1.4 | 0.853 | 0.047 | 0.666 | 0.033 |
| 1.5 | 0.858 | 0.047 | 0.664 | 0.030 |
| 1.6 | 0.882 | 0.050 | 0.721 | 0.036 |
| 1.7 | 0.887 | 0.053 | 0.719 | 0.035 |
| 1.8 | 0.883 | 0.051 | 0.722 | 0.036 |
| 1.9 | 0.887 | 0.053 | 0.719 | 0.035 |
| 1.10 | 0.898 | 0.297 | 0.726 | 0.054 |
| 1.11 | 0.845 | 0.154 | 0.770 | 0.044 |
| 1.12 | 0.857 | 0.197 | 0.776 | 0.051 |
| 1.13 | 0.926 | 0.250 | 0.812 | 0.065 |
| 1.14 | 0.859 | 0.194 | 0.777 | 0.050 |
| 1.15 | 0.856 | 0.190 | 0.776 | 0.048 |
| 1.16 | 0.869 | 0.196 | 0.763 | 0.021 |
| 1.17 | 0.874 | 0.106 | 0.681 | 0.033 |
| 1.18 | 0.864 | 0.051 | 0.840 | 0.107 |
| 1.19 | 0.874 | 0.048 | 0.732 | 0.047 |
| 1.20 | 0.894 | 0.083 | 0.812 | 0.079 |
| 1.21 | 0.905 | 0.120 | 0.847 | 0.024 |
| 1.22 | 0.801 | 0.237 | 0.623 | 0.037 |
| 1.23 | 0.858 | 0.144 | 0.722 | 0.034 |
| Mean | 0.871 | 0.119 | 0.740 | 0.044 |
| Std | 0.027 | 0.079 | 0.056 | 0.019 |

As shown in Table 1, the values of the detection probabilities are large (mean values of 0.871±0.027 for $T_1$ and 0.74±0.056 for $T_2$) while the values of the false-alarm probabilities are low (0.119±0.079 and 0.044±0.019) demonstrating that the intensity histogram was highly correlated with the sum of three Gaussians.

Figure 16A:
FIGS. 16a-f show ultrasound images of a cine-loop containing a single cardiac cycle at a heart rate of 67 beats/min referred to herein as case 1.21, where
Figure 16D:
Figure 16B:
Figure 16E:
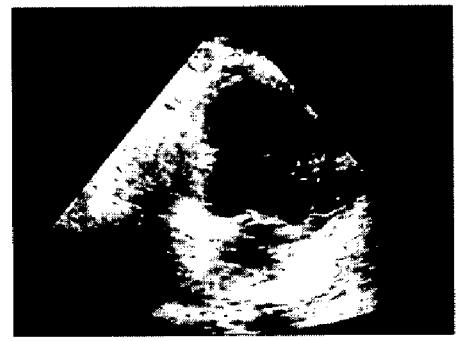
Figure 16C:
Figure 16F:
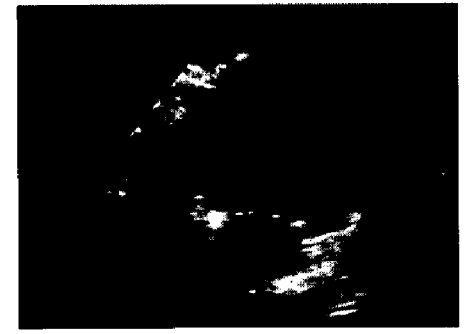
Figure 17:
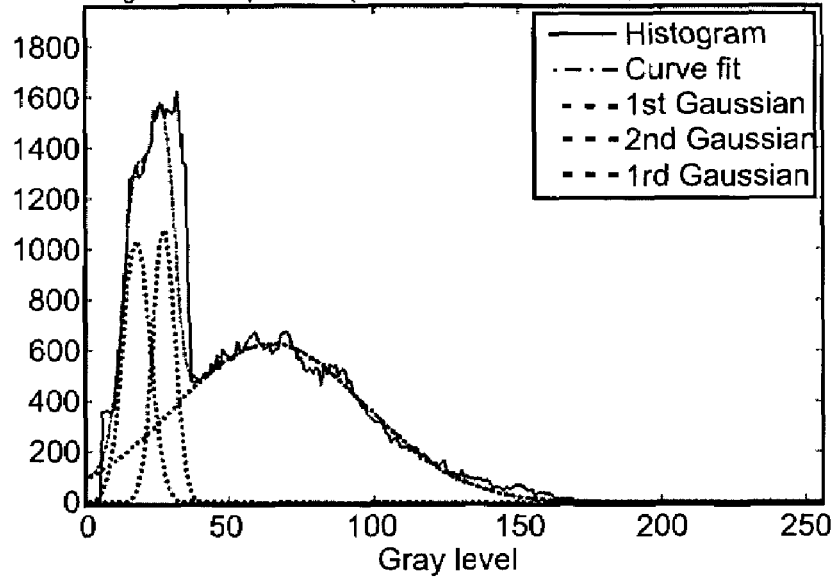
FIG. 17 is a graph demonstrating the processing of case 1.21, according to a preferred embodiment of the present invention.
Figure 18:
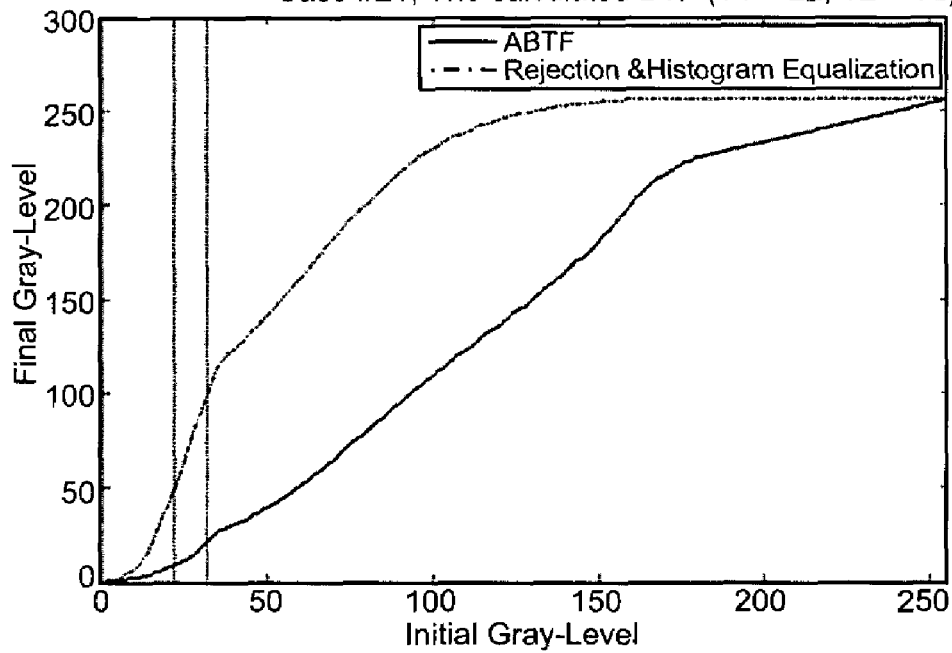
FIG. 18 is a comparison between prior art look up tables and look up tables calculated for case 1.21 according to a preferred embodiment of the present invention.

FIGS. 10-18 show results for three representative cine-loops: case 1.1 (FIGS. 10-12) case 1.15 (FIGS. 13-15) and case 1.21 (FIGS. 16-18). These cine-loops are characterized by high, medium and low image quality, respectively. Case 1.1 contained a single cardiac cycle at a heart rate of 65 beats/min, case 1.15 contained a single cardiac cycle at a heart rate of 71 beats/min, and case 1.21 contained a single cardiac cycle at a heart rate of 67 beats/min. Each cine-loop was formed of 40 to 50 frames, of which end-diastolic (ED) and the end-systolic (ES) frames are presented below (the ED and ES were determined based on the left ventricle's area within the imaging plane).

Figure 10A:
FIGS. 10a-f show ultrasound images of case 1.1, where
Figure 10D:
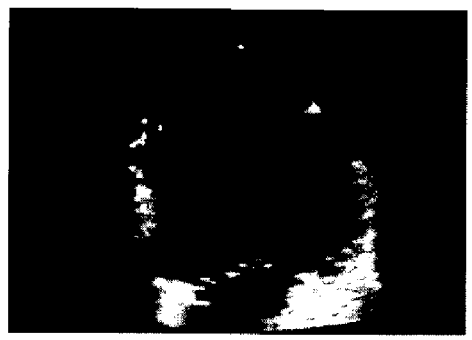
Figure 10B:
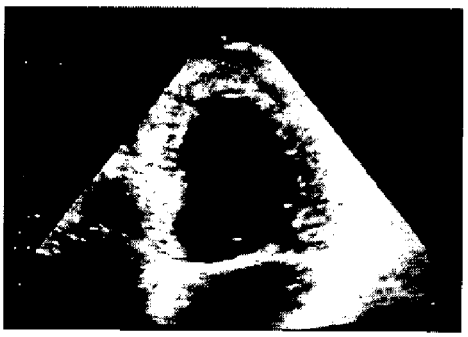
Figure 10E:
Figure 10C:
Figure 10F:

FIGS. 10*a-f* show ultrasound images of case 1.1, where FIGS. 10*a* and 10*d* show the original ED and ES frames, respectively; FIGS. 10b and 10e show, respectively, the ED and ES frames after applying conventional histogram equalization and rejection at threshold 38; and FIGS. 10c and 10f show, respectively, the ED and ES frames after applying the method according to a preferred embodiment of the present invention. As shown in FIGS. 10a-f, the results obtained according to the present embodiments appear crisper, and have richer gray-levels in the important regions, compared to both the original and the histogram equalized images.

Figure 11:
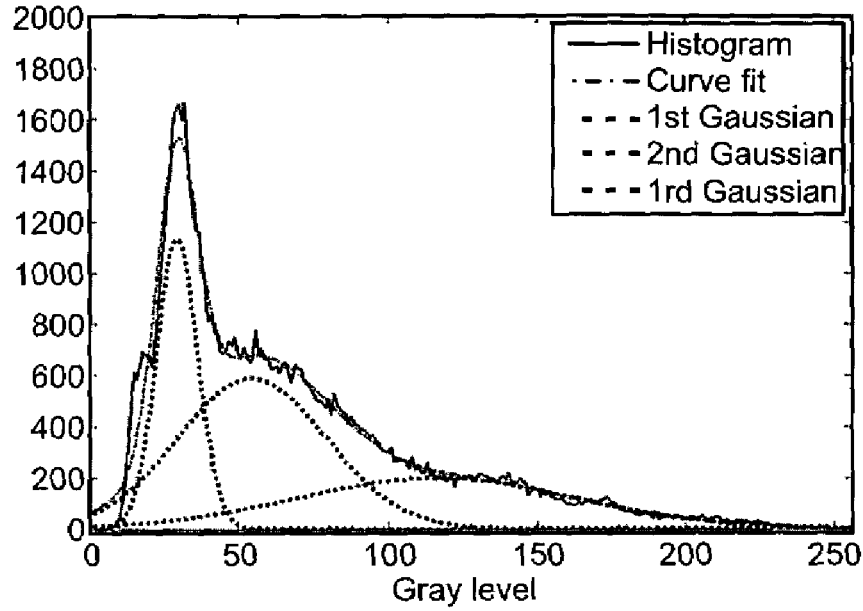
FIG. 11 is a graph demonstrating the processing of case 1.1.

FIG. 11 shows five curves for the processing of case 1.1: the original histogram is shown as a solid line, the fitted curve is shown as a dash-dotted line, and the three calculated Gaussians are shown as dotted curves. As shown in FIG. 11, the fitted curve is very similar to the original histogram, and the three Gaussians are well separated.

Figure 12:
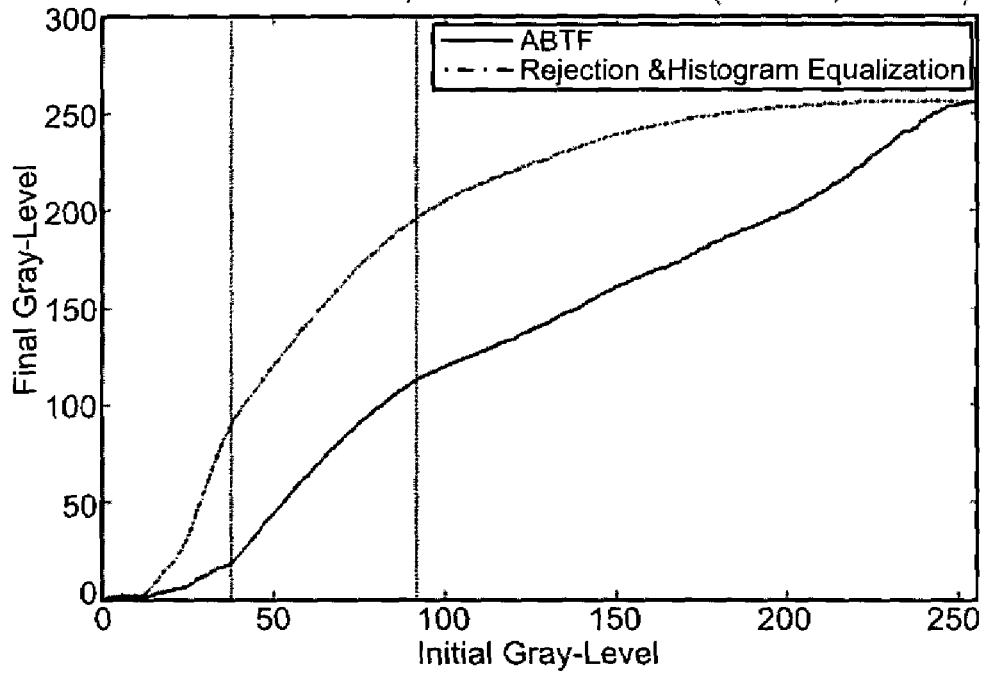
FIG. 12 is a comparison between prior art look up tables and look up tables calculated for case 1.1 according to a preferred embodiment of the present invention.

FIG. 12 shows LUTs calculated for case 1.1: the LUT used for histogram equalization after rejection is shown as a dash-dotted line, the LUT obtained according to the present embodiments is shown as a solid line. The values of $T_1$ and $T_2$ are marked by dotted lines. The differences between the LUTs are vivid.

Figure 13A:
FIGS. 13a-f show ultrasound images of cine-loop containing a single cardiac cycle at a heart rate of 71 beats/min referred to herein as case 1.15, where
Figure 13D:
Figure 13B:
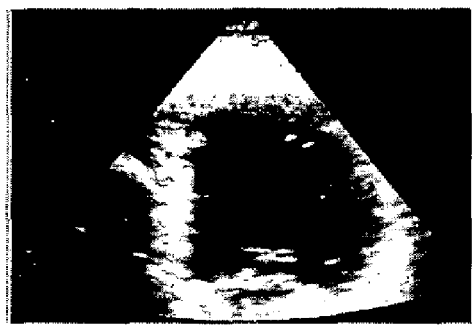
Figure 13E:
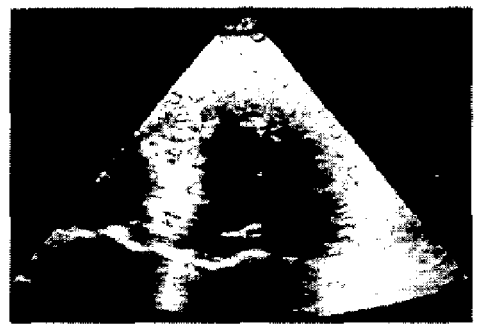
Figure 13C:
Figure 13F:

FIGS. 13a-f show ultrasound images of case 1.15, where FIGS. 13a and 13d show the original ED and ES frames, respectively; FIGS. 13b and 13e show, respectively, the ED and ES frames after applying conventional histogram equalization and rejection at threshold 36; and FIGS. 13c and 13f show, respectively, the ED and ES frames after applying the method according to a preferred embodiment of the present invention. As shown in FIGS. 13a-f, the results obtained according to the present embodiments appear sharper compared to both the original and the histogram equalized images.

Figure 14:
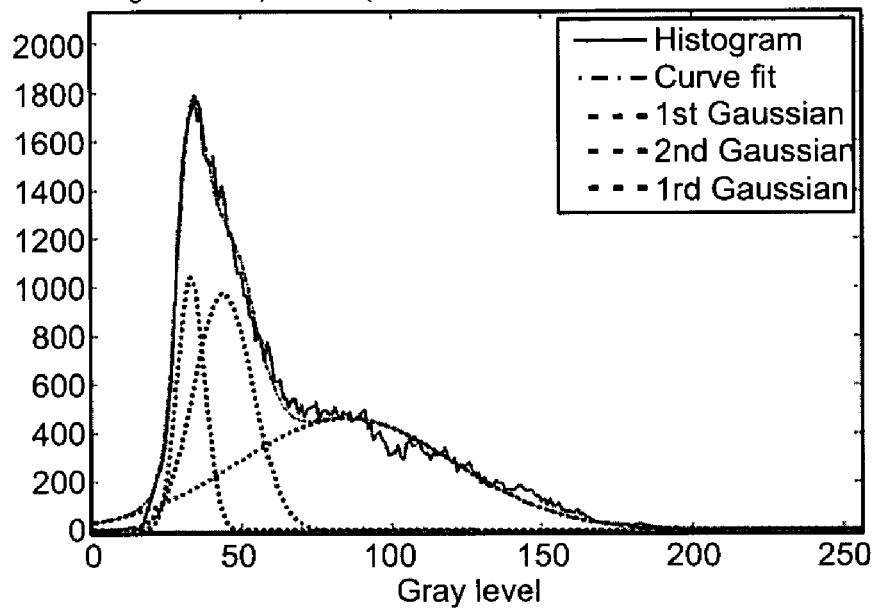
FIG. 14 is a graph demonstrating the processing of case 1.15, according to a preferred embodiment of the present invention.

FIG. 14 shows five curves for the processing of case 1.15: the original histogram is shown as a solid line, the fitted curve is shown as a dash-dotted line, and the three calculated Gaussians are shown as dotted curves. As shown in FIG. 14, the fitted curve is very similar to the original histogram, and that the three Gaussians are well separated.

Figure 15:
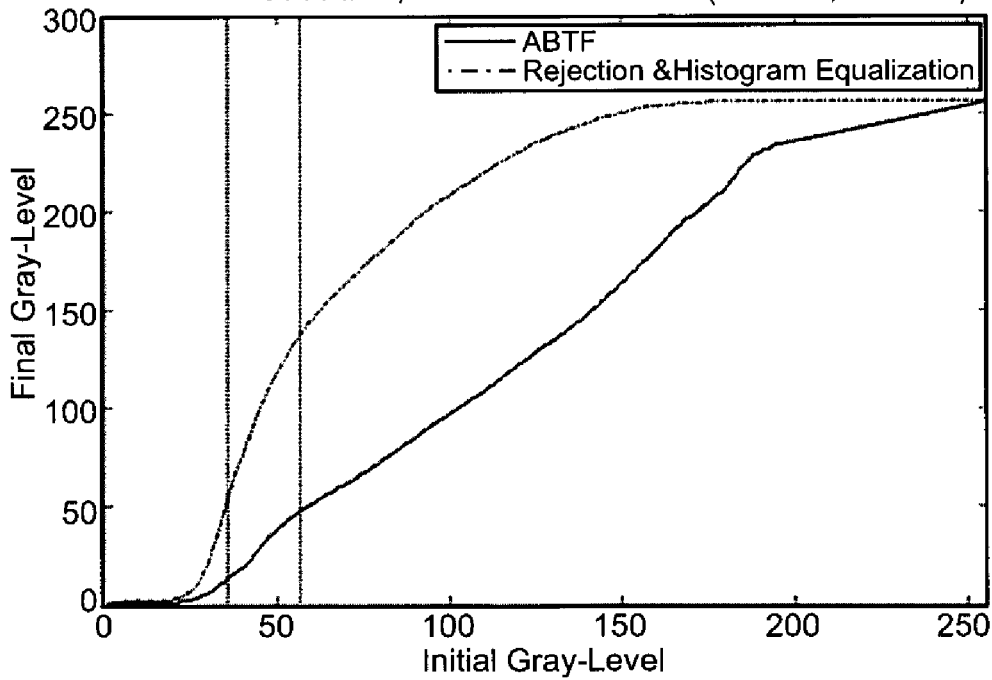
FIG. 15 is a comparison between prior art look up tables and look up tables calculated for case 1.15 according to a preferred embodiment of the present invention.

FIG. 15 shows LUTs calculated for case 1.15: the LUT used for histogram equalization after rejection is shown as a dash-dotted line, the LUT obtained according to the present embodiments is shown as a solid line. The values of $T_1$ and $T_2$ are marked by dotted lines. The differences between the LUTs are vivid.

FIGS. 16a-f show ultrasound images of case 1.21, where FIGS. 16a and 16d show the original ED and ES frames, respectively; FIGS. 16b and 16e show, respectively, the ED and ES frames after applying conventional histogram equalization and rejection at threshold 36; and FIGS. 16c and 16f show, respectively, the ED and ES frames after applying the method according to a preferred embodiment of the present invention. As shown in FIGS. 16a-f, the results obtained according to the present embodiments appear sharper compared to both the original and the histogram equalized images.

FIG. 17 shows five curves for the processing of case 1.21: the original histogram is shown as a solid line, the fitted curve is shown as a dash-dotted line, and the three calculated Gaussians are shown as dotted curves. As shown in FIG. 17, the fitted curve is very similar to the original histogram, and the three Gaussians are well separated.

FIG. 18 shows LUTs calculated for case 1.21: the LUT used for histogram equalization after rejection is shown as a dash-dotted line, the LUT obtained according to the present embodiments is shown as a solid line. The values of $T_1$ and $T_2$ are marked by dotted lines. The differences between the LUTs are vivid.

Example 2

Clutter Detection

The teachings of the present embodiments were employed for detecting clutter in echocardiograph images. As further demonstrated below, the application of the teachings of the present embodiments allows the determination of a substantial amount of the clutter pixels, with relatively low false detection.

Materials and Methods

Theoretical Background

The clutter determination procedure was based on the fact that the cardiac wall motion is much faster than the motion of the surrounding tissue. During a single cardiac cycle, the organs primarily contributing to the clutter can be perceived as standing still with respect to the transducer. Hence, according to a preferred embodiment of the present invention stationary or substantially stationary pixels, are identified as clutter pixels.

Image Processing

Figure 19:
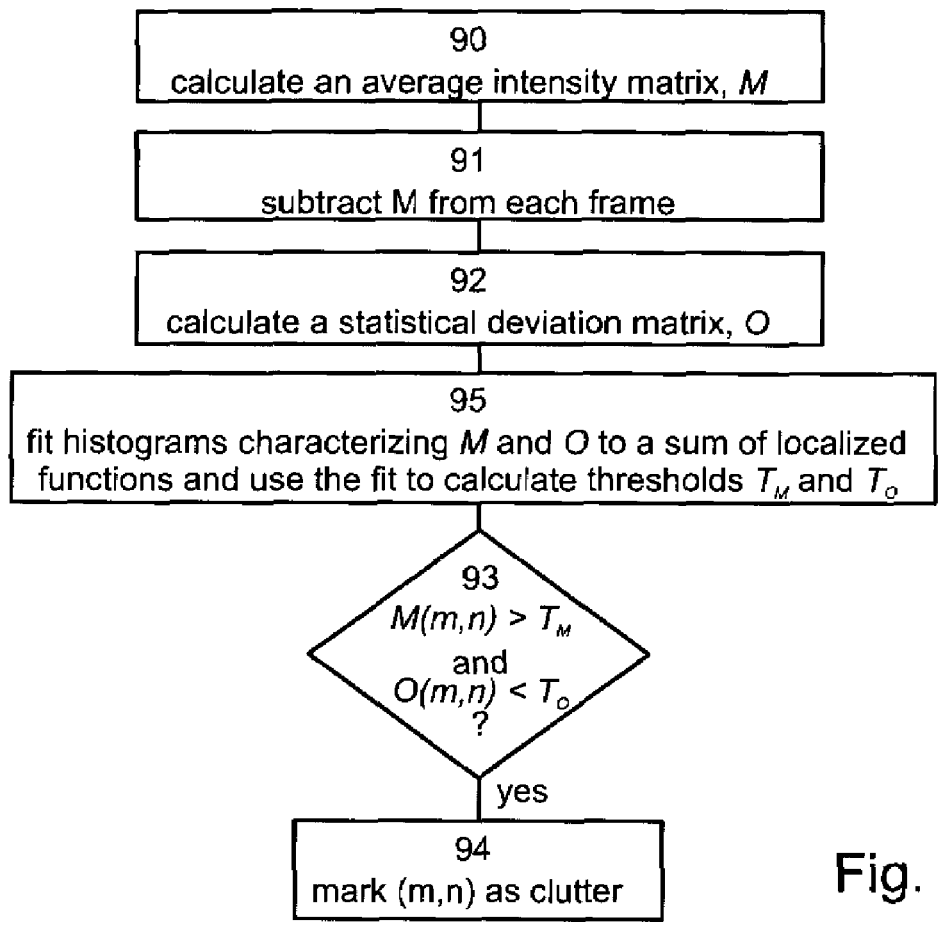
FIG. 19 is a flowchart diagram of a method of detecting clutter, according to a preferred embodiment of the present invention.

According to various exemplary embodiments of the present invention the detection of clutter can be done by executing several method steps. Reference is now made to FIG. 19, which is a flowchart diagram of a method of detecting clutter, according to a preferred embodiment of the present invention. A description of the specific steps employed in the present example accompanies the general description of the method. As stated hereinabove, the method steps described hereinbelow can be executed either contemporaneously or sequentially in many combinations or orders of execution, and the ordering of the flowchart of FIG. 19 is not intended to be limiting.

Hence, the method preferably begins at Step 90 in which a set-average intensity value is calculated for each picture-element (a pixel in the present example) to provide the average intensity matrix, M. The method proceeds to optional Step 91, in which M is subtracted from each frame to provide a clutter-cancelled frame, $C_p$:

$$C_p(m,n)=F_p(m,n)-M(m,n). \quad (\text{EQ. 17})$$

Note that $C_p(m,n)$ can receive both positive and negative values. $C_p(m,n)$ may be displayed in more than one way. In one embodiment, $C_p$ has positive entries only, in another embodiment, $C_p$ has negative entries only, in an additional embodiment $C_p$ has absolute value entries, and in a further embodiment $C_p$ has both negative and positive entries.

Step 91 can be used to accentuate changes from one frame to the next. This is highly advantageous for algorithms applying local tracking of regions-of-interest during the cardiac cycle.

Optionally and preferably, the method proceeds from step 91 (or from step 90 if step 91 is not employed) to step 92 in which a statistical deviation is calculated for each picture-element, to provide the statistical deviation matrix, O (see, e.g., Equation 2).

For a clutter pixel (m,n), M(m,n) is expected to be high (only strong clutter has substantial effect on the image), while O(m,n) is expected to be low (small changes in time). Thus, according to a preferred embodiment of the present invention, the method proceeds to decision step 93 in which the value of each matrix-element of M is compared to the threshold $T_M$ and the value of each matrix-element of O is compared to the threshold $T_O$. If a particular matrix-element of M is above $T_M$ and a respective matrix-element of O is below $T_O$ the method proceeds to step 94 in which the corresponding picture element (pixel in the present example) is marked as a clutter picture-element.

The above steps can be executed by defining a binary matrix, C, as follows:

$$C(m,n)=[M(m,n)>T_M]\cap[O(m,n)<T_O],\qquad (EQ.\ 18)$$

where C receives 1 for clutter pixels, and 0 for other pixels.

According to various exemplary embodiments of the present invention decision step 93 is preceded by step 95 in which the thresholds $T_M$ and $T_O$ are calculated, preferably by fitting the histograms $H_M$ and $H_O$ characterizing M and O to a sum of a plurality of localized functions and defining the thresholds as intersection points between the localized functions.

In the present example, the three Gaussians of Example 1 (see Equation 9) were used. For $H_M$, a lower threshold, $T_{1M}$, was set to the intersection point between $G_1$ and $G_2$, and a higher threshold, $T_{2M}$, was set to the intersection point between $G_2$ and $G_3$. Similarly, for $H_O$, a lower threshold, $T_{1O}$, was set to the intersection point between $G_1$ and $G_2$, and a higher threshold, $T_2O$, was set to the intersection point between $G_2$ and $G_3$. The thresholds $T_M$ and $T_O$ were defined by setting $T_M=T_{2M}$ and $T_O=T_{1O}$.

For the purpose of investigating the performance of the method, the following ratios were defined: a ratio, denoted $P_C$, was defined between the number of pixels detected as clutter and the total number of pixels in the data-region; a second ratio, denoted $P_d$, was defined between the number of pixels properly detected as clutter and the total number of clutter pixels; a third ratio, denoted, $P_{fa}$, was defined between the number of pixels falsely detected as clutter and the total number of pixels detected as clutter; and a fourth ratio, denoted $P_{fat}$, was defined between the number of pixels falsely detected as clutter and the total number of pixels in the data-region.

Note that $P_d$ and $P_{fa}$ can only be evaluated visually. Thus, the accuracy of $P_d$ has been set to ±10%, while the accuracy of $P_{fa}$ has been set to ±5%. Also note that $P_{fat}=P_C \cdot P_{fa}$. The effectiveness of the method can be quantified by the ratios $P_d$ and $P_{fat}$, where high values of $P_d$ and low values of $P_{fat}$ correspond to an effective method. For an ideal method $P_d=1$ and $P_{fat}=0$.

Data Acquisition 16 cine-loops of echocardiograph images recorded of 16 different patients were selected. The cine-loops were in apical four-chamber and apical two-chamber views. The data has been collected using a Vivid™ 3 imaging platform, by GE Medical Systems Ultrasound. The capability of the present embodiment is illustrated below using two clutter-affected loops and one clutter-free loop.

Results

Figure 20:
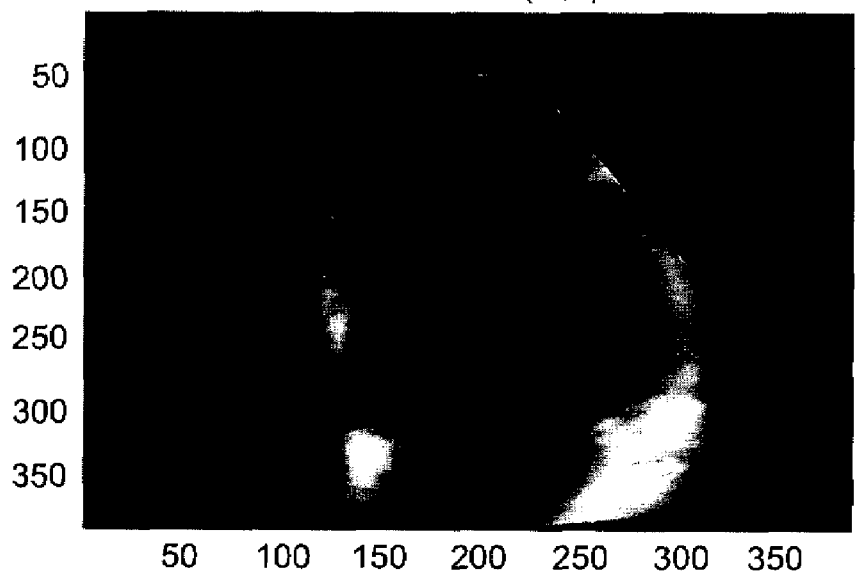
FIG. 20 shows an image of an average density matrix for case 1.1, interchangeably referred to herein as case 2.1.
Figure 21A:
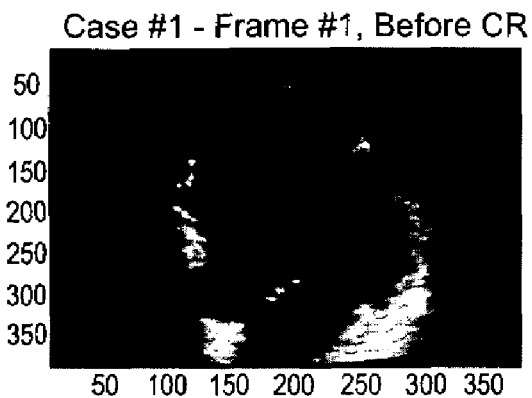
FIGS. 21a-f show the first three frames of case 2.1 before (FIGS. 21a-c) and after (FIGS. 21d-f) subtraction of the average intensity matrix from each frame.
Figure 21D:
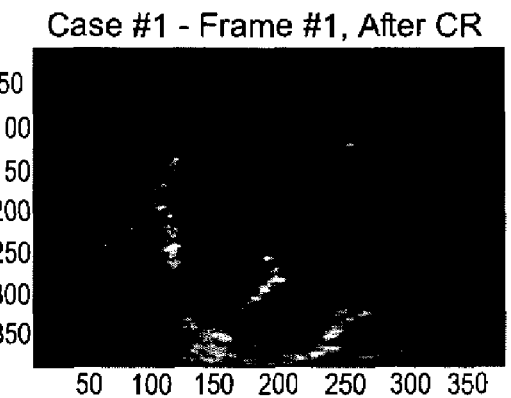
Figure 21B:
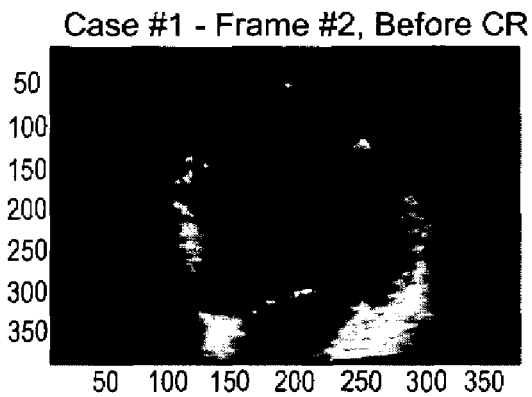
Figure 21E:
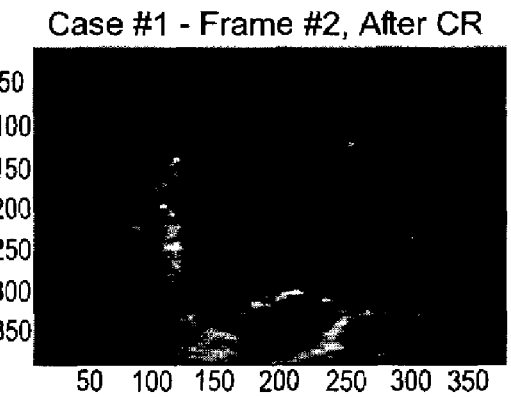
Figure 21C:
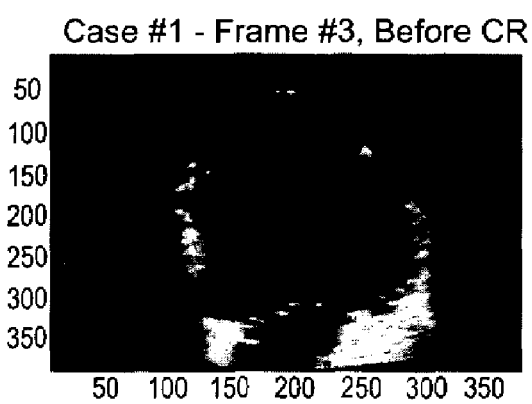
Figure 21F:
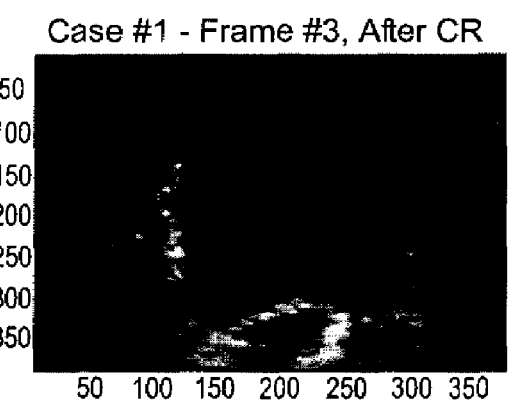

FIG. 20 shows an image of the average density matrix M for case 1.1 (see also Example 1) interchangeably referred to herein as case 2.1. As shown, the time averaging smears the image, but the main cardiac features are still visible.

FIGS. 21*a-f* show the first three frames of case 2.1 before (FIGS. 21*a-c*) and after (FIGS. 21*d-f*) the subtraction of M from each frame (see $C_p$ Equation 17). Note that in $C_p$ the background color is gray rather than black. This results from the fact, that $C_p$ may receive both positive and negative values. Zero is marked using the gray background color, while positive values are lighter and negative values are darker. As shown in FIGS. 21*a-f*, $C_p$ visually highlights temporal changes.

Table 2 below presents the values of the ratios $P_c$, $P_d$, $P_{fa}$ and $P_{fat}$ for each of the 16 cine-loops, referred to as cases 2.1-2.16.

TABLE 2

| Case No. | $P_C$ [%] | $P_d$ [%] | $P_{fa}$ [%] | $P_{fat}$ [%] |
|---|---|---|---|---|
| 2.1 | 0.07 | 100 | 100 | 0.07 |
| 2.2 | 3.79 | 100 | 5 | 0.19 |
| 2.3 | 0.06 | 100 | 0 | 0.00 |
| 2.4 | 0.39 | 80 | 0 | 0.00 |
| 2.5 | 0.02 | 100 | 100 | 0.02 |
| 2.6 | 0.22 | 100 | 100 | 0.22 |
| 2.7 | 0.11 | 50 | 5 | 0.01 |
| 2.8 | 0.03 | 80 | 25 | 0.01 |
| 2.9 | 0.30 | 80 | 0 | 0.00 |
| 2.10 | 0.72 | 90 | 0 | 0.00 |
| 2.11 | 16.55 | 90 | 5 | 0.83 |
| 2.12 | 0.35 | 100 | 100 | 0.35 |
| 2.13 | 1.09 | 90 | 0 | 0.00 |
| 2.14 | 0.00 | 100 | 0 | 0.00 |
| 2.15 | 0.00 | 100 | 0 | 0.00 |
| 2.16 | 0.54 | 100 | 100 | 0.54 |
| Mean ± Std | 1.52 ± 4.12 | 91.3 ± 13.6 | 33.8 ± 46.5 | 0.14 ± 0.24 |

As shown the values of $P_d$ are high and the values of $P_{fat}$ are low, demonstrating the efficiency of the present embodiment of the invention.

Figure 33:
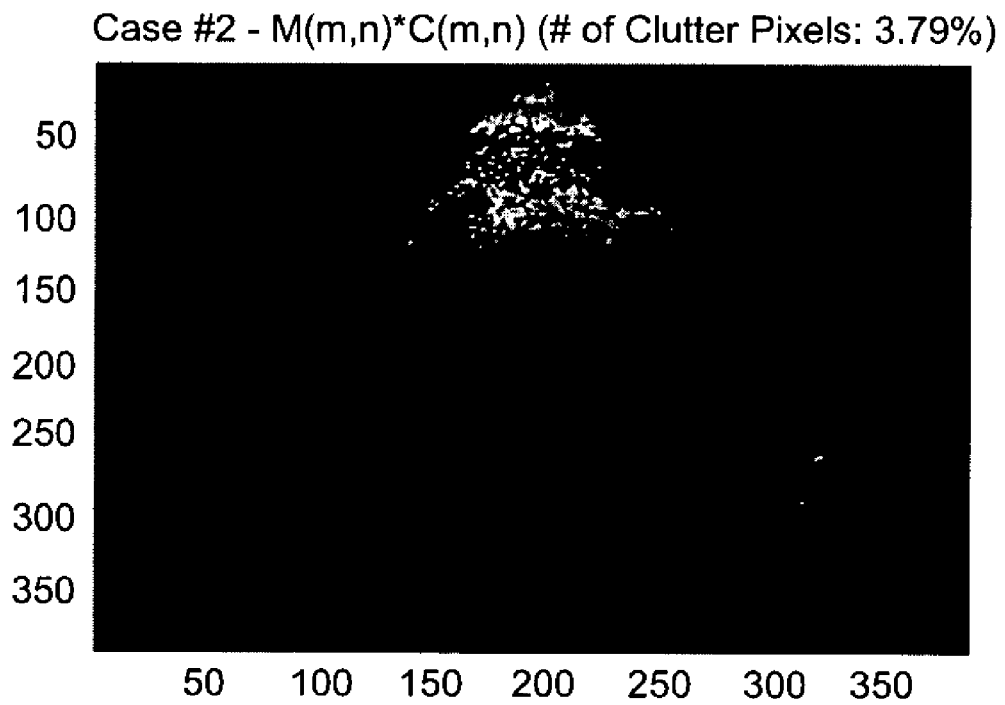
FIG. 33 shows an image obtained by a pixel by pixel multiplication of the average intensity matrix by the clutter binary matrix for case 2.2, according to a preferred embodiment of the present invention.
Figure 34:
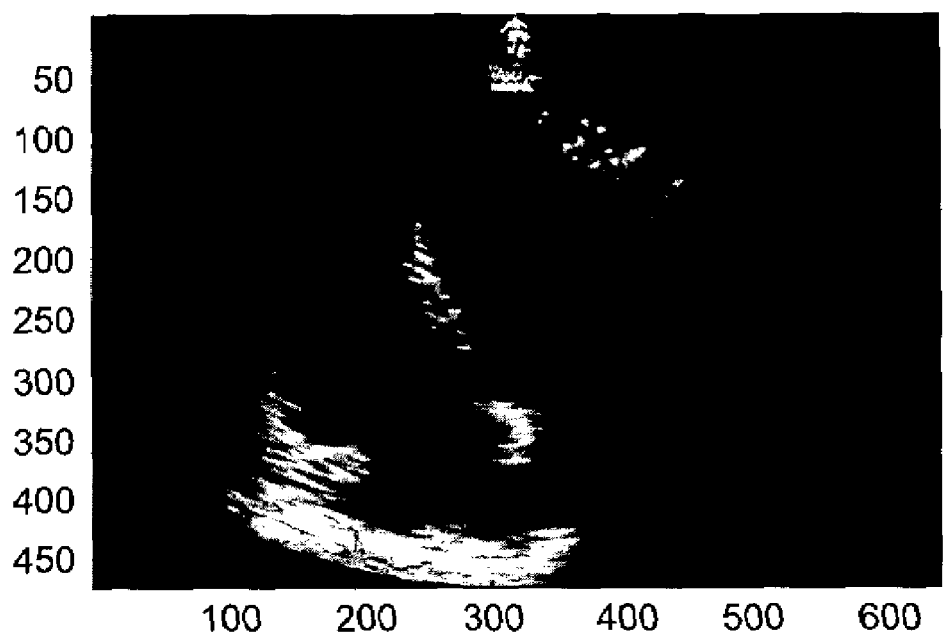
FIG. 34 an ES frame for a cine-loop containing a single cardiac cycle at a heart rate of 74 beats/min referred to herein as case 2.13, according to a preferred embodiment of the present invention.
Figure 35:
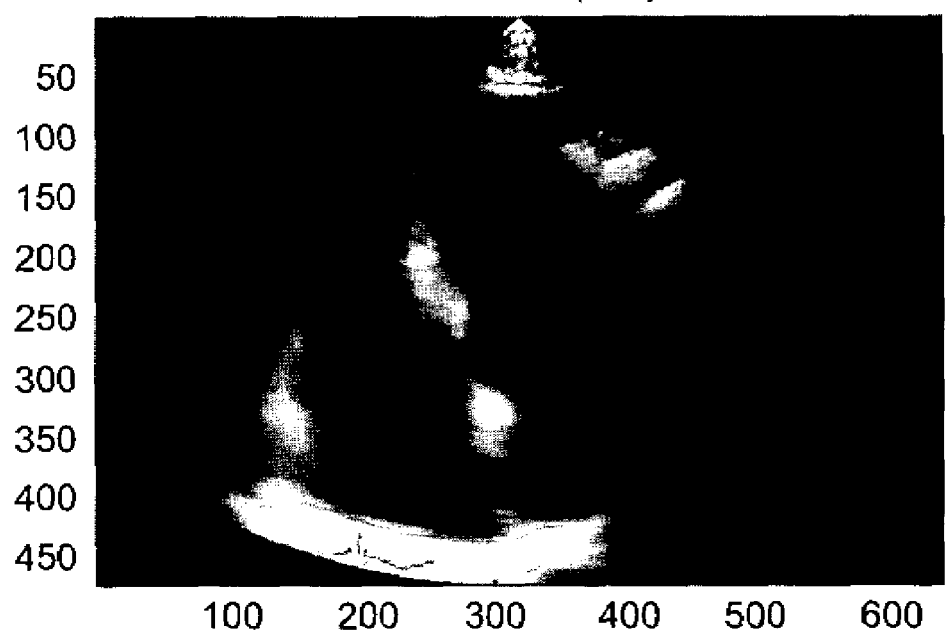
FIG. 35 shows an image of the average intensity matrix for 2.13, obtained according to a preferred embodiment of the present invention.
Figure 36:
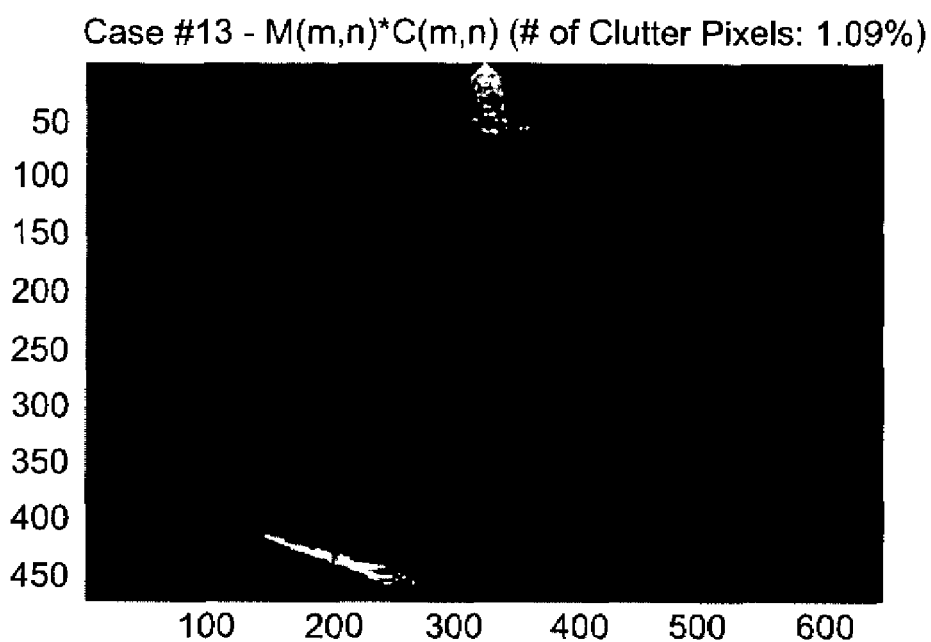
FIG. 36 shows an image obtained by a pixel by pixel multiplication of the average intensity matrix by the clutter binary matrix for case 2.13, according to a preferred embodiment of the present invention.

FIGS. 22-36 show results for three representative cine-loops: case 2.1 (FIGS. 22-27) case 2.2 (FIGS. 28-33) and case 2.13 (FIGS. 34-36). Case 2.1 was a clutter-free cine-loop, while cases 2.2 and 2.13 were clutter-affected cine-loops. All three loops have been gathered using high frame-rate (75 frames/s). Each loop contained a single cardiac cycle with a heart rate of 65 beats/min (case 2.1), 71 beats/min (case 2.2) and 74 beats/min (case 2.13).

Figure 22:
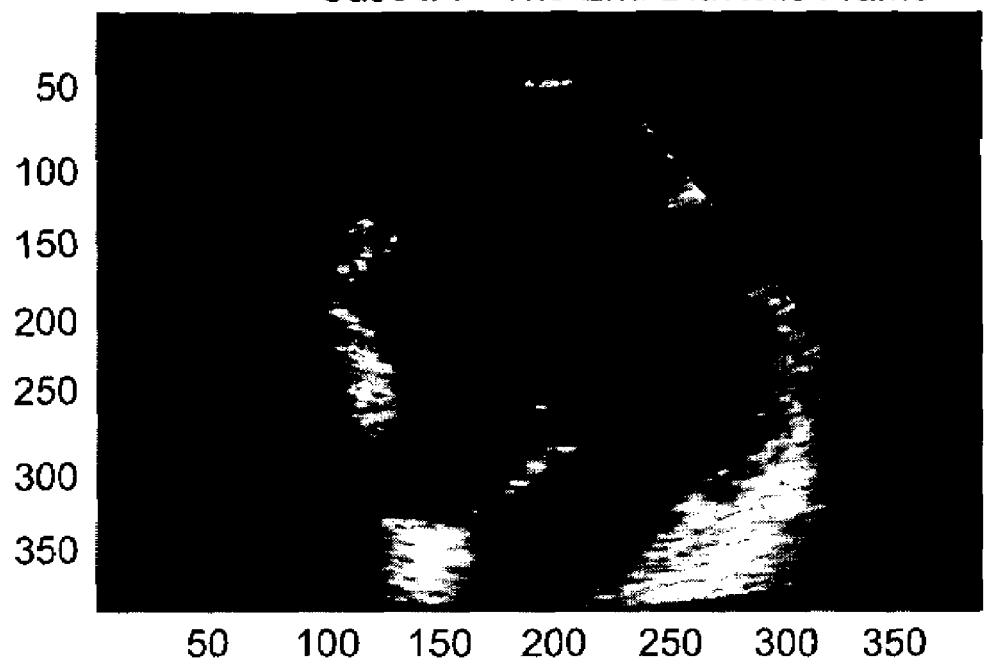
FIG. 22 shows an ES frame for case 2.1, according to a preferred embodiment of the present invention.
Figure 23:
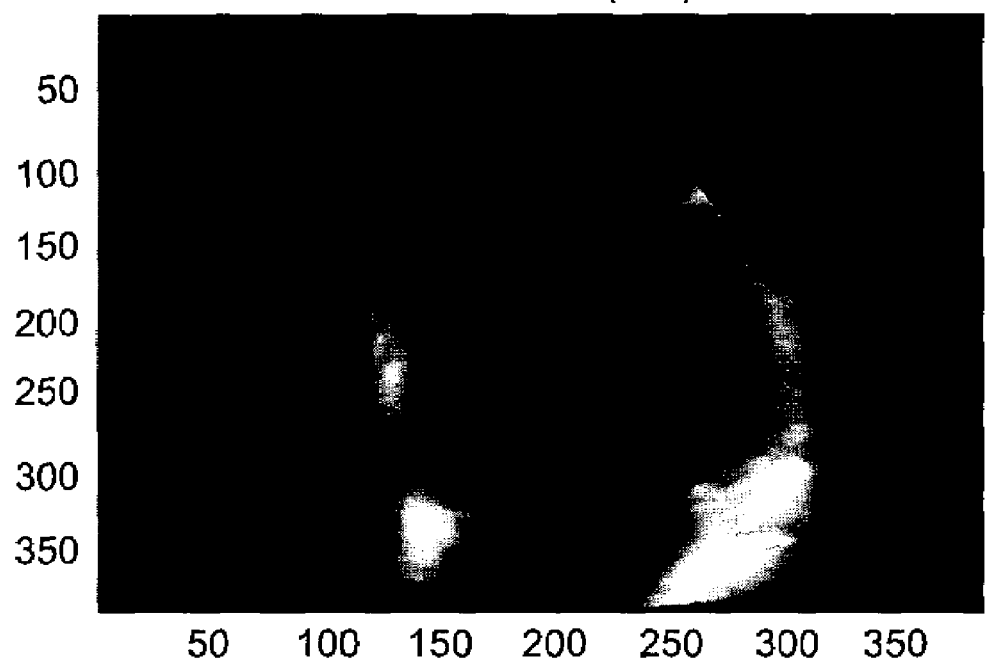
FIG. 23 shows an image of the average intensity matrix for case 2.1, obtained according to a preferred embodiment of the present invention.
Figure 24:
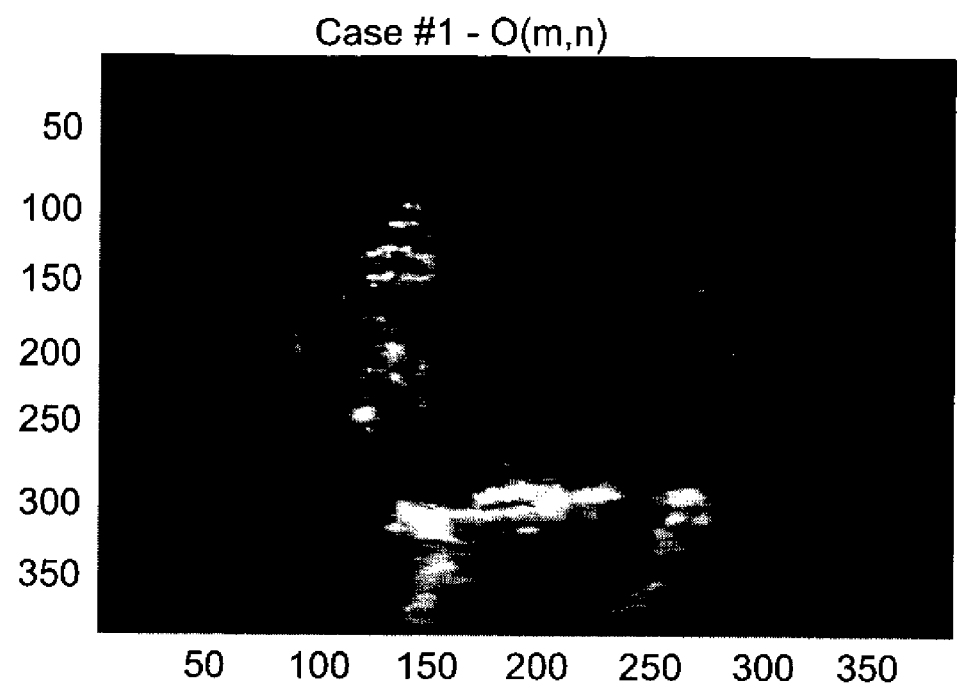
FIG. 24 shows an image of a statistical deviation matrix for case 2.1, obtained according to a preferred embodiment of the present invention.
Figure 25:
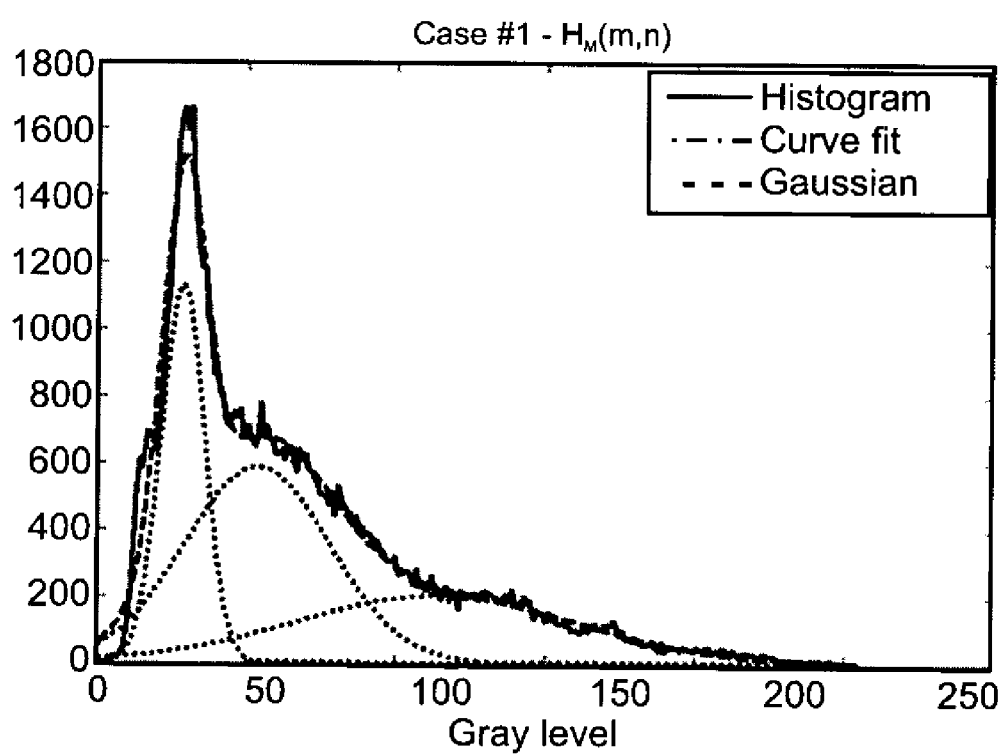
FIG. 25 shows a grey-level histogram obtained from the average intensity matrix of case 2.1, according to a preferred embodiment of the present invention.
Figure 26:
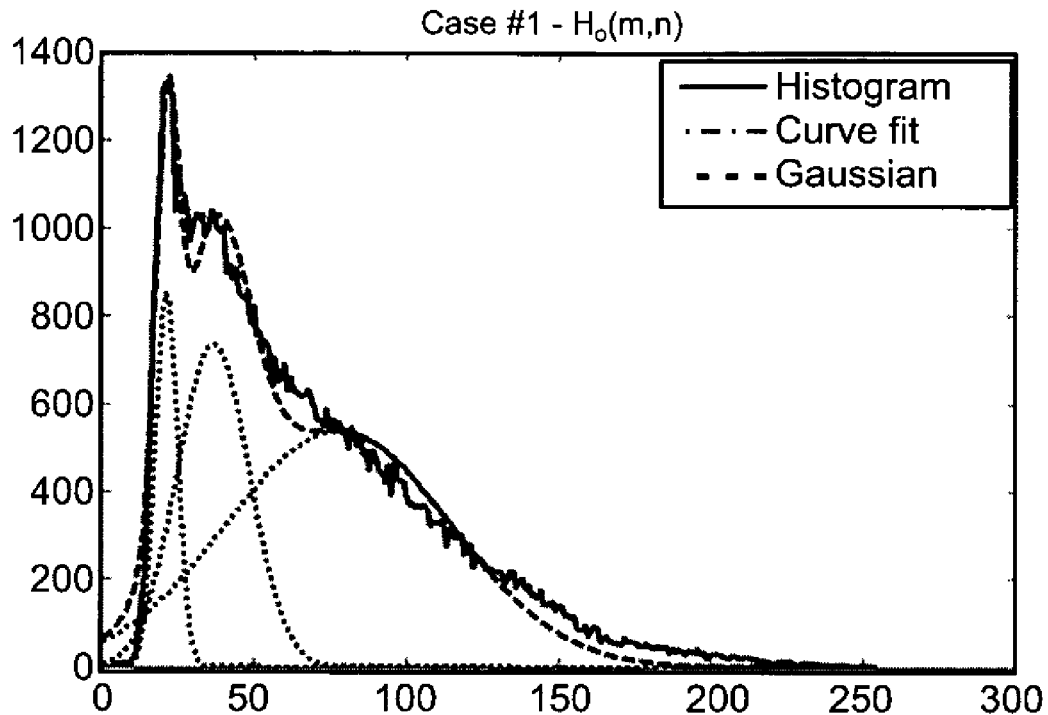
FIG. 26 shows a grey-level histogram obtained from the statistical deviation matrix of case 2.1, according to a preferred embodiment of the present invention.
Figure 27:
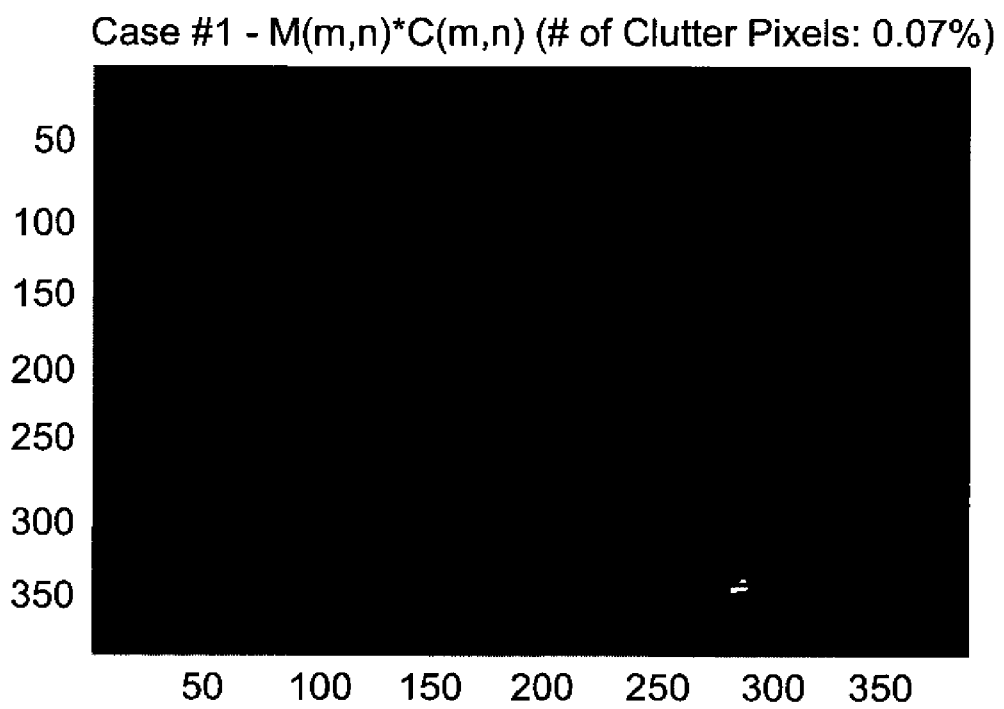
FIG. 27 shows an image obtained by a pixel by pixel multiplication of the average intensity matrix by a clutter binary matrix for case 2.1, according to a preferred embodiment of the present invention.

FIG. 22 show the ED frame for case 2.1. As shown in FIG. 22, the ED frame is substantially clutter-free. FIG. 23 shows an image of M for case 2.1. As shown in FIG. 23, the averaging procedure, although smearing the image, preserves most of the relevant features. FIG. 24 shows an image of O for case 2.1. Note that pixels with high intensity indicate substantial changes in the gray-level during the cardiac cycle. FIGS. 25-26 show the grey-level histograms $H_M$ (FIG. 25) and $H_O$ (FIG. 26) for case 2.1. Five curves are shown in FIGS. 25-26, describing the original histogram (solid), the fitted curve (dashed), and the three calculated Gaussians (dotted). The intersection points between the Gaussians are 38 and 91 for $H_M$, and 25 and 50 for $H_O$. Thus, $T_M=91$ and $T_O=25$. As shown in FIGS. 25-26 the fitted curves are similar to the original histograms, and the three Gaussians are well separated. FIG. 27 shows an image obtained by a pixel by pixel multiplication of M by the clutter binary matrix, C for case 2.1. As shown in FIG. 27, only a small portion of the image is detected as clutter, hence demonstrating that case 2.1 is substantially clutter-free.

Figure 28:
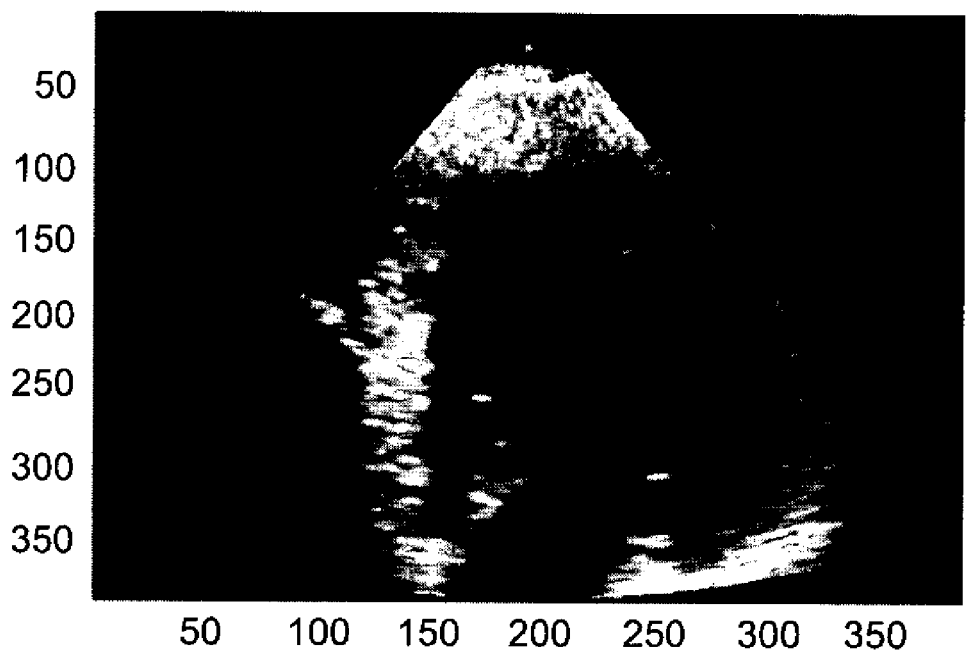
FIG. 28 shows the ES frame for case 1.15 (interchangeably referred to herein as case 2.2), according to a preferred embodiment of the present invention.
Figure 29:
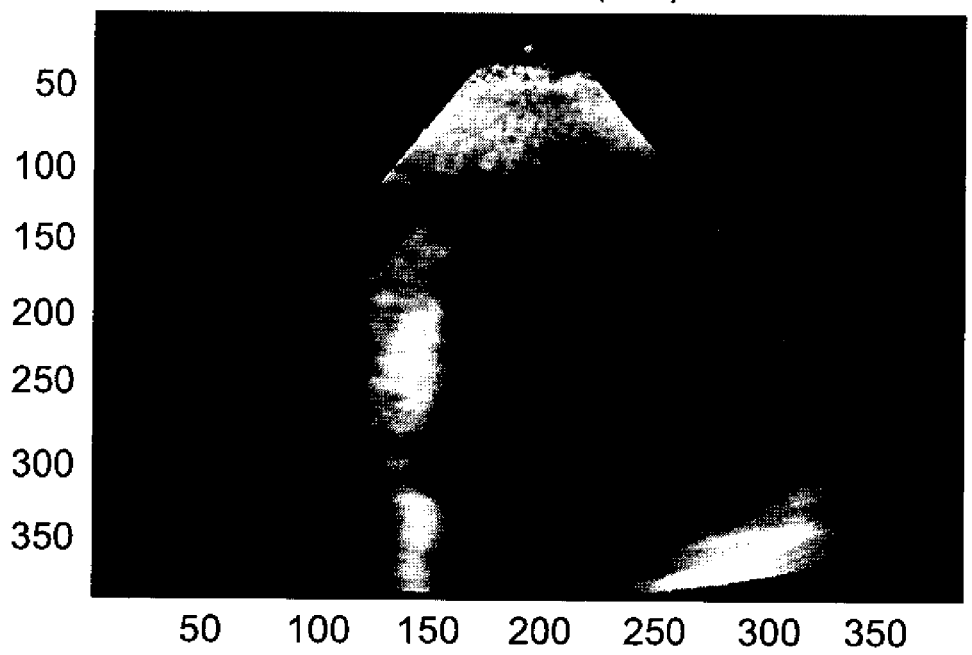
FIG. 29 shows an image of the average intensity matrix for case 2.2, obtained according to a preferred embodiment of the present invention.
Figure 30:
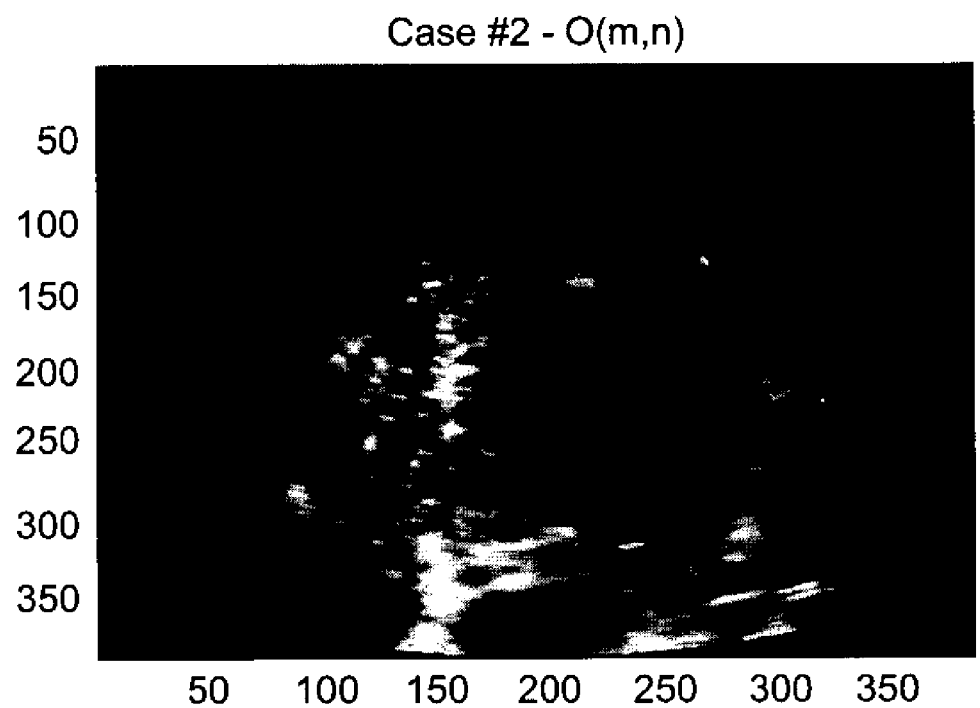
FIG. 30 shows an image of statistical deviation matrix for case 2.2, obtained according to a preferred embodiment of the present invention.
Figure 31:
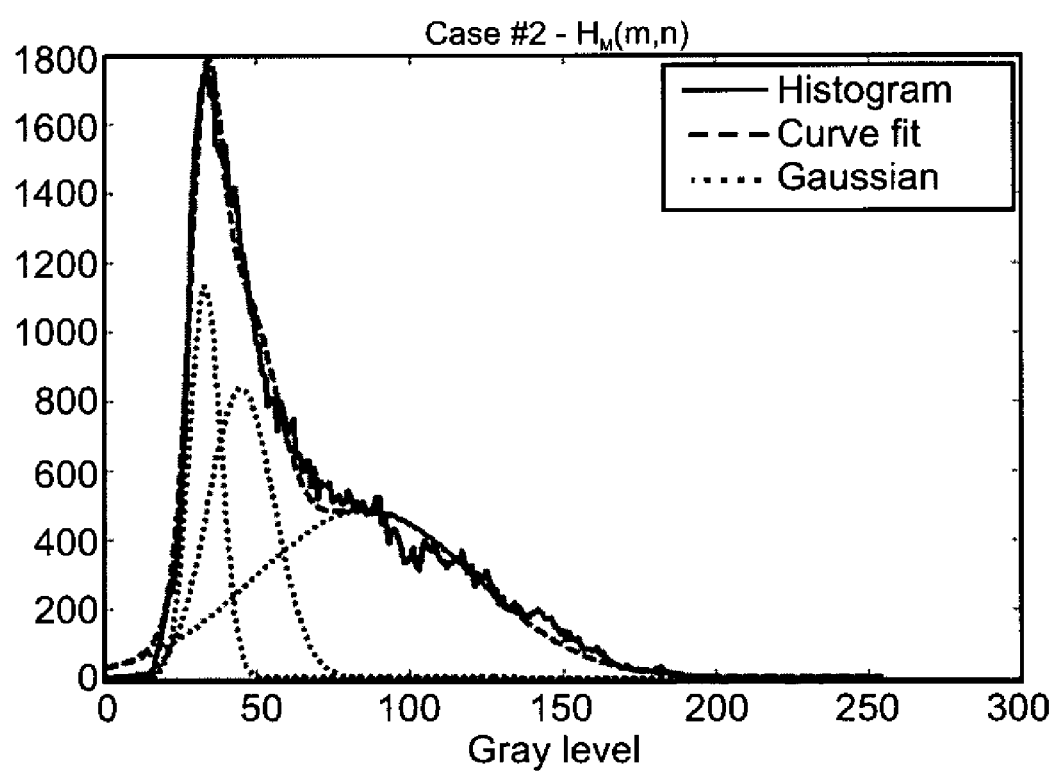
FIG. 31 shows the grey-level histogram obtained from the average intensity matrix of case 2.2, according to a preferred embodiment of the present invention.
Figure 32:
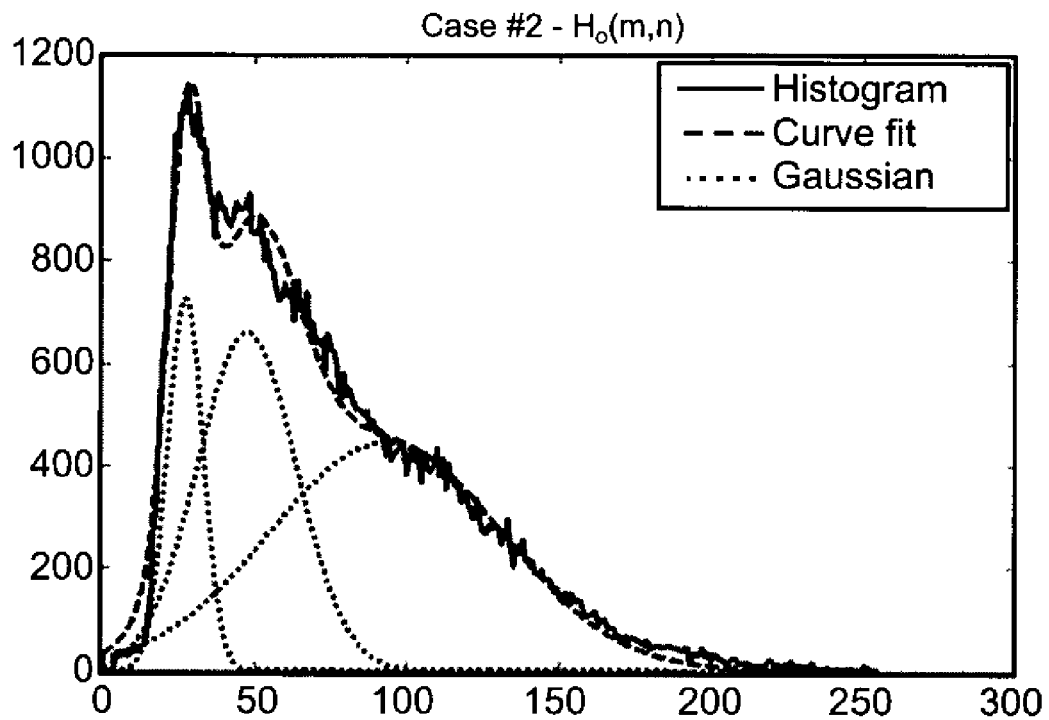
FIG. 32 shows the grey-level histogram obtained from the statistical deviation matrix of case 2.2, according to a preferred embodiment of the present invention.

FIG. 28 shows the ED frame for case 2.2. Note the clutter region in the vicinity of the transducer (mainly in rows 40 to 100). FIG. 29 shows an image of M for case 2.2. As shown in FIG. 29, the averaging smears most of the image, but the clutter region, residing mostly at the top of the image, remains relatively sharp. FIG. 30 shows an image of O for case 2.2. Note that pixels with high intensity indicate substantial changes in the gray-level during the cardiac cycle. FIGS. 31-32 show the gray-level histograms $H_M$ (FIG. 31) and $H_O$ (FIG. 32) for case 2.2. Five curves are shown in FIGS. 31-32, describing the original histogram (solid), the fitted curve (dashed), and the three calculated Gaussians (dotted). The intersection points between the Gaussians are 38 and 59 for $H_M$, and 33 and 66 for $H_O$. Thus, $T_M$=59 and $T_O$=33. As shown in FIGS. 31-32 the fitted curves are similar to the original histograms, and the three Gaussians are well separated. FIG. 33 shows an image obtained by a pixel by pixel multiplication of M by the clutter binary matrix, C for case 2.2. As shown in FIG. 33, most of the clutter pixels are recognized, whereas most of the non-clutter pixels are not detected.

FIG. 34 shows the ED frame for case 2.13. Note the clutter region in the vicinity of the transducer (rows 1 to 60) and at the bottom left (mainly in rows 400 to 450, columns 150 to 280). FIG. 35 shows an image of M for case 2.13. As shown in FIG. 35, the averaging smears most of the image, but the clutter region, residing mostly at the top and bottom left, remains relatively sharp. FIG. 36 shows an image obtained by a pixel by pixel multiplication of M by the clutter binary matrix, C for case 2.13. As shown in FIG. 36, most of the clutter pixels are recognized, whereas most of the non-clutter pixels are not detected.

Discussion

The present embodiments automatically detect clutter pixels, with high level of efficiency, as quantitatively demonstrated using the values of the ratios $P_d$ and $P_{fat}$ (mean $P_d$ value of 91.3±13.6%, and mean $P_{fat}$ value of 0.14±0.24%). Visual examination of all 16 test cases, and meticulous examination of the three specific reference cases further support the ability of the present embodiments to automatically detect clutter. In cases 2.2 and 2.13, which are affected by clutter, the majority of the clutter pixels were correctly detected, with minimal (or no) false detection.

Inspection of the matrices M and O brings additional insight into the procedure. Clutter regions (detected visually) are characterized by low O values and high M values (otherwise, the effect of the clutter is negligible). Moreover, unlike other regions of the image, the clutter regions in M still appear grainy, despite the time-averaging. This is explained by the fact that clutter is characterized by small variations. This can be used as an additional criterion for clutter detection.

Furthermore, assessment of both $H_M$ and $H_O$ shows that the adaptive method for selecting threshold estimation provides a good fit to the histogram with well-separated Gaussians.

Example 3

Left Ventricular Outline Detection

The teachings of the present embodiments were employed for outlining the left ventricle. As further demonstrated below, the application of the teachings of the present embodiments allows an automatic outlining of the left ventricle to a high level of accuracy.

Materials and Methods

Image Processing

Figure 37:
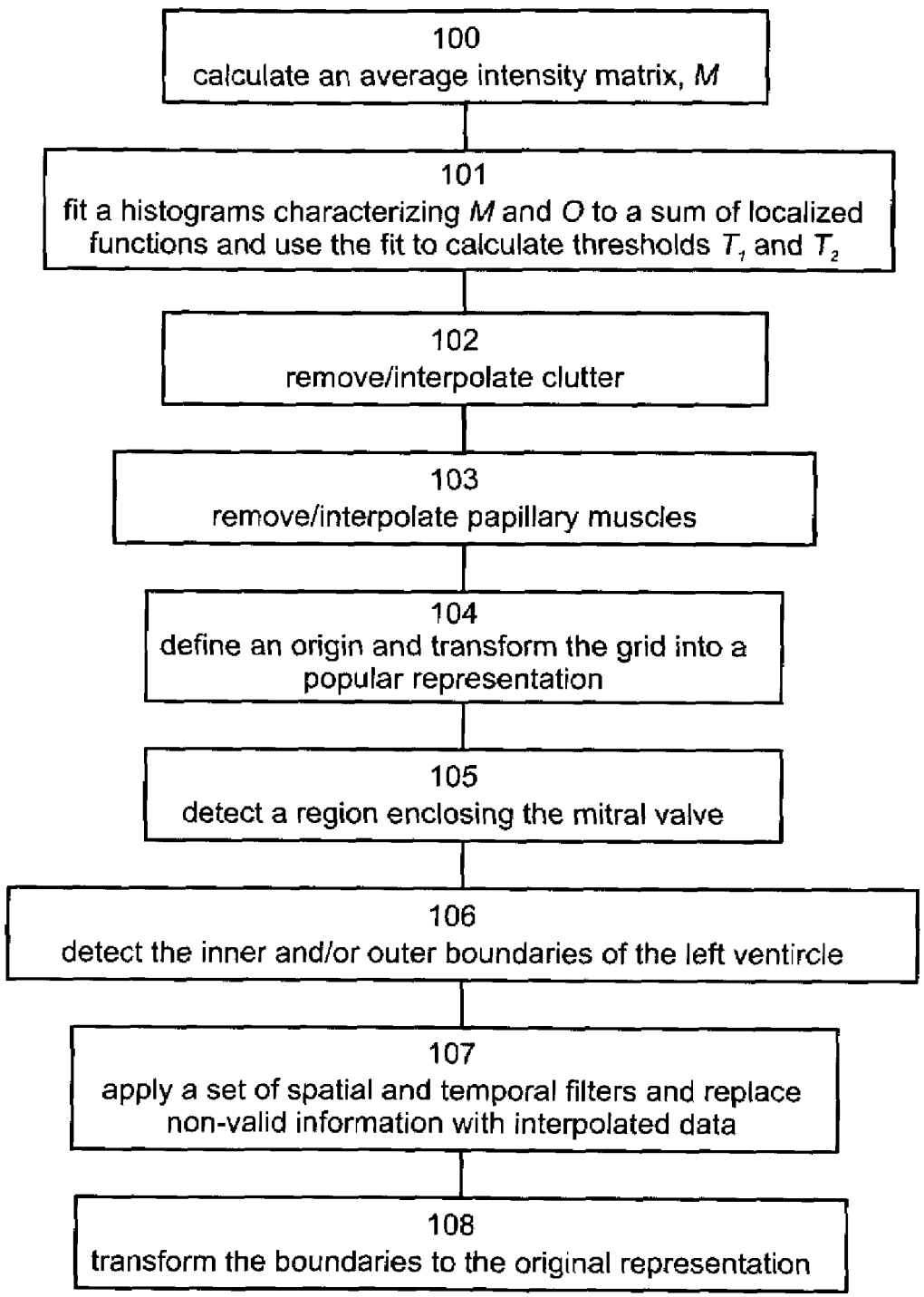
FIG. 37 is a flowchart diagram of a method of outlining a region, according to a preferred embodiment of the present invention.

According to various exemplary embodiments of the present invention, the detection of the left ventricular outlines can be done by executing several method steps. Reference is now made to FIG. 37, which is a flowchart diagram of a method of outlining a region, according to a preferred embodiment of the present invention. A description of the specific steps employed in the present example accompanies the general description of the method. As stated hereinabove, the method steps described hereinbelow can be executed either contemporaneously or sequentially in many combinations or orders of execution, and the ordering of the flowchart of FIG. 37 is not intended to be limiting.

Hence, the method preferably begins at step 100 in which a set-average intensity value is calculated for each picture-element (a pixel in the present example) to provide the average intensity matrix, M. The method preferably continues to step 101 in which $H_M$, the intensity histogram of M, is fitted to a sum of a plurality of localized functions, which are used to define the thresholds $T_1$ and $T_2$ as intersection points between the localized functions.

In the present example, the three Gaussians of Examples 1 and 2 (see Equation 9) were used. The lower threshold, $T_1$, was set to the intersection point between $G_1$ and $G_2$, and the higher threshold, $T_2$, was set to the intersection point between $G_2$ and $G_3$.

Optionally and preferably, the method continues to steps 102 and/or 103 in which picture-elements corresponding to clutter (step 102) or the papillary muscles (step 103) are removed or interpolated. The removal of clutter can be done in any way known in the art. Alternatively, the clutter can be removed using apparatus 10 or the clutter removal method as exemplified in FIG. 19.

The papillary muscles are preferably detected under the postulation that they appear as small closed high-intensity regions within the left ventricular cavity. The assumption of high-intensity leads to the capability of locating the papillary muscles in M, rather than looking for them in each frame separately.

Following is a preferred procedure for detecting the papillary muscles. Hence, according to the presently preferred embodiment of the invention the thresholds $T_1$ and $T_2$ are applied to M, in a Boolean manner to obtain two binary matrices $B_1$ and $B_2$:

$$B_1(m,n)=[M(m,n)>T_1]$$

$$B_2(m,n)=[M(m,n)>T_2]. \quad (EQ. 19)$$

Figure 38A:
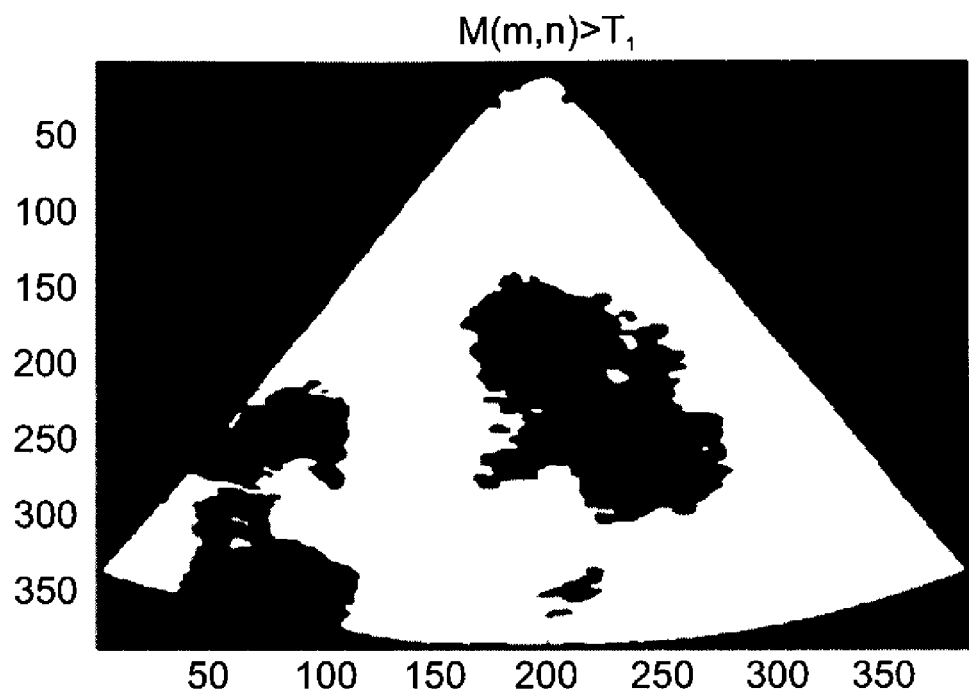
FIGS. 38a-b are representative examples of images of two binary matrices, according to a preferred embodiment of the present invention.
Figure 38B:
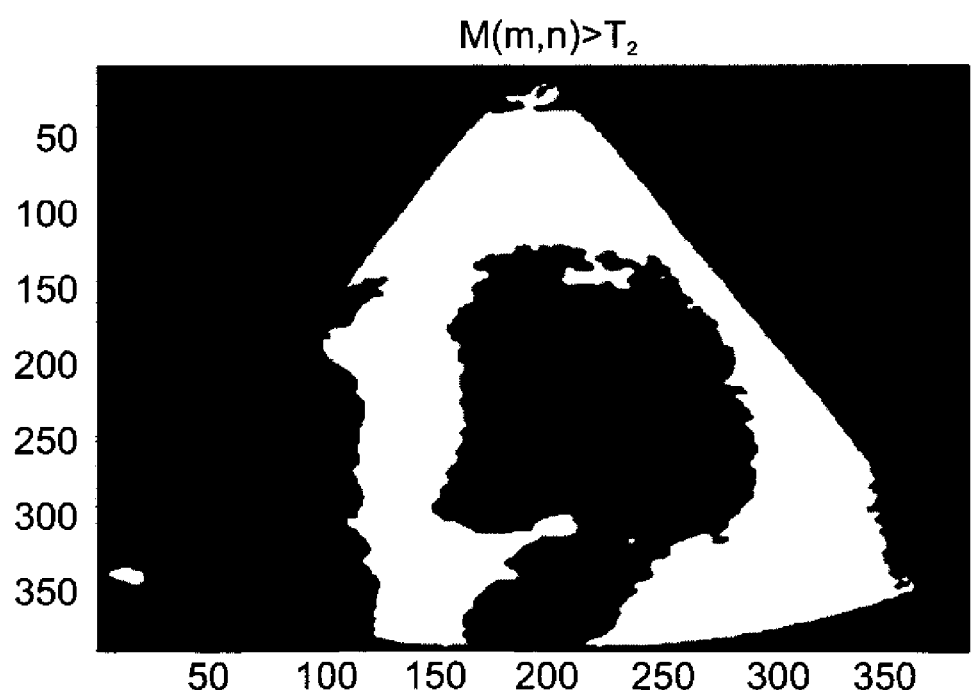

FIGS. 38a-b are representative examples of images of the binary matrices $B_1$ (FIG. 38a) and $B_2$ (FIG. 38b). Once the binary matrices are constructed a series of morphological filters, such as, but not limited to, closing and opening are applied so as to smooth and fill small gaps in $B_1$ and $B_2$. Referring to the examples in FIG. 38a-b, the application of the morphological filters results in a disappearance of the small to closed regions in FIG. 38a, and all but two closed regions in FIG. 38b.

The binary matrices $B_1$ and $B_2$ are preferably used for calculating two additional binary matrices, $P_1$ and $P_2$, in which 1's preferably define picture-elements belonging to the papillary muscles, and 0's preferably define other picture-elements. The calculation of $P_1$ and $P_2$ is preferably as follows:

For i=1, 2:

(1) Randomly selecting an element $(m_p,n_p)$ in $B_i$, whose value is 1.

(2) Defining a matrix R of the same size as $B_i$, in which the values for all the elements but $(m_p,n_p)$ are 0's, while the value for $(m_p,n_p)$ is 1.

(3) Locating all the 1's in $B_i$ that belong to the closed region (of 1's) in which $(m_p,n_p)$ resides, and recording this region in R. This step can be done, for example, using a region-growing procedure.

(4) Subtracting R from $B_i$, thereby ensuring that the same region is not selected more than once, and, if the sum of R(m,n) is lower than a threshold $R_{max}$, setting $P_i(m,n)=P_i(m,n)+R(m,n)$. In the present example, a value of 500 was selected for $R_{max}$.

(6) Repeating steps (1) to (4), until $B_i(m,n)$ contains only 0's.

$P_1$ and $P_2$ are preferably merged to obtain a binary matrix P, defining the location of the papillary muscles:

$$P(m,n)=P_1(m,n)\cup P_2(m,n) \qquad \text{(EQ. 20)}$$

Figure 39:
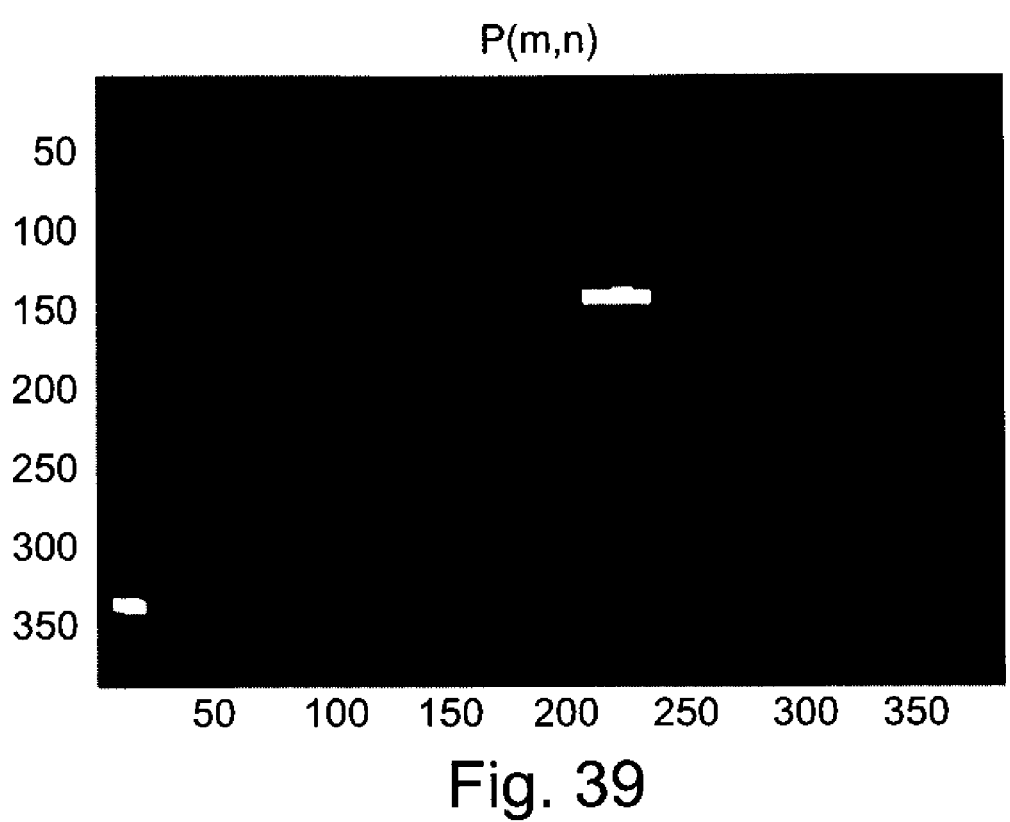
FIG. 39 is a representative example of an image of a binary matrix defining the location of the papillary muscles, according to a preferred embodiment of the present invention.

FIG. 39 is a representative example of an image of the binary matrix P. As shown in FIG. 39, only two regions of non-zero matrix-elements are left in P. The bottom left region resides outside the left ventricle and the upper middle region is identified as corresponding to the papillary muscles.

Referring again to the flowchart of FIG. 37, in step 104 an origin $(m_i,n_i)$ of the cine loop is defined and used for transforming the grid onto which the images are defined into polar representation. In the present example, the origin was defined as the center of mass of the left ventricle.

Following is a preferred procedure for defining $(m_i,n_i)$:

(1) Transform each element (m,n) in the imaging plane into a polar representation $(r,\theta)$, using a preliminary reference point $(m_r,n_r)$. This results in two matrices, r and $\theta$, defined as follows:

$$r(m,n) = \sqrt{(m-m_r)^2 + (n-n_r)^2} \qquad \text{(EQ. 21)}$$

$$\theta(m,n) = \arctan\left(\frac{n-n_r}{m-m_r}\right)$$

The values in the r and $\theta$ matrices can be further digitized to the required axial and lateral resolution, which can be the size of each range-gate and angular-gate. The digitized matrices are denoted $r_d$ and $\theta_d$.

(2) Rejecting clutter regions and the papillary muscles, thereby obtaining a "free" matrix $M_f(m,n)$:

$$M_f(m,n)=M(m,n)\cdot(1-P(m,n))\cdot(1-C(m,n)) \qquad \text{(EQ. 22)}$$

where P is defined above (see Equation 20) and C is defined in Example 2 (see Equation 17).

(3) Applying $T_1$ to $M_f$, thereby to obtain a binary matrix $B_1$, and applying one or more morphological filters to $B_1$, for smoothing and filling gaps within $B_1$.

(4) Constructing a boundary matrix in which the boundaries in $B_1$, and, optionally and preferably the boundaries of the imaged region are stored. This can be done, for example, using the morphological filter "Erode", as follows:

$$O(m,n) = B_1(m,n) - \text{Erode}\left(B_1(m,n), \begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix}\right) \qquad \text{(EQ. 23)}$$

with a similar expression for the boundaries of the imaged region.

(5) Calculating an array $I(\theta_d)$, defining the distance from the preliminary reference point to the inner boundary. Specifically, for each angular-gate $\theta_d$, $I(\theta_d)$ is calculated as follows:

$$I(\theta_d)=\min_{nz}\{r_d(m,n)\cdot(\theta_d(m,n)=\theta_d)\cdot O(m,n)\} \qquad \text{(EQ. 24)}$$

where $\min_{nz}$ represents a function which returns the minimal non-zero value of a matrix.

(6) Calculating the Cartesian location $(m_c,n_c)$ of each point along the inner boundary defined by $I(\theta_d)$.

(7) Defining $m_i$ as the average value of $m_c$ and $n_i$ as the average value of $n_c$.

Once the origin $(m_i,n_i)$ is defined, the matrices r and $\theta$ can be redefined using Equation 21 in which the preliminary reference point $(m_r,n_r)$ is replaced by the calculated origin $(m_i,n_i)$.

According to a preferred embodiment of the present invention the method continues to step 105 in which a region of the image in which the cusps of the mitral valve reside. In other words, in step 105 a region-of-interest containing the mitral valve is detected prior to the actual detection thereof. The advantage of this step is that it reduces the probability of falsely identifying the mitral valve.

The detection of the mitral valve region-of-interest is based on the hypothesis that the location of the cusps of mitral valve, as seen within the imaging plane, varies dramatically during the cardiac cycle. As a result, the relevant pixels (in each frame) are expected to show large deviations from the mean intensity over time, M. In addition, these pixels also tend to have high pixel intensities. On the other hand, the above definition also applies to the edges of the cardiac muscle. According to a preferred embodiment of the present invention this fact is addressed in two phases. In a first phase maximal dimensions for the cusps are assumed, and in a second phase additional filters are applied for the final determination.

Hence, the initial region-of-interest determination is performed by:

(1) Defining an initial matrix $V_i(m,n)=0\forall m, n$.

For each p:

(2) Calculating D(m,n), the relative deviation of each pixel from M(m,n):

$$D(m,n) = \frac{|F_p(m,n) - M(m,n)|}{M(m,n)} \qquad \text{(EQ. 25)}$$

(3) Setting elements satisfying $D(m,n)<T_2$ to 0.

(4) Applying a constant threshold, $T_D$, to D(m,n), to obtain $D_T(m,n)$:

$$D_T(m,n)=(D(m,n)>T_D) \qquad \text{(EQ. 26)}$$

in the present example a value of 1.0 was selected for $T_D$.

(5) Constructing a binary matrix H, defining high-intensity regions in $F_p(m,n)$, based on $T_1$ and $T_2$:

$$H(m,n) = \left(F_p(m,n) > \frac{1}{2}(T_1 + T_2)\right) \qquad \text{(EQ. 27)}$$

(6) Updating the matrix $V_i(m,n)$, by adding 1 to pixels $(m_p,n_p)$, for which all the following conditions apply:

(a) $D_T(m_p,n_p)=1$; and (b) when examining a block $H_B(m_b,n_b)$ of H(m,n), of a constant size $(H_1 \times H_2)$, centered at $(m_p,n_p)$, one of the following statements is true:

$$\left[\sum_{m_b=1}^{3}\sum_{n_b=1}^{3} H_B(m_b,n_b)\right] + \left[\sum_{m_b=H_1-2}^{H_1}\sum_{n_b=H_2-2}^{H_2} H_B(m_b,n_b)\right] = 0 \qquad \text{(EQ. 28)}$$

-continued $$\left[\sum_{m_b=1}^{3}\sum_{n_b=H_2-2}^{H_2} H_B(m_b, n_b)\right] + \left[\sum_{m_b=H_1-2}^{H_1}\sum_{n_b=1}^{3} H_B(m_b, n_b)\right] = 0. \quad (EQ. 29)$$

each bracketed expression in Equations 28-29 refers to a different corner of $H_B$. The above expressions mean that at least two opposite corners of the block show relatively low intensity, such that the local width does not exceed $\sqrt{H_1^2+H_2^2}$. This defines the maximal allowable width of the mitral valve cusps (used for discerning the cusps from the cardiac muscle).

Once all frames are processed, $V_i$ is transformed into a binary matrix:

$$V_i(m,n) = (V_i(m,n) > 1), \quad (EQ. 30)$$

and its largest closed region is defined as the mitral valve region-of-interest, V.

This can be done, for example, by employing a procedure which is similar to the procedure employed for obtaining the matrices $P_1$ and $P_2$. Hence, according to a preferred embodiment of the present invention, V is defined by: (i) randomly selecting an element $(m_p, n_p)$ in $V_i$, whose value is 1; (ii) defining a matrix R, in which the values for all the elements but $(m_p, n_p)$ are 0's, and the value for $(m_p, n_p)$ is 1; using a region growing procedure for storing in R all the 1's in $V_i$ which belong to the closed region of 1's in which $(m_p, n_p)$ resides; subtract R from $V_i$, so as not to select the same region more than once; and (iii) if the sum of R exceeds a threshold $V_s$, then setting V=R and updating $V_s$ to be the sum of R, where the initial value of $V_s$ can be set to zero. The process is iteratively repeated until $V_i(m,n)=0$ for all (m,n).

Figure 40A:
FIGS. 40a-b show an image of the average intensity matrix (FIG. 40a) and the mitral valve region-of-interest (FIG. 40b), according to a preferred embodiment of the present invention.
Figure 40B:
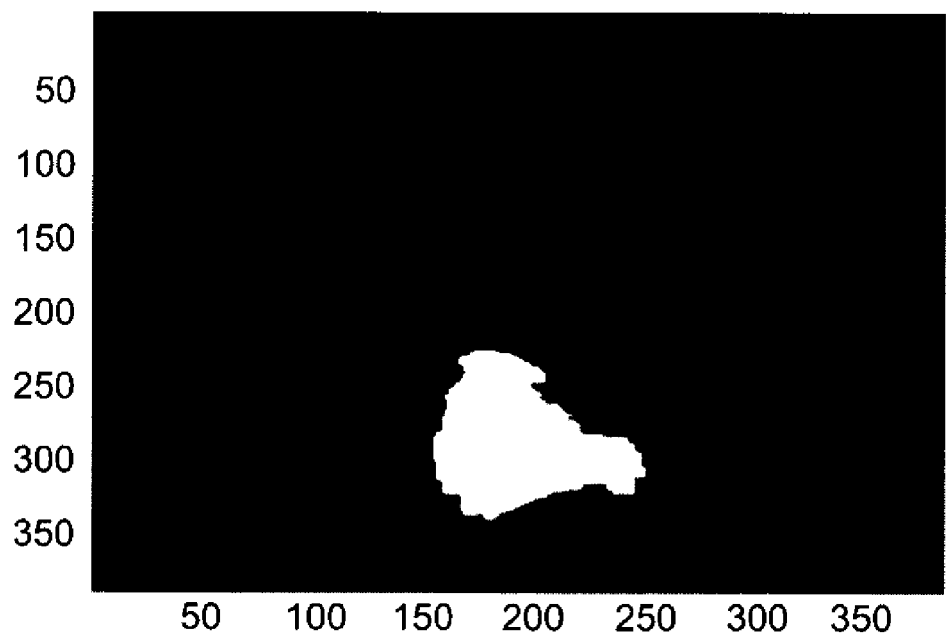

The above process is demonstrated in FIGS. 40*a-b*, showing an image of M (FIG. 40*a*) and the mitral valve region-of-interest (FIG. 40*b*). Comparing FIG. 40*a* and FIG. 40*b*, one can recognize that the region-of-interest shown in FIG. 40*b* encloses the mitral valve.

The region-of-interest, once determined, is preferably transformed into polar representation. For apical echocardiograph images, for example, the mitral valve is typically located at the bottom of the left ventricle. Thus, the transformation is performed by (i) locating in V the first and the last columns having non-zero elements; (ii) locating the highest row-index of non-zero elements in these columns; and calculating the following angular-gates using the matrix $\theta_d(m,n)$:

$$\theta_f = \theta_d(M_f, N_f)$$

$$\theta_l = \theta_d(M_l, N_l) \quad (EQ. 31)$$

where $N_f$ and $N_l$ are the aforementioned first and last columns, and $M_f$ and $M_l$ are their highest row-index of non-zero elements, respectively. The angular gates $\theta_f$ and $\theta_l$ thus span the region-of-interest of the mitral valve.

Whether or not step 105 is employed, the method preferably continues to step 106 in which the inner and/or outer boundaries of the left ventricle are detected. The boundaries are preferably determined in the polar representation of the grid and subsequently, if desired, are transformed to the original representation. The inner and outer boundaries of the pth image are denoted hereinbelow by $R^{in}(\theta_d, p)$ and $R^{out}(\theta_d, p)$ respectively.

The determination of boundaries is preferably preceded by the removal of the clutter and the papillary muscles are from each frame, thereby to provide a filtered matrix $F_p^{filt}(m,n)$.

This is preferably done by setting all the clutter pixels and the papillary muscles' regions to 0:

$$F_p^{filt}(m,n) = F_p(m,n) \cdot (1-P(m,n)) \cdot (1-C(m,n)). \quad (EQ. 32)$$

Optionally and preferably, determination of boundaries is also preceded by a procedure in which the mitral valve cusps are located and removed from each filtered matrix. This can be done similarly to the procure of detecting the mitral valve region-of-interest, with the exceptions that $T_1$ is used as a high-pass filter for the relative deviation matrix, D, and V is used as the region-of-interest in which the cusps are located.

Thus, according to the presently preferred embodiment of the invention, the cusps are located by: (i) calculating D according to Equation 25 while setting elements satisfying $D(m,n) < T_1$ to 0; (ii) constructing a matrix $V_p$ defined as $V_p = (D(m,n) > T_D)$, where $T_D$ is the constant defined in Equation 26 above; (iii) multiplying $V_p(m,n)$ by V(m,n) which, as stated, stores the mitral valve region-of-interest, thereby substantially preventing false identification; (iv) multiplying $F_p^{filt}(m,n)$ by $1-V_p(m,n)$, thereby removing the mitral valve from the filtered matrix; (v) locating in $V_p$ the first and the last columns having non-zero elements; (vi) locating in these columns the highest row-index of non-zero elements; and (vii) selecting the (rectangular) region defined by the located non-zero elements, thereby locating the region of the mitral valve cusps.

The radial-gate and angular-gate of the mitral valve cusps can be calculated using the radial and angular matrices. For example, if the digitized matrices, $r_d$ and $\theta_d$, are used, radial- and angular-gates of the mitral valve cusps are preferably calculated as follows:

$$r_f^p = r_d(M_f^p, N_f^p)$$

$$\theta_f^p = \theta_d(M_f^p, N_f^p)$$

$$r_l^p = r_d(M_l^p, N_l^p)$$

$$\theta_l^p = \theta_d(M_l^p, N_l^p) \quad (EQ. 33)$$

where $(M_f^p, N_f^p)$ and $(M_l^p, N_l^p)$ define the corners of the mitral valve cusps region of the pth frame.

The process of determining the boundaries preferably begins in a construction of one or two binary matrices, $B_1^p(m,n)$ and $B_2^p(m,n)$, for each frame, p. This is preferably done by an application of a strong low-pass filter, followed by a Boolean application of the thresholds $T_1$ and $T_2$ to $F_p^{filt}(m,n)$. The process continues by locating the inner and/or outer boundaries of the binary matrices $B_1^p(m,n)$ and $B_2^p(m,n)$ of the pth frame. Generally, this is done by traversing rays emanating from the origin $(m_i, n_i)$, at every angle.

Figure 41A:
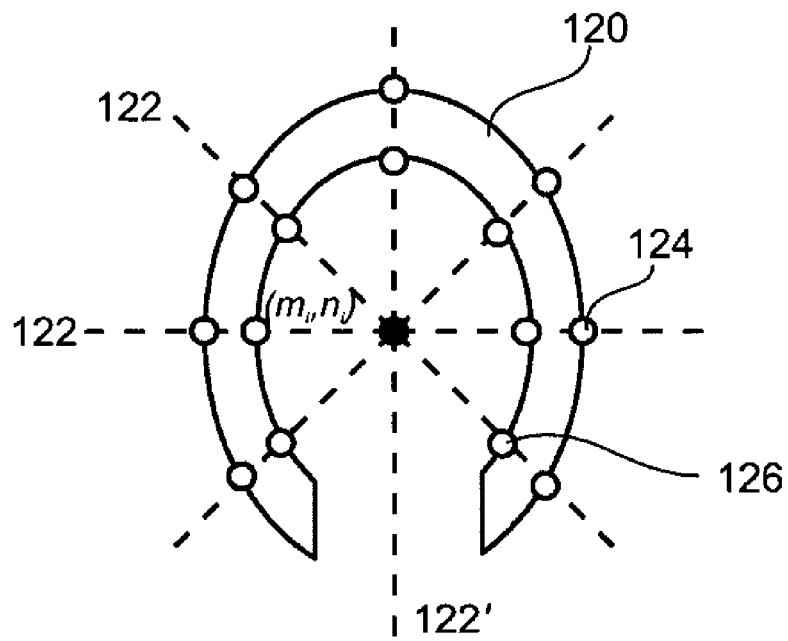
FIGS. 41a-b are schematic illustrations of a preferred process for determining the left ventricle boundaries, according to a preferred embodiment of the present invention.

FIG. 41*a* is a schematic illustration of a preferred process for determining the left ventricle boundaries, based on the binary matrices or $B_1^p(m,n)$ and $B_2^p(m,n)$. The left ventricular cardiac muscle is shown in FIG. 41*a* as a gray region and designated by numeral 120. Rays 122 emanating from the origin $(m_i, n_i)$ are marked as dashed lines. The intersection points of the rays with the inner and outer boundary are designated by numerals 126 and 124, respectively. Note that since the mitral valve is removed from the image, no intersection points are found within the data region for the corresponding rays (e.g., ray 122').

According to a preferred embodiment of the present invention, the locations of both the inner boundary and the outer boundary are described by their local distance from the origin, along each ray. For each ray, the range to the inner boundary is preferably defined as the range to the first non-zero value along the ray, and the range to the outer boundary is preferably defined as the range to the first zero-pixel beyond the inner boundary. As will be appreciated by the skilled artisan, in some regions, no boundary is found within the data region. This may be the case, for example, in the region of the mitral valve, which, as stated, is preferably removed prior to searching for the boundaries. Such regions are preferably marked, e.g., by assigning the corresponding matrix element with a value other than 0 or 1 (in the present example a value of −1 was selected).

Following is a detailed description of a preferred process for locating the inner and outer boundaries of the binary matrices, which is preferably performed for each frame p and for each i=1, 2.

(1) Smoothing and filling gaps in $B_i^p(m,n)$ by applying a set of Morphological filters thereto.

(2) Constructing a boundary matrix in which the boundaries in $B_i$, and, optionally and preferably the boundaries of the imaged region are stored. This can be done, for example, using the morphological filter "Erode", as follows:

$$O(m, n) = B_i(m, n) - \text{Erode}\left(B_i^p(m, n), \begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix}\right) \quad (EQ. 34)$$

with a similar expression for the boundaries of the imaged region.

(3) Calculating a matrix $R_i^{in}(\theta_d, p)$, defining the distance from the origin to the inner boundary. Specifically, for each angular-gate $\theta_d$, $R_i^{in}(\theta_d, p)$ is calculated as follows:

$$R_i^{in}(\theta_d,p) = \min_{nz}\{r_d(m,n)\cdot(\theta_d(m,n)=\theta_d)\cdot O(m,n)\} \quad (EQ. 35)$$

where, $\min_{nz}$ returns a minimal non-zero element, or −1 if no non-zero element is found.

(4) Calculating a matrix $R_i^{out}(\theta_d,p)$, defining the distance from the origin to the outer boundary. Specifically, for each $\theta_d$, $R_i^{out}(\theta_d,p)$ is calculated as follows:

$$R_i^{out}(\theta_d,p) = n\min_{nz}\{r_d(m,n)\cdot(\theta_d(m,n)=\theta_d)\cdot O(m,n)\} \quad (EQ. 36)$$

where $n\min_{nz}$ returns the next-to-minimal non-zero element, or −1 if no significant result can be obtained (e.g., when there is no such element, or the next-to-minimal value is substantially close to the minimal value).

Once the matrices $R_1^{in}(\theta_d, p)$, $R_2^{in}(\theta_d, p)$, $R_1^{out}(\theta_d, p)$ and $R_2^{out}(\theta_d, p)$ are formed, the process preferably combines them so as to obtain the boundaries of the left ventricle. While reducing the present invention to practice, it was found by the present Inventors that inner boundary, referred to herein as $R^{in}(\theta_d, p)$, typically coincides with the boundary delineated by $R_1^{in}(\theta_d, p)$. Further it was found by the present Inventors that if the difference between $R_1^{out}(\theta_d, p)$ and $R_2^{out}(\theta_d, p)$ is sufficiently large, the outer boundary, referred to herein as $R^{out}(\theta_d,p)$, equals the smaller value between $R_1^{out}(\theta_d, p)$ and $R_2^{out}(\theta_d, p)$. On the other hand, for angular-gates in which $R_1^{out}(\theta_d, p)$ and $R_2^{out}(\theta_d, p)$ are close, $R^{out}(\theta_d, p)$ equals the larger value therebetween.

Thus, according to a preferred embodiment of the present invention, $R^{in}(\theta_d, p) = R_1^{in}(\theta_d, p)$, and $$R^{out}(\theta_d, p) = \begin{cases} \max\{R_1^{out}(\theta_d, p), R_2^{out}(\theta_d, p)\} & \text{if } R_{dif}^{out}(\theta_d, p) \le R_{maxdif} \\ \min\{R_1^{out}(\theta_d, p), R_2^{out}(\theta_d, p)\} & \text{otherwise} \end{cases} \quad (EQ. 37)$$

where, $R_{maxdif}$ is the maximal difference between $R_1^{out}(\theta_d,p)$ and $R_2^{out}(\theta_d, p)$, and $R_{dif}^{out}(\theta_d, p) = |R_1^{out}(\theta_d, p) - R_2^{out}(\theta_d, p)|$. In the present example, the −1 values in both $R_1^{out}(\theta_d, p)$ and $R_2^{out}(\theta_d, p)$ were replaced by the maximal possible values. Additionally, the elements in $R^{out}(\theta_d, p)$ which equal the maximal possible value are preferably set to their original value, −1.

Once $R^{in}$ and $R^{out}$ are calculated, the method preferably continues to step 107 in which a set of temporal and spatial filters are applied so as to reject non-valid local information in $R^{in}(\theta_d, p)$ and $R^{out}(\theta_d, p)$. The rejected information is preferably replaced with interpolated data.

With respect to the inner boundary, the temporal and spatial filters are preferably applied according to the following procedures:

(1) Detecting angles $\theta_d$, for which the standard deviation in $R^{in}(\theta_d, p)$ exceeds a threshold $\sigma_{max}$, and replacing all the $R^{in}(\theta_d, p)$ values for the corresponding angles by −1. $\sigma_{max}$ is typically set to the median value of the standard deviations, multiplied by a constant, $\sigma_0$. In the present example, a value of 3.5 was selected for $\sigma_0$.

(2) Replacing all the elements belonging to the mitral valve (elements characterized by $\theta_f^p < \theta_d < \theta_l^p$) by −1.

(3) Applying a strong two-dimensional low-pass filter to $R^{in}(\theta_d, p)$, thereby obtaining $R_{LPF}^{in}(\theta_d, p)$, and replacing elements, for which the ratio $|R^{in}(\theta_d, p) - R_{LPF}^{in}(\theta_d, p)|/R_{LPF}^{in}(\theta_d, p)$ is larger than a threshold $\Delta_{max}$, by −1. A typical value for $\Delta_{max}$ is from 0.05 to 0.2. In the present example, a value of 0.15 was selected for $\Delta_{max}$.

(4) Performing two-dimensional interpolation and replacing elements in $R^{in}(\theta_d, p)$ having a value of −1, with interpolated values. Preferably, a cyclic interpolation is performed so as to coincide with the cyclic nature of the data. Specifically, if an integral number of cardiac cycles have been used, the interpolation is such that $R^{in}(\theta d, p)$ is cyclic in both axes, otherwise, $R^{in}(\theta_d, p)$ is cyclic in $\theta_d$. This step is preferably supplemented by a two-dimensional smoothing procedure (e.g., via spline fitting) so as to smooth $R^{in}(\theta_d, p)$.

(5) Connecting the points $(r_f^p, \theta_f^p)$ and $(r_l^p, \theta_l^p)$, which, as stated, define in polar representation the base of the mitral valve cusps, by a straight line.

With respect to the outer boundary, steps (1)-(5) of the inner boundary are preferably repeated, for a matrix representing the local muscle width, defined as $W(\theta_d, p) = R^{out}(\theta_d, p) - R^{in}(\theta_d, p)$. Once steps (1)-(5) are repeated, $R^{out}(\theta_d, p)$ is preferably reconstructed according to the formula:

$$R^{out}(\theta_d,p) = R^{in}(\theta_d,p) + W(\theta_d,p). \quad (EQ. 38)$$

According to a preferred embodiment of the present invention the outer boundary is limited by the extensions of the straight line connecting the base of the mitral valve cusps. This can be done by replacing outer boundaries exceeding the straight line with a continuation of the line.

Figure 41B:
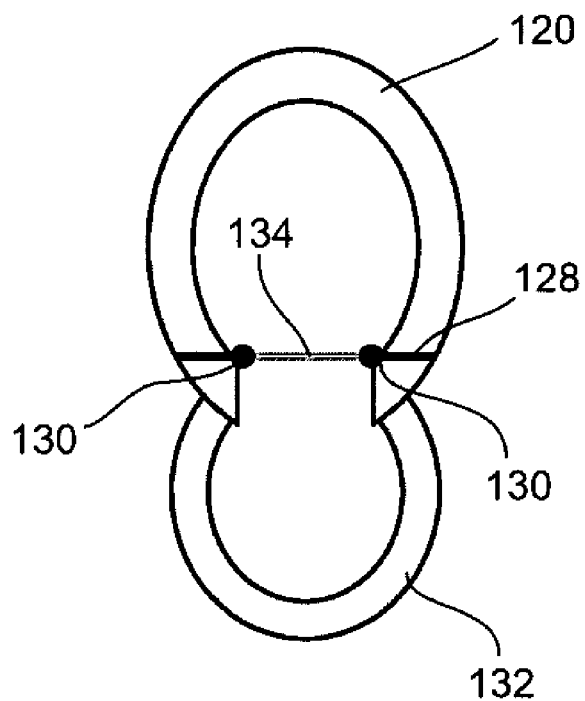

FIG. 41b is a schematic illustration of left ventricle after the connection of the base of the mitral valve cusps 130 by a straight line 134. Also shown in FIG. 41b are extensions 128 of line into the cardiac muscle, and the left atrium 132. As will be appreciated by one ordinarily skilled in the art, the process of outlining left atrium 132 is similar to the present process in which left atrium 132 was outlined.

In optional and preferred step 108, the boundaries are transformed back from polar representation to the original or any other representation. For example, for the case of a Cartesian coordinate system, the bounties can be transformed by:

(1) Calculating a binary matrix I(m,n) defined as:

$$I(m, n) = \sum_{\theta_d} (r_d(m, n) \le R^{in}(\theta_d, p)) \cdot (\theta_d(m, n) = \theta_d). \quad \text{(EQ. 39)}$$

The matrix I thus includes 1's for elements within the inner boundary. Note that in Equation 39, the symbol $\theta_d$ is used both as an index $\theta_d$ and as a matrix $\theta_d(m,n)$.

(2) Determining the inner boundary in Cartesian coordinates, $R_c^{in}(m, n, p)$, using the morphological filter "Erode":

$$R_c^{in}(m, n, p) = I(m, n) - \text{Erode}\left(I(m, n), \begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix}\right) \quad \text{(EQ. 40)}$$

(3) Repeating steps (1) and (2) for the $R^{out}$, thereby obtaining the outer boundary in Cartesian coordinate $R_c^{out}(m, n, p)$.

Data Acquisition

Seven cine-loops of echocardiograph images recorded of three different patients were selected. The cine-loops were in apical four-chamber and apical two-chamber views. The data has been collected using a Vivid™ 3 imaging platform, by GE Medical Systems Ultrasound.

Results

FIGS. 42a-e and 43a-e show results for two representative cine-loops collected at a high frame rate of 75 frames per second: case 3.1 (FIGS. 42a-e) and case 3.2 (FIGS. 43a-e). Case 3.1 contained a single cardiac cycle at a heart rate of 65 beats/min, and case 3.2 contained a single cardiac cycle at a heart rate of 71 beats/min. Case 3.1 was formed of 50 frames and case 3.2 was formed of 42 frames.

Figure 42A:
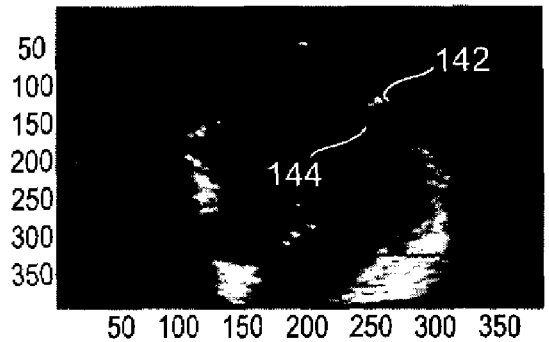
FIGS. 42a-e show inner and outer outlines of the left ventricle performed according to a preferred embodiment of the present invention on case 1.1, interchangeably referred to herein as case 3.1.
Figure 42B:
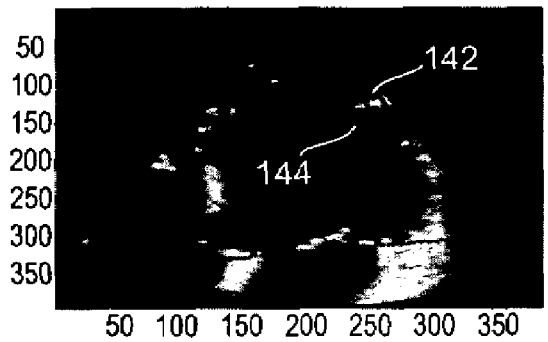
Figure 42C:
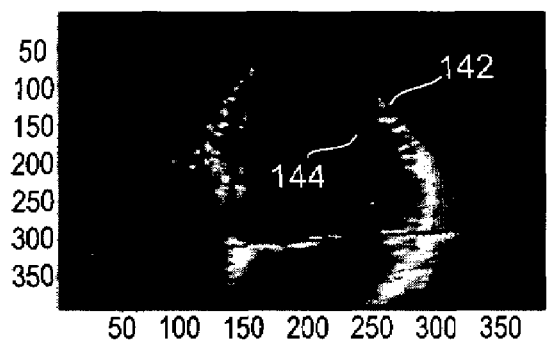
Figure 42D:
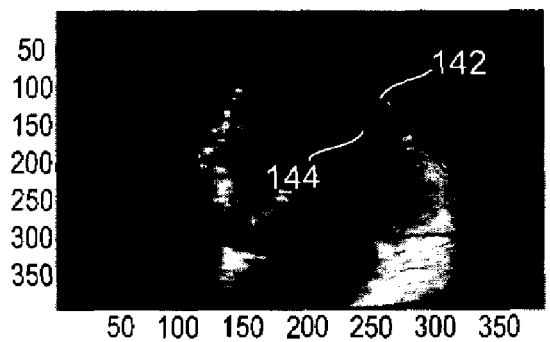
Figure 42E:
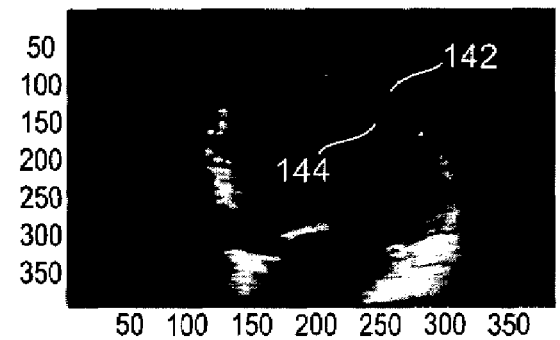
Figure 43A:
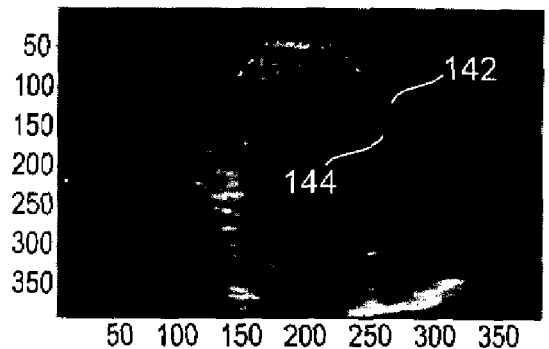
FIGS. 43a-e show inner and outer outlines of the left ventricle performed according to a preferred embodiment of the present invention on case 1.15, interchangeably referred to herein as case 3.2.
Figure 43B:
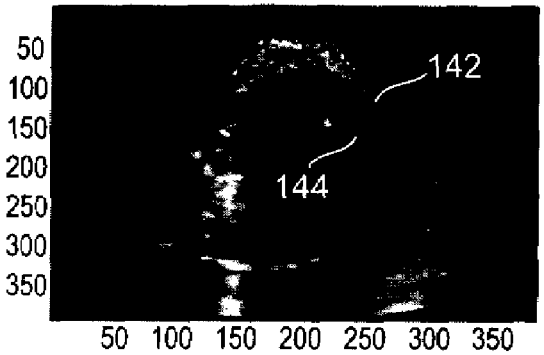
Figure 43C:
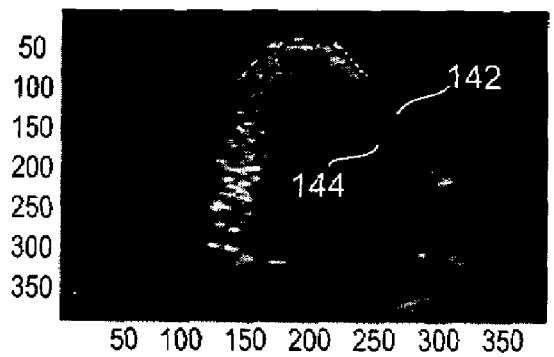
Figure 43D:
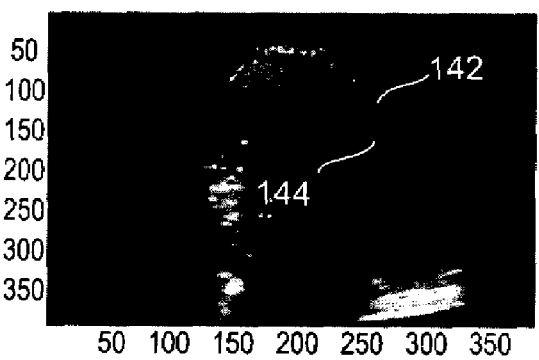
Figure 43E:
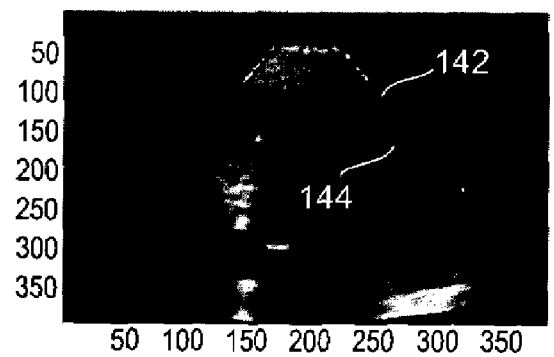

Shown in FIGS. 42a-43e are epicardial boundaries 142 and endocardial boundaries 144 and frame Nos. 1 (FIGS. 42a and 43a), 11 (FIGS. 42b and 43b), 21 (FIGS. 42c and 43c), 31 (FIGS. 42d and 43d), and 41 (FIGS. 42e and 43e). In each frame, endocardial boundary 144 is marked as an inner red closed line, and epicardial boundary 142 is marked as an outer magenta closed line. As shown, the results are in complete agreement with the visually determined outlines. In regions where the cardiac muscle extends outside of the scanned data region, the outlines follow the boundaries of the data region Discussion The present embodiments successfully detect the outlines of the cardiac muscle within the imaging plane of echocardiograph images. Both temporal and spatial filters have been used so as to handle low signal-to-noise ratio, which is a common drawback in echocardiography. Special treatment was provided for clutter, so as to allow outlining to go through clutter regions. The cusps of the mitral valve and the papillary muscles have been automatically detected and removed from the images prior to the outlining process. The present embodiments have a minimal number of assumptions regarding the nature of the cardiac muscle, and hence support both intra-patient and inter-patient variations.

Careful examination of the results reveals that the detected outlines closely match the visual estimation for the location of the cardiac muscle in all the cine-loops in the test-group. The present embodiments successfully handle clutter, as well as the complex motion of the mitral valve and the papillary muscles. Small variations appear mainly in the vicinity of the mitral valve. This occurs when a small part of the cusps is not rejected by the pre-filtering, and is thus marked as a part of the cardiac muscle itself.

The present embodiments provide an automated estimate for the location of both the endocardial and the epicardial boundaries of the left ventricle. The quality of the results is sufficient for the extraction of various local quantitative functional parameters, which are indicators for muscle contractility and viability.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of improving an image by transforming an intensity histogram thereof, the method comprising operating a data processor for performing the following steps:
   (a) fitting the intensity histogram to a sum of a plurality of localized functions;
   (b) using said plurality of localized functions to define a plurality of localized intensity histograms;
   (c) for each localized intensity histogram, performing at least one image enhancement procedure, thereby providing a plurality of improved localized intensity histograms; and
   (d) combining said plurality of improved localized intensity histograms, thereby transforming the intensity histogram of the image.

2. The method of claim 1, wherein each localized intensity histogram of said plurality of localized intensity histograms is characterized by an intensity range having a minimal intensity value and a maximal intensity value, such that at least one of said minimal and maximal intensity values coincides with an intersection point between two localized function of said plurality of localized functions.

3. The method of claim 1, wherein said plurality of localized functions comprises a first localized function, a second localized function and a third localized function, and further wherein said plurality of localized histograms comprises a first localized histogram, a second localized histogram and a third localized histogram.

4. The method of claim 1, wherein said at least one image enhancement procedure is selected so as to enlarge a relative portion of a high-intensity region of the intensity histogram.

5. The method of claim 1, wherein the image is a moving image characterized by a plurality of picture-elements, said moving image being formed of a set of still-images.

6. The method of claim 5, further comprising calculating, for each picture-element of said plurality of picture-elements, a set-averaged intensity value, thereby providing an average intensity matrix representing said moving image, and using said average intensity matrix to construct the intensity histogram.

7. The method of claim 6, further comprising removing clutter from the image.

8. The method of claim 7, wherein said removing said clutter from the image comprises:
calculating a statistical deviation for each picture-element over the set of still-images, thereby providing a statistical deviation matrix having a plurality of matrix-elements; and
determining, for each picture element, whether a respective matrix-element of said average intensity matrix is above a first intensity threshold and whether a respective matrix-element of said statistical deviation matrix is below an additional intensity threshold, and if so then marking said picture-element as a clutter picture-element in the image.

9. The method of claim 8, further comprising outlining at least one region in the image, and assigning to each clutter picture-element an intensity value corresponding to a location of said clutter picture-element relative to said at least one region.

10. The method of claim 9, wherein said outlining at least one region comprises:
applying a thresholding procedure to said set of still-images in a Boolean manner, so as to construct at least one binary matrix having a plurality of binary-valued matrix-elements; and
for each binary matrix of said at least one binary matrix, clustering said binary matrix, so as to obtain at least one cluster of matrix-elements having a predetermined polarity, and marking picture-elements corresponding to at least a portion of matrix-elements enveloping said at least one cluster as outlining picture-elements;
thereby outlining the at least one region.

11. A method of outlining at least one region in a set of images arranged grid-wise in a plurality of picture-elements, each image being represented by a plurality of intensity values over the grid and characterized by an intensity histogram, the method comprising operating a data processor for performing the following steps:
(a) calculating a set-averaged intensity value for each picture-element, thereby providing an average intensity matrix having a plurality of matrix-elements, and constructing a first intensity histogram characterizing said average intensity matrix;
(b) fitting said first intensity histogram to a sum of a plurality of localized functions, so as to provide at least one intensity threshold, each intensity threshold of said at least one intensity threshold being defined as an intersection point between two localized functions of said plurality of localized functions;
(c) for each intensity threshold of said at least one intensity threshold, applying a thresholding procedure to the set of images in a Boolean manner, so as to construct at least one binary matrix having a plurality of binary-valued matrix-elements; and
(d) for each binary matrix of said at least one binary matrix, clustering said binary matrix, so as to obtain at least one cluster of matrix-elements having a predetermined polarity, and marking picture-elements corresponding to at least a portion of matrix-elements enveloping said at least one cluster as outlining picture-elements;
thereby outlining the at least one region.

12. The method of claim 11, wherein the set of images forms a moving image.

13. The method of claim 11, wherein said plurality of localized functions comprises a first localized function, a second localized function and a third localized function.

14. The method of claim 11, further comprising removing clutter from at least one image of the set of images.

15. The method of claim 14, wherein said removing said clutter from the image comprises:
calculating a statistical deviation for each picture-element over the set of still-images, thereby providing a statistical deviation matrix having a plurality of matrix-elements and constructing a second intensity histogram characterizing said statistical deviation matrix;
fitting said second intensity histogram to a second sum of a plurality of localized functions, so as to provide at least one additional intensity threshold, said at least one additional intensity threshold being defined as an intersection point between two localized functions of said second sum; and
determining, for each picture element, whether a respective matrix-element of said average intensity matrix is above said second intensity threshold and whether a respective matrix-element of said statistical deviation matrix is below one of said at least one additional intensity threshold, and if so then marking said picture-element as a clutter picture-element in the image.

16. The method of claim 11, further comprising performing at least one morphological operation on said at least one binary matrix.

17. The method of claim 11, further comprising, for each region of the at least one region, defining an origin of the grid, said origin being defined as a central picture-element of said region.

18. An apparatus for improving an image by transforming an intensity histogram thereof, the apparatus comprising a computer-readable medium storing a program for causing a data processor to execute:
a fitter, for fitting the intensity histogram to a sum of a plurality of localized functions;
a histogram definer, for defining a plurality of localized intensity histograms using said plurality of localized functions; and
a histogram transformer, supplemented by an algorithm for performing at least one image enhancement procedure, for enhancing each localized intensity histogram, thereby to provide a plurality of improved localized intensity histograms, and combining said plurality of improved localized intensity histograms.

19. The apparatus of claim 18, wherein each localized intensity histogram of said plurality of localized intensity histograms is characterized by an intensity range having a minimal intensity value and a maximal intensity value, such that at least one of said minimal and maximal intensity values coincides with an intersection point between two localized function of said plurality of localized functions.

20. The apparatus of claim 18, wherein said plurality of localized functions comprises a first localized function, a second localized function and a third localized function, and further wherein said plurality of localized histograms comprises a first localized histogram, a second localized histogram and a third localized histogram.

21. The apparatus of claim 18, wherein said at least one image enhancement procedure is selected so as to enlarge a relative portion of a high-intensity region of the intensity histogram.

22. The apparatus of claim 18, wherein the image is a moving image characterized by a plurality of picture-elements, said moving image being formed of a set of still-images.

23. The apparatus of claim 22, further comprising a histogram constructor for constructing the intensity histogram of the image.

24. The apparatus of claim 23, wherein said histogram constructor comprises an average calculator, for calculating, for each picture-element of said plurality of picture-elements, a set-averaged intensity value, thereby to provide an average intensity matrix representing said moving image; and to construct the intensity histogram using said average intensity matrix.

25. The apparatus of claim 23, further comprising a preprocessing unit, for performing at least one preprocessing operation on the set of images.

26. The apparatus of claim 25, wherein said preprocessing unit is operable to remove clutter from the image.

27. The apparatus of claim 26, wherein said preprocessing unit comprises:
  a statistical deviation calculator, for each picture-element over the set of still-images, thereby to provide a statistical deviation matrix having a plurality of matrix-elements; and
  electronic-calculation functionality for determining, for each picture element, whether a respective matrix-element of said average intensity matrix is above a first intensity threshold and whether a respective matrix-element of said statistical deviation matrix is below an additional intensity threshold, and if so then marking said picture-element as a clutter picture-element in the image.

28. The apparatus of claim 27, wherein said preprocessing unit further comprises:
  an outliner, for outlining at least one region in the image; and
  intensity value assigner, for assigning to each clutter picture-element an intensity value corresponding to a location of said clutter picture-element relative to said at least one region.

29. The apparatus of claim 28, wherein said outliner comprises:
  a thresholding unit, for applying a thresholding procedure to said set of still-images in a Boolean manner, such that at least one binary matrix having a plurality of binary-valued matrix-elements is constructed; and
  a clustering unit, for clustering each binary matrix of said at least one binary matrix, so as to obtain at least one cluster of matrix-elements having a predetermined polarity, said clustering unit being operable to mark picture-elements corresponding to at least a portion of matrix-elements enveloping said at least one cluster as outlining picture-elements.

30. An apparatus for outlining at least one region in a set of images arranged grid-wise in a plurality of picture-elements, each image being represented by a plurality of intensity values over the grid and characterized by an intensity histogram, the apparatus comprising a computer-readable medium storing a program for causing a data processor to execute:
  a histogram constructor, for constructing a first intensity histogram characterizing the set of images;
  a fitter, for fitting said first intensity histogram to a sum of a plurality of localized functions;
  an intensity threshold calculator, for calculating at least one intensity threshold, each intensity threshold of said at least one intensity threshold being defined as an intersection point between two localized functions of said plurality of localized functions;
  a thresholding unit, for applying a thresholding procedure to the set of images in a Boolean manner using each intensity threshold of said at least one intensity threshold, such that at least one binary matrix having a plurality of binary-valued matrix-elements is constructed; and
  a clustering unit, for clustering each binary matrix of said at least one binary matrix, so as to obtain at least one cluster of matrix-elements having a predetermined polarity, said clustering unit being operable to mark picture-elements corresponding to at least a portion of matrix-elements enveloping said at least one cluster as outlining picture-elements.

31. The apparatus of claim 30, further comprising an average calculator, for calculating a set-averaged intensity value for each picture-element, thereby to provide an average intensity matrix having a plurality of matrix-elements, wherein said histogram constructor is designed to construct said first intensity histogram using said average intensity matrix.

32. The apparatus of claim 30, wherein the set of images forms a moving image.

33. The apparatus of claim 30, wherein said plurality of localized functions comprises a first localized function, a second localized function and a third localized function.

34. The apparatus of claim 30, further comprising electronic-calculation functionality for performing at least one morphological operation on said at least one binary matrix.

35. The apparatus of claim 30, further comprising a preprocessing unit for performing at least one preprocessing operation on the set of images.

36. The apparatus of claim 35, wherein said preprocessing unit is operable to remove clutter from at least one image of the set of images.

37. The apparatus of claim 30, wherein said clustering unit comprises an origin definer for defining, for each region of the at least one region, an origin of the grid, said origin being defined as a central picture-element of said region.

38. The method of claim 1, wherein the image comprises an ultrasound image.

39. The method of claim 11, wherein the set of images comprises a set of ultrasound images.

40. The apparatus of claim 18, wherein the image comprises an ultrasound image.

41. The apparatus of claim 30, wherein the set of images comprises a set of ultrasound images.

* * * * *